US012047816B2

(12) United States Patent
Kim et al.

(10) Patent No.: US 12,047,816 B2
(45) Date of Patent: *Jul. 23, 2024

(54) METHOD AND DEVICE FOR PERFORMING IMPROVED COMMUNICATION IN WIRELESS COMMUNICATION SYSTEM

(71) Applicant: Samsung Electronics Co., Ltd., Suwon-si (KR)

(72) Inventors: Soenghun Kim, Suwon-si (KR); Jaehyuk Jang, Suwon-si (KR); Sangbum Kim, Suwon-si (KR); Seungri Jin, Suwon-si (KR); Himke Van Der Velde, Zwolle (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,582

(22) Filed: Sep. 3, 2021

(65) Prior Publication Data

US 2021/0400541 A1 Dec. 23, 2021

Related U.S. Application Data

(63) Continuation of application No. 16/485,652, filed as application No. PCT/KR2018/001173 on Jan. 26, 2018, now Pat. No. 11,115,875.

(30) Foreign Application Priority Data

Feb. 13, 2017 (KR) .................. 10-2017-0019575

(51) Int. Cl.
*H04W 36/00* (2009.01)
*H04W 36/08* (2009.01)
(52) U.S. Cl.
CPC ....... *H04W 36/0005* (2013.01); *H04W 36/08* (2013.01)

(58) Field of Classification Search
None
See application file for complete search history.

(56) References Cited

U.S. PATENT DOCUMENTS 6,628,946 B1     9/2003  Wiberg et al.
11,172,429 B2 *  11/2021 Ishii ...................... H04W 48/10
(Continued)

FOREIGN PATENT DOCUMENTS

CN     103327514 A    9/2013
CN     105580399 A    5/2016
(Continued)

OTHER PUBLICATIONS

Gemalto N.V.; System Information for NR validity considerations including area ID introduction; 3GPP TSG-RAN WG2 NR; R2-1700034; Jan. 17, 2017; Spokane, Washington.
(Continued)

*Primary Examiner* — Andre Tacdiran
(74) *Attorney, Agent, or Firm* — Jefferson IP Law, LLP

(57) ABSTRACT

Disclosed are a communication technique for merging, with IoT technology, a 5G communication system for supporting a data transmission rate higher than that of a 4G system, and a system thereof. The present disclosure can be applied to an intelligent service (for example, smart home, smart building, smart city, smart car or connected car, healthcare, digital education, retail, security and safety-related services, and the like), based on a 5G communication technology and an IoT-related technology. One embodiment of the present invention relates to a method by which a terminal updates system information, and a terminal for performing the method, which comprises the steps of: acquiring first system information and second system information from a first cell; starting a timer corresponding to the second system information; determining whether the second cell is a cell that shares the second system information with the first cell, if (Continued)

the terminal has moved from the first cell to the second cell; and updating the second system information on the basis of the determination result.

16 Claims, 43 Drawing Sheets

(56) References Cited

U.S. PATENT DOCUMENTS

| | | | |
|---|---|---|---|
| 2006/0166693 A1* | 7/2006 | Jeong | H04W 48/16 455/525 |
| 2006/0264215 A1 | 11/2006 | Ekstedt et al. | |
| 2009/0253422 A1 | 10/2009 | Fischer | |
| 2009/0274086 A1 | 11/2009 | Petrovic et al. | |
| 2009/0316603 A1 | 12/2009 | Amerga et al. | |
| 2010/0092470 A1 | 4/2010 | Bhatt et al. | |
| 2010/0124919 A1 | 5/2010 | Ko et al. | |
| 2011/0269448 A1 | 11/2011 | Chen | |
| 2013/0258938 A1* | 10/2013 | Sagfors | H04W 72/02 370/312 |
| 2015/0092672 A1* | 4/2015 | Das | H04W 48/16 370/329 |
| 2015/0215825 A1 | 7/2015 | Kim et al. | |
| 2015/0318973 A1* | 11/2015 | Wang | H04L 5/0023 370/329 |
| 2015/0327156 A1* | 11/2015 | Ramkumar | H04L 5/001 370/312 |
| 2015/0334766 A1 | 11/2015 | Lee et al. | |
| 2016/0165638 A1 | 6/2016 | Ozturk et al. | |
| 2016/0174135 A1 | 6/2016 | Yan et al. | |
| 2016/0234735 A1* | 8/2016 | Kubota | H04W 48/14 |
| 2016/0269956 A1 | 9/2016 | Sawhney et al. | |
| 2017/0311233 A1* | 10/2017 | Du | H04W 48/10 |
| 2018/0014175 A1 | 1/2018 | Desai et al. | |
| 2018/0049022 A1* | 2/2018 | Johansson | H04W 24/02 |
| 2018/0063815 A1 | 3/2018 | Ishii | |
| 2018/0132166 A1 | 5/2018 | Ishii | |
| 2018/0167911 A1* | 6/2018 | Kota | H04W 68/005 |
| 2018/0167918 A1 | 6/2018 | Ishii | |
| 2018/0227805 A1 | 8/2018 | Jang et al. | |
| 2019/0116533 A1 | 4/2019 | Lee et al. | |
| 2019/0159110 A1* | 5/2019 | Takahashi | H04W 48/10 |
| 2019/0174554 A1* | 6/2019 | Deenoo | H04W 72/0453 |
| 2019/0230588 A1* | 7/2019 | Kim | H04W 48/20 |
| 2019/0289529 A1* | 9/2019 | Ishii | H04W 48/12 |
| 2020/0059851 A1* | 2/2020 | Kim | H04W 76/27 |
| 2020/0383037 A1* | 12/2020 | Ishii | H04W 48/10 |

FOREIGN PATENT DOCUMENTS

| | | |
|---|---|---|
| EP | 1 190 582 | 3/2002 |
| EP | 1 909 523 A1 | 4/2008 |
| KR | 10-2010-0055630 A | 5/2010 |
| KR | 10-2014-0022711 A | 2/2014 |
| KR | 10-2015-0139825 A | 12/2015 |
| KR | 10-2018-0090658 A | 8/2018 |
| WO | 2000/072609 A1 | 11/2000 |
| WO | 2008/040447 A1 | 4/2008 |
| WO | 2014/041002 A1 | 3/2014 |
| WO | WO2015047791 * | 2/2015 |
| WO | 2016/061783 A1 | 4/2016 |

OTHER PUBLICATIONS

Sony; System Information Area Scope and Value Tag; 3GPP TSG RAN WG2 Meeting #93; R2-161140; Feb. 15-19, 2016; St. Julian's, Malta.
European Search Report dated Apr. 2, 2020; European Appln. No. 18751355.1-1212 / 3570591 PCT/KR2018/001173.
3GPP TS 36.331. Radio Resource Control (RRC); Protocol specification. ETSI TS 136 331 V1 0.1.0 (Apr. 2011). (Year: 2011).
U.S. Appl. Nos. 62/334,704, 62/400,810, 62/416,499, 62/442,317 corresponding to priority dates for Deenoo-S20190174554 (Year: 2016).
Summons to Attend Oral Proceeding dated Oct. 4, 2023; European Appln. No. 18 751 355.1-1216.
Gemalto N.V.; System Information for NR including ID and version tag; 3GPP TSG-RAN WG2 #95bis; R2-166132; Kaohsiung, Taiwan; Oct. 10-14, 2016.
Korean Notice of Allowance with English translation May 21, 2024; Korean Appln. No. 10-2017-0019575.
Chinese Office Action with English translation May 31, 2024; Chinese Appln. No. 202210877878.8.

* cited by examiner

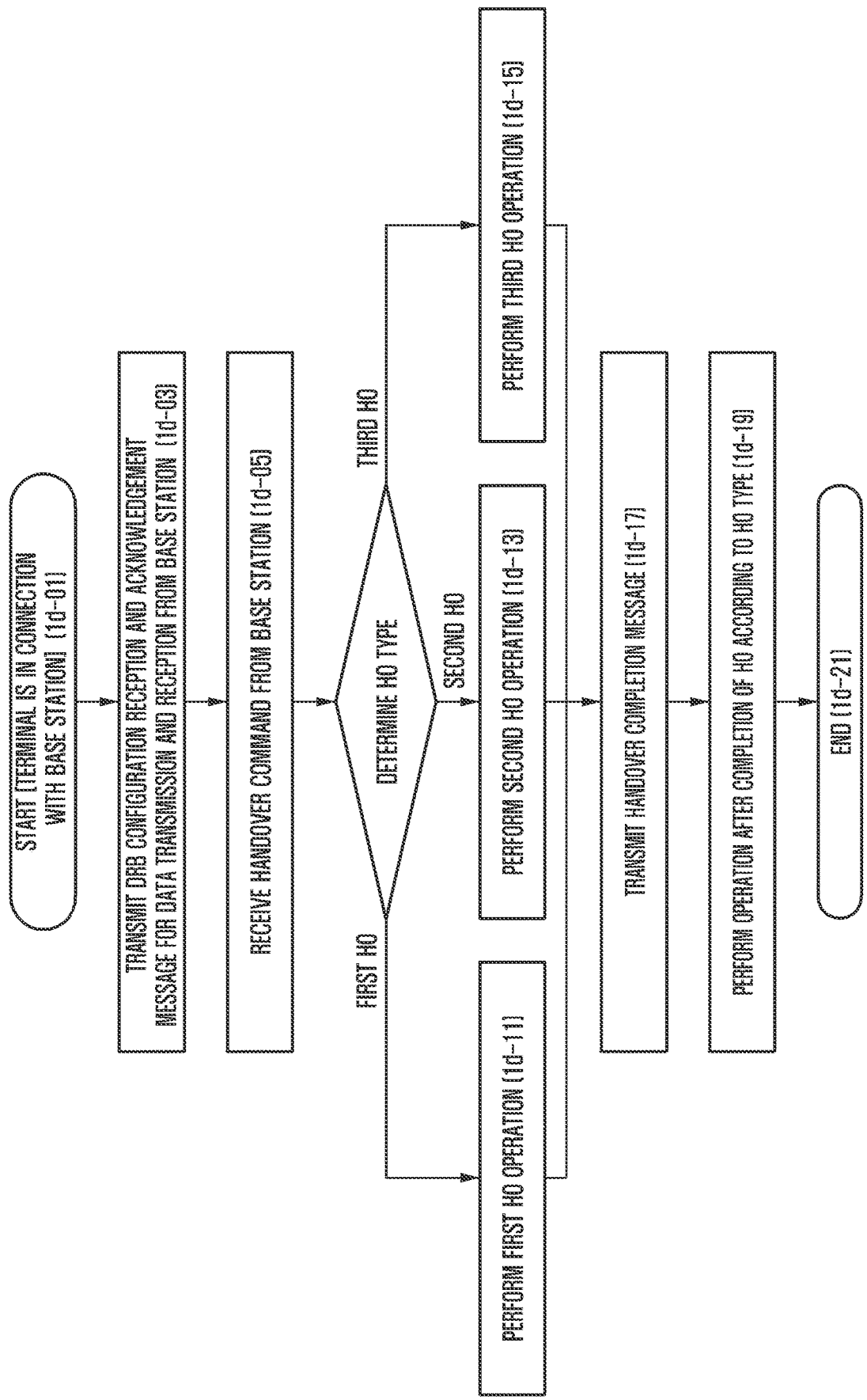

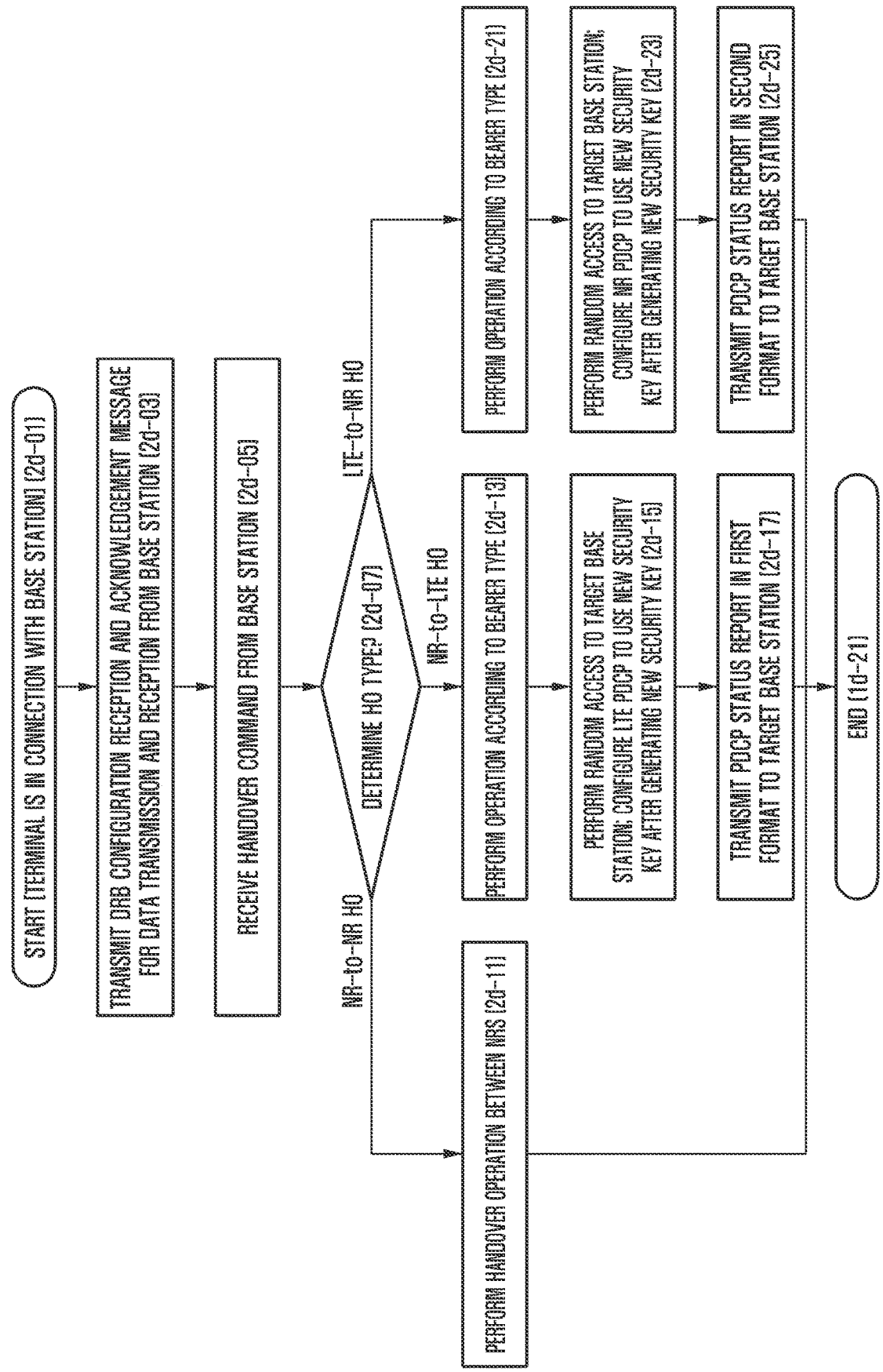

METHOD AND DEVICE FOR PERFORMING IMPROVED COMMUNICATION IN WIRELESS COMMUNICATION SYSTEM

CROSS-REFERENCE TO RELATED APPLICATION(S)

This application is a continuation application of prior application Ser. No. 16/485,652, filed on Aug. 13, 2019, which has issued as U.S. Pat. No. 11,115,875 on Sep. 7, 2021, and which is a U. S. National Stage application under 35 U.S.C. § 371 of an International application number PCT/KR2018/001173, filed on Jan. 26, 2018, which is based on and claims priority of a Korean patent application number 10-2017-0019575, filed on Feb. 13, 2017, in the Korean Intellectual Property Office, the disclosure of which is incorporated by reference herein in its entirety.

TECHNICAL FIELD

The disclosure relates to a method for performing different handover operations according to the type of base station in a wireless communication system.

In addition, the disclosure relates to radio link failure in the case of applying multiple connections in a next-generation mobile communication system.

In addition, the disclosure relates to discontinuous reception (DRX) and paging establishment in a next-generation mobile communication system.

In addition, the disclosure relates to system information update in a next-generation mobile communication system.

BACKGROUND ART

To meet the demand for wireless data traffic, which has increased since the commercialization of 4G communication systems, efforts have been made to develop an improved 5G communication system or a pre-5G communication system. Therefore, the 5G communication system or the pre-5G communication system is called a "beyond-4G-network communication system" or a "post-LTE system". Consideration is being given to implementation of the 5G communication system in super-high-frequency (mmWave) bands (e.g., a 60 GHz band) so as to accomplish higher data rates. In order to reduce pathloss of radio waves and increase the propagation distance of radio waves in super-high-frequency bands, techniques, such as beamforming, massive multiple-input multiple-output (MIMO), full-dimensional MIMO (FD-MIMO), array antennas, analog beamforming, and large-scale antennas, are being discussed in 5G communication systems. In addition, development is under-way for system network improvement in 5G communication systems based on evolved small cells, advanced small cells, cloud radio access networks (cloud RANs), ultra-dense networks, device-to-device (D2D) communication, wireless backhaul, moving networks, cooperative communication, coordinated multi-point (CoMP), reception-end interference cancellation, and the like. Furthermore, in the 5G system, hybrid FSK and QAM modulation (FQAM) and sliding window superposition coding (SWSC), as advanced coding modulation (ACM), and filter bank multi-carrier (FBMC), non-orthogonal multiple access (NOMA), and sparse code multiple access (SCMA), as advanced access technologies, are being developed.

Meanwhile, the Internet, which to date has been a human-centered connectivity network in which humans generate and consume information, is now evolving to the Internet of things (IoT), where distributed entities, or "things", exchange and process information. The Internet of everything (IoE), which is a combination of IoT technology and big-data processing technology through connection with a cloud server, has emerged. As technology elements, such as sensing technology, wired/wireless communication and network infrastructure, service interface technology, and security technology, have been demanded for IoT implementation, techniques for connecting things, such as a sensor network, machine-to-machine (M2M) communication, machine-type communication (MTC), and the like, have been recently researched. An IoT environment may provide intelligent Internet technology (IT) services that create new value in people's lives by collecting and analyzing data generated from connected things. The IoT may be applied to a variety of fields, such as those of smart homes, smart buildings, smart cities, smart cars or connected cars, smart grids, healthcare, smart appliances, and advanced medical services, through convergence and combination between existing information technology (IT) and various industries.

In line with this, various attempts have been made to apply 5G communication systems to IoT networks. For example, technologies, such as a sensor network, machine-to-machine (M2M) communication, machine-type communication (MTC), and the like, are being implemented using 5G communication techniques, such as beamforming, MIMO, array antennas, and the like. The application of a cloud radio access network (cloud RAN) as the above-described big-data processing technology may also be considered as an example of convergence between the 5G technology and the IoT technology.

Meanwhile, during communication between a terminal and a base station, a current base station (a serving cell) may determine handover in which a terminal moves from the current base station to another base station according to signal-strength/quality information of the current base station and neighboring base stations, which is reported by the terminal due to the movement of the terminal or the like. In this case, since there may be various kinds of base stations, the terminal requires different operations for performing handover with respect to the different kinds of base stations.

DISCLOSURE OF INVENTION

Technical Problem

It is an aspect of the disclosure to provide a method of processing data without loss even when different handover operations are performed according to the type of base station in a wireless communication system.

In addition, another aspect of the disclosure is to provide a method for processing data without loss when performing handover between heterogeneous systems, such as handover from LTE to new radio (NR) or handover from NR to LTE, in a wireless communication system.

In addition, another aspect of the disclosure is to provide a new procedure capable of collectively considering the performance of a plurality of radio links, unlike in the conventional LTE, in the case of employing a multi-connection in which a master base station and an auxiliary base station may transmit and receive duplicate data.

In addition, another aspect of the disclosure is to propose a procedure in which the base station configures a discontinuous reception (DRX) cycle and an operation of the terminal according to the type of paging when the terminal in an inactive radio resource control (RRC) state applies the DRX.

Further, another aspect of the disclosure is to provide a method for updating system information in a next-generation mobile communication system.

Solution to Problem

According to embodiments of the disclosure, a method for updating system information of a terminal may include: acquiring first system information and second system information from the first cell; starting a timer corresponding to the second system information; if the terminal moves from the first cell to a second cell, determining whether the second cell shares the second system information with the first cell; and updating the second system information based on the determination result.

In addition, according to embodiments of the disclosure, a terminal may include: a transceiver configured to transmit and receive signals; and a controller configured to acquire first system information and second system information from a first cell, start a timer corresponding to the second system information, if the terminal moves from the first cell to a second cell, determine whether the second cell shares the second system information with the first cell, and update the second system information based on the determination result.

Advantageous Effects of Invention

According to an embodiment of the disclosure, the terminal performs different handover operations according to the type of base station, thereby reducing packets lost during handover.

In addition, according to another embodiment of the disclosure, it is possible to prevent data loss even when the terminal performs handover to a base station of a heterogeneous system.

In addition, according to another embodiment of the disclosure, in the case of using a multi-connection in a next-generation mobile communication system, it is possible to stably support a connection state between the terminal and the base station by specifying a radio link failure declaration procedure.

In addition, according to another embodiment of the disclosure, it is possible to solve a security problem that may occur in the case where the base station independently generates paging.

In addition, according to another embodiment of the disclosure, it is possible to efficiently update system information according to a change in the cell to which the terminal belongs.

BRIEF DESCRIPTION OF DRAWINGS

FIG. 1D is a diagram illustrating the operation of a terminal according to an embodiment of the disclosure.

FIG. 2D is a diagram illustrating the operation of a terminal according to an embodiment of the disclosure.

FIG. 3I is a block diagram illustrating the structure of a terminal according to an embodiment of the disclosure.

FIG. 4I is a block diagram illustrating the configuration of a base station according to an embodiment of the disclosure.

MODE FOR THE INVENTION

Figure 1A:
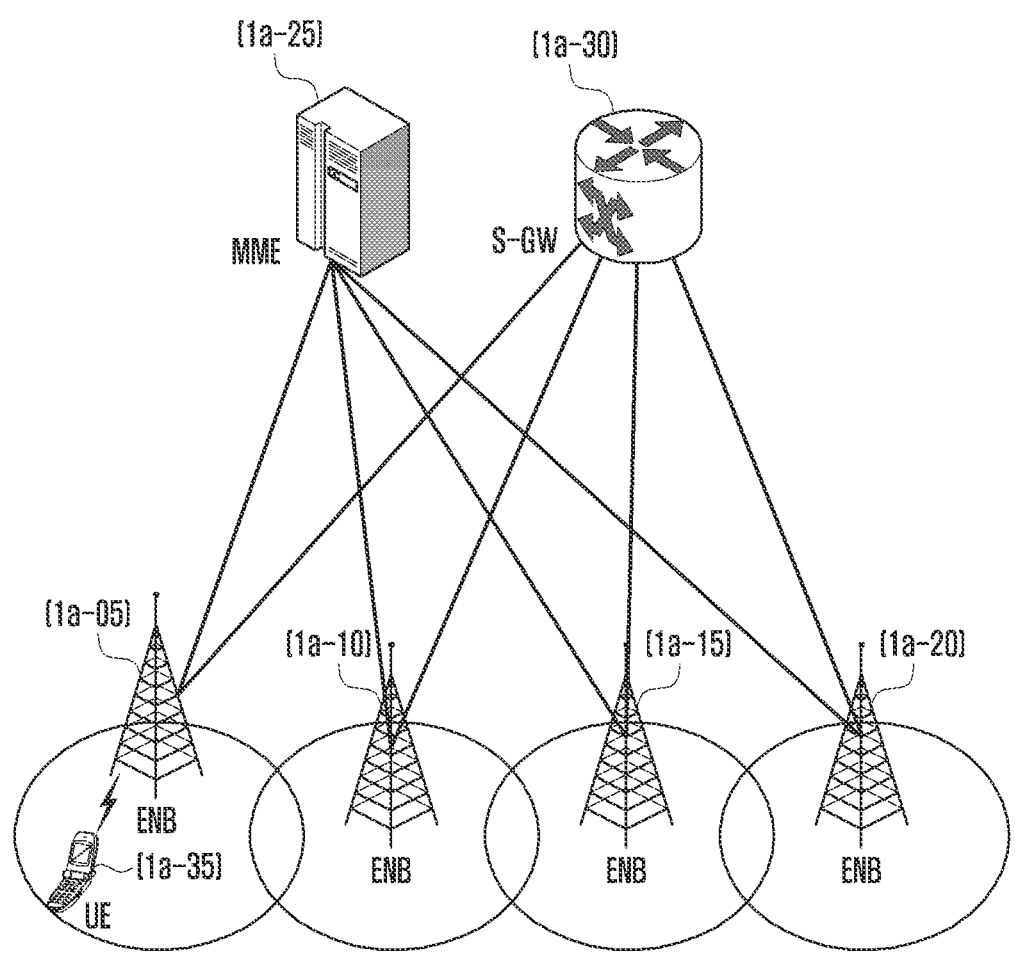
FIG. 1A is a diagram illustrating the structure of an LTE system according to an embodiment of the disclosure.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

First Embodiment

Hereinafter, terms for identifying connection nodes, terms referring to network entities, terms referring to messages, terms referring to interfaces between network entities, terms referring to a variety of identification information, and the like will be used as examples for the convenience of explanation. Therefore, the disclosure is not limited to the terms used herein, and other terms referring to objects having equivalent technical meanings may be used.

For the convenience of explanation, terms and names defined in the 3rd generation partnership project long-term evolution (3GPP LTE) standard, which is the latest communication standard, among existing communication standards, will be used in the disclosure. However, the disclosure is not limited to the above-mentioned terms and names, and the disclosure may be applied to systems conforming to other standards in the same manner. In particular, the disclosure is applicable to 3GPP New Radio (NR) (5th generation mobile communication standard).

FIG. 1A is a diagram illustrating the structure of an LTE system according to an embodiment of the disclosure.

Referring to FIG. 1A, the wireless communication system includes a plurality of base stations 1a-05, 1a-10, 1a-15, and 1a-20, a mobility management entity (MME) 1a-20, and a serving gateway (S-GW) 1a-30. User equipment (hereinafter, referred to as "UE" or a "terminal") 1a-35 accesses an external network through the base stations 1a-05, 1a-10, 1a-15, and 1a-20 and the S-GW 1a-30.

The base stations 1a-05, 1a-10, 1a-15, and 1a-20 provide wireless access to terminals accessing the network as access nodes of a cellular network. That is, in order to serve traffic of users, the base stations 1a-05, 1a-10, 1a-15, and 1a-20 collect status information, such as buffer status, available transmission power status, channel status, and the like of terminals, and perform scheduling, thereby supporting connection between the terminals and a core network (CN). The MME 1a-25 performs various control functions, as well as a mobility management function for a terminal, and is connected to a plurality of base stations. The S-GW 1a-30 provides data bearers. In addition, the MME 1a-25 and the S-GW 1a-30 may further perform authentication and bearer management for the terminal accessing the network, and may process packets received from the base stations 1a-05, 1a-10, 1a-15, and 1a-20 or packets to be transmitted to the base stations 1a-05, 1a-10, 1a-15, and 1a-20.

Figure 1B:
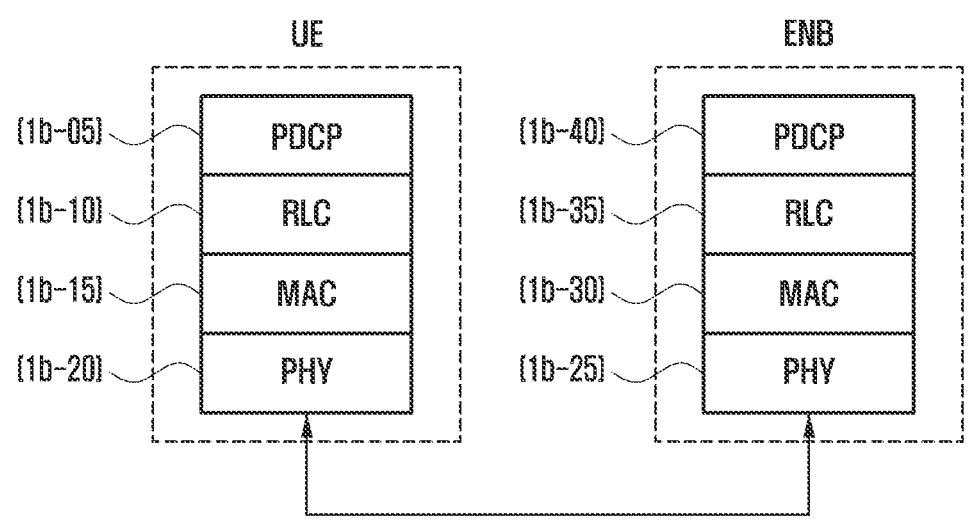
FIG. 1B is a diagram illustrating a wireless protocol structure of an LTE system according to an embodiment of the disclosure.

FIG. 1B is a diagram illustrating a wireless protocol structure of an LTE system according to an embodiment of the disclosure. The wireless protocol structure in the drawing may be different, in part, from that of an NR system, which will be defined later, but will be described for the convenience of explanation of the disclosure.

Referring to FIG. 1B, the wireless protocol of the LTE system includes a packet data convergence protocol (PDCP) 1b-05 or 1b-40, a radio link control (RLC) 1b-10 or 1b-35, and a medium access control (MAC) 1b-15 or 1b-30 in a terminal and an ENB, respectively. The packet data convergence protocol (PDCP) 1b-05 or 1b-40 performs operations, such as IP header compression/decompression and the like, and the radio link control (hereinafter, also referred to as "RLC") 1b-10 or 1b-35 reconfigures a PDCP PDU (packet data unit) to an appropriate size. The MAC 1b-15 or 1b-30 is connected to a plurality of RLC entities configured in a single terminal, multiplexes RLC PDUs into MAC PDUs, and demultiplexes RLC PDUs from MAC PDUs. The physical (PHY) layer 1b-20 or 1b-25 channel-codes and modulates higher layer data, and converts the same into OFDM symbols to then be transmitted through a wireless channel, or demodulates OFDM symbols received through a wireless channel and channel-decodes the same to then be transmitted to higher layers. In addition, hybrid ARQ (HARQ) is also used for additional error correction in the physical layer 1b-20 or 1b-25, and a receiving end transmits 1 bit of information indicating whether a packet transmitted from a transmitting end has been received. This is called HARQ ACK/NACK information. Downlink HARQ ACK/NACK information with respect to uplink transmission may be transmitted through a physical hybrid-ARQ indicator channel (PHICH), and uplink HARQ ACK/NACK information with respect to downlink transmission may be transmitted through a physical uplink control channel (PUCCH) or a physical uplink shared channel (PUSCH).

Although not shown in the drawing, a radio resource control (hereinafter, referred to as "RRC") layer exists in the higher layer of the PDCP layer of the terminal and the base station, respectively. The RRC layer may transmit and receive access/measurement-related configuration control messages for radio resource control. For example, it is possible to instruct the terminal to perform measurement using an RRC layer message, and the terminal may report a measurement result to the base station using an RRC layer message.

Figure 1C:
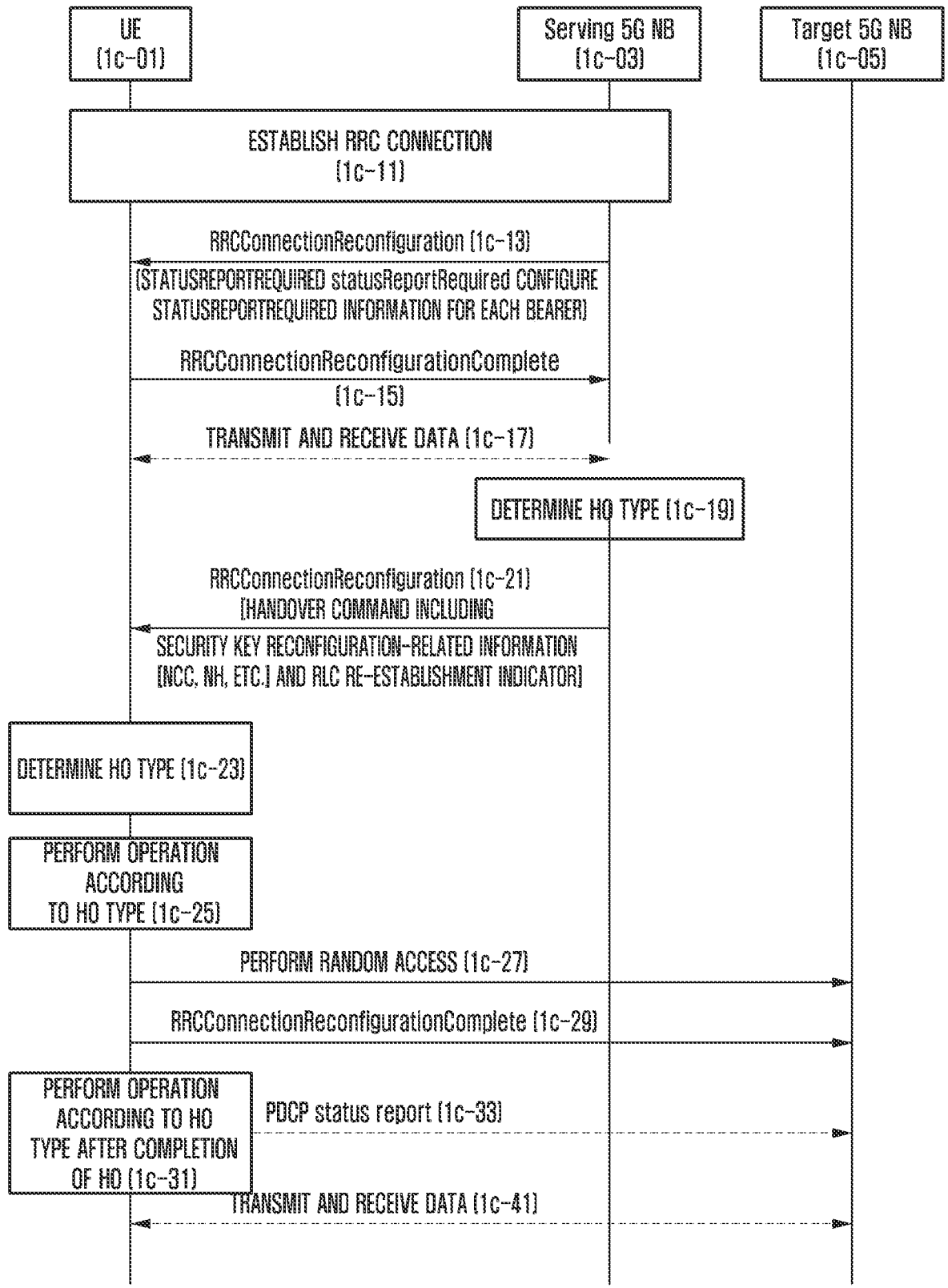
FIG. 1C is a diagram illustrating a message flow between a terminal and a base station according to an embodiment of the disclosure.

FIG. 1C is a diagram illustrating a message flow between a terminal and a base station when using a handover method according to an embodiment of the disclosure.

In FIG. 1C, the terminal 1c-01 in an idle mode (RRC IDLE) accesses a base station upon generation of transmission data or the like (1c-11). Data cannot be transmitted in the idle mode because the terminal is disconnected from a network to save power or the like. Thus, switching to a connected mode (RRC_CONNECTED) is required in order to transmit data. If the terminal 1c-01 is successfully connected to the base station 1c-03, the terminal 1c-01 switches to a connected mode (RRC_CONNECTED), then the base station 1c-03 configures data radio bearers (DRBs) to the terminal 1c-01 for data transmission and reception (1c-13), and the terminal 1c-01 transmits an acknowledgement message thereof to the base station 1c-03 (1c-15), so that the terminal 1c-01 in the connected mode is capable of transmitting and receiving data to and from the base station 1c-03 (1c-17). In order to configure the DRB, an "RRCConnectionReconfiguration" message of the RRC layer may be used, and an "RRCConnectionReconfigurationComplete" message may be used as the acknowledgement message. In addition, the DRB configuration may include configuration information of the PDCP and RLC layers for each bearer. More specifically, the DRB configuration may indicate the operation mode of the RLC layer {more specifically, an acknowledgement mode (AM) and an unacknowledgement mode (UM)} and the like, and the configuration information of the PDCP layer may include an indicator indicating whether a status report is required to be transmitted after handover or when reconfiguring the PDCP layer for each bearer. That is, "statusReportRequired" information is included in PDCP-config. The bearer for which the PDCP status report is required to be transmitted as described above is referred to as a "first bearer". That is, "statusReportRequired" is configured as "TRUE" with respect to the first bearer. "StatusReportRequired" may be configured only for RLC-AM that may perform retransmission when data is lost.

During the communication between the terminal 1c-01 and the base station 1c-03, the current base station (a serving cell) 1c-03 may determine handover in which the terminal 1c-01 moves to another base station 1c-05 according to signal-strength/quality information of the current base station 1c-03 and a neighboring base station 1c-05, which is reported by the terminal 1c-01 due to movement of the terminal 1c-01 or the like (1c-19).

Meanwhile, NR may have various types of base stations. In the existing LTE system, the base station called "eNB" has all of the MAC, RLC, PDCP, and RRC layers described in FIG. 1B above. On the other hand, in the NR system, like the eNB, gNB may include all the functions. Alternatively, the gNB may be divided into a central unit (CU) and a distributed unit (DU), and the MAC, RLC, PDCP, and RRC layers may be logically separated into the CU and DU. FIG. 1F describes the options for separating the CU and DU.

Referring to CU-DU separation option 2, RRC and PDCP exist in the CU, and RLC, MAC, and physical layers exist in the DU. Refer to CU-DU separation option 3, RRC, PDCP, and High-RLC exist in the CU, and Low-RLC, MAC, and physical layers exist in DU. The High-RLC includes a function of performing retransmission in the case of data loss, like the functions of ARQ and packet sequence reordering, among the functions of the RLC, and the low-RLC includes a function of segmenting or concatenating packets according to given transmission resources. Meanwhile, one CU may have one or more DUs, and thus only the DU may be changed while the CU remains according to the movement of the terminal.

Therefore, handover may be performed such that both the DU and the CU are changed or such that only the DU is changed without the CU remains according to the movement of the terminal. In addition, even in the case where only the DU is changed while the CU remains, operation is required to be performed differently according to the CU-DU separation options.

Accordingly, in the embodiment of the disclosure, the base station determines the terminal that is to perform handover and the handover to be performed. In the embodiment of the disclosure, handovers are classified as follows.

First handover: handover between gNBs (handover in which both CU and DU change)

Second handover: RLC movement (relocation) handover in gNB (HO under the same base station. RLC is changed after HO: i.e., handover in which CU does not change but DU changes because gNB has the structure of option 2, and PDCP is not changed)

Third handover: RLC-fixed handover in gNB (HO under the same base station. The same RLC is used even after HO: i.e., handover in which CU does not change but DU changes because gNB has the structure of option 3)

The base station 1c-03 determines the type of handover according to the above classification, and the base station 1c-03 transmits a handover command to the terminal 1c-01 according thereto (1c-21). The handover command may be transmitted through an "RRCConnectionReconfiguration" message of the RRC layer, and the handover command message includes mobility control information (MCI) (MobilityControlInfo) indicating the base station to which the handover is directed. Further, the RRC message may or may not include the following information according to the type of handover.

Security key reconfiguration-related information: This includes counter information for generating a new key.

RLC re-establishment indicator: This is an indicator indicating whether RLC re-establishment is necessary.

The terminal 1c-01 having received the handover command determines the type of handover indicated by the base station 1c-03, among the types of handover described above (1c-23). In the embodiment of the disclosure, the terminal 1c-01, if there is security key reconfiguration-related information, may determine that the first handover is indicated, if there is no security key reconfiguration-related information and if there is an RLC re-establishment indicator, may determine that the second handover is indicated, and if there is no security key reconfiguration-related information and if there is no RLC re-establishment indicator, may determine that the third handover is indicated.

Thereafter, the terminal 1c-01 receives a synchronization signal of a target cell 1c-05 indicated by the RRC message, performs synchronization, and initializes the MAC layer of the terminal 1c-01. This is due to the fact that the MAC layer is directed to a new base station (or a new DU) in all types of handover.

In addition, the terminal 1c-01 performs an operation to conform to the type of handover according to the determination result (1c-25). More specifically, PDCP re-establishment and RLC re-establishment are performed in the case of the first handover, the PDCP is maintained and RLC re-establishment is performed in the case of the second handover, and the PDCP and the RLC are maintained without re-establishment in the case of third handover.

In addition, the terminal 1c-01 applies a terminal identifier (C-RNTI for the LTE standard) in the target base station 1c-05, which is received through the handover command, performs update with a new security key according to the received information in the case of the first handover, and maintains the secret key of the existing base station 1c-03 (which has been used in the existing CU) in the case of the second handover or the third handover.

Thereafter, the terminal 1c-01 performs random access to the target base station 1c-05, performs uplink synchronization with the base station 1c-05, receives uplink resource allocation from the target base station 1c-05 (1c-27), and transmits an RRC message confirming completion of handover to the target base station 1c-05, based on the allocated resources (1c-29). The RRC message may be an "RRCConnectionReconfigurationComplete message".

The terminal 1c-01 performs an operation according to the type of handover after the completion of handover (1c-31). More specifically, in the case of the first handover, the terminal 1c-01 generates a PDCP status report for the first bearer and transmits the same to the base station 1c-05 (1c-33). The PDCP status report is intended to inform the base station 1c-05 of the received packets because packets may be lost during the handover of the terminal 1c-01, and thus the base station 1c-05 may retransmit the lost packets.

In addition, in the case of the second handover, the terminal 1c-01 also generates a PDCP status report for the first bearer and transmits the same to the base station 1c-05. This is due to the fact that there is still the possibility in which the terminal 1天-01 may lose packets due to the movement of the RLC to the target base station 1天-05.

On the other hand, in the case of the third handover, the terminal 1c-01 does not generate a PDCP report even for the first bearer. This is due to the fact that the RLC re-establishment is not performed because the high RLC still remains in the case of the third handover, and that a separate PDCP status report is not required to be retransmitted because the high RLC has a function of performing recovery in case of data loss such as ARQ. Accordingly, the base station may retransmit the data that the terminal 1c-01 failed to receive, and then terminal 1c-01 may transmit/receive data to/from the target base station 1c-05 (1c-41).

FIG. 1D is a diagram illustrating the operation sequence of a terminal according to an embodiment of the disclosure.

In FIG. 1D, it is assumed that the terminal is in a connected mode (RRC_CONNECTED) (1d-01). Thereafter, the terminal receives, from the base station, configuration of a data radio bearer (DRB) for data transmission and reception, transmits, to the base station, an acknowledgement message in response thereto, so that the terminal in the connected mode is able to transmit and receive data to and from the base station (1d-03). In order to configure the DRB, an "RRCConnectionReconfiguration" message of the RRC layer may be used, and an "RRCConnectionReconfigurationComplete" message may be used as the acknowledgement message. In addition, the DRB configuration may include configuration information of the PDCP and RLC layers for each bearer. More specifically, the DRB configuration may indicate the operation mode of the RLC layer {e.g., an acknowledgement mode (AM) and an unacknowledgement mode (UM)} and the like, and the configuration information of the PDCP layer may include an indicator indicating whether a status report is required to be transmitted after handover or when reconfiguring the PDCP layer for each bearer. That is, "statusReportRequired" information is included in PDCP-config. The bearer for which the PDCP status report is required to be transmitted as described above is referred to as a "first bearer". That is, "statusReportRequired" is configured as "TRUE" with respect to the first bearer. "StatusReportRequired" may be configured only for RLC-AM that may perform retransmission when data is lost.

Thereafter, the terminal may receive a handover command from the base station due to movement of the terminal or the like (1d-05). As described above, NR may have various kinds of base stations, and thus handovers are classified as follows in the disclosure.

First handover: handover between gNBs (handover in which both CU and DU change)

Second handover: RLC movement (relocation) handover in gNB (HO under the same base station. RLC is changed after HO: i.e., handover in which CU does not change but DU changes because gNB has the structure of option 2, and PDCP is not changed)

Third handover: RLC-fixed handover in gNB (HO under the same base station. The same RLC is used even after HO: i.e., handover in which CU does not change but DU changes because gNB has the structure of option 3)

The handover command may be transmitted through the "RRCConnectionReconfiguration" message of the RRC layer, and the handover command message includes mobility control information (MCI) (MobilityControlInfo) indicating the base station to which the handover is directed. Further, the RRC message may or may not include the following information according to the type of handover.

Security key reconfiguration-related information: This includes counter information for generating a new key.

RLC re-establishment indicator: This is an indicator indicating whether RLC re-establishment is necessary.

The terminal having received the handover command determines the type of handover indicated by the base station, among the types of handover described above (1d-07). In the embodiment of the disclosure, the terminal, if there is security key reconfiguration-related information, may determine that the first handover is indicated, if there is no security key reconfiguration-related information and if there is an RLC re-establishment indicator, may determine that the second handover is indicated, and if there is no security key reconfiguration-related information and if there is no RLC re-establishment indicator, may determine that the third handover is indicated.

According to the determination result above, the terminal performs an operation conforming to the type of handover (1d-11, 1d-13, and 1d-15). More specifically, in all types of handover, the terminal receives a synchronization signal of a target cell indicated by the RRC message, performs synchronization, and initializes the MAC layer of the terminal. Thereafter, PDCP re-establishment and RLC re-establishment are performed in the case of the first handover, the PDCP is maintained and RLC re-establishment is performed in the case of the second handover, and the PDCP and the RLC are maintained without re-establishment in the case of third handover.

In addition, the terminal applies a terminal identifier (C-RNTI for the LTE standard) in the target base station, which is received through the handover command, to the respective types of handover. The terminal generates a new security key according to the received information in the case of the first handover, and maintains the secret key of the existing base station (which has been used in the existing CU) in the case of the second handover or the third handover.

Thereafter, the terminal performs random access to the target base station, performs uplink synchronization with the base station, receives uplink resource allocation from the target base station, and transmits an RRC message confirming completion of handover to the base station using the allocated resources (1d-17). The RRC message may be an "RRCConnectionReconfigurationComplete" message.

Thereafter, the terminal performs an operation according to the type of handover after the completion of handover (1d-19). More specifically, in the case of the first handover, the terminal generates a PDCP status report for the first bearer and transmits the same to the base station (1d-33). The PDCP status report is intended to inform the base station of the received packets because packets may be lost in the process of the handover of the terminal, and thus the base station may retransmit the lost packets. In addition, in the case of the second handover, the terminal also generates a PDCP status report for the first bearer and transmits the same to the base station. This is due to the fact that there is still the possibility in which the terminal may lose packets due to the movement of the RLC to the target base station. On the other hand, in the case of the third handover, the terminal does not generate a PDCP report even for the first bearer. This is due to the fact that the RLC re-establishment is not performed because the high RLC still remains in the case of the third handover, and that a separate PDCP status report is not required to be retransmitted because the high RLC has a function of performing recovery in case of data loss such as ARQ. Accordingly, the base station may retransmit the data that the terminal failed to receive, and then terminal may transmit/receive data to/from the target base station.

Figure 1E:
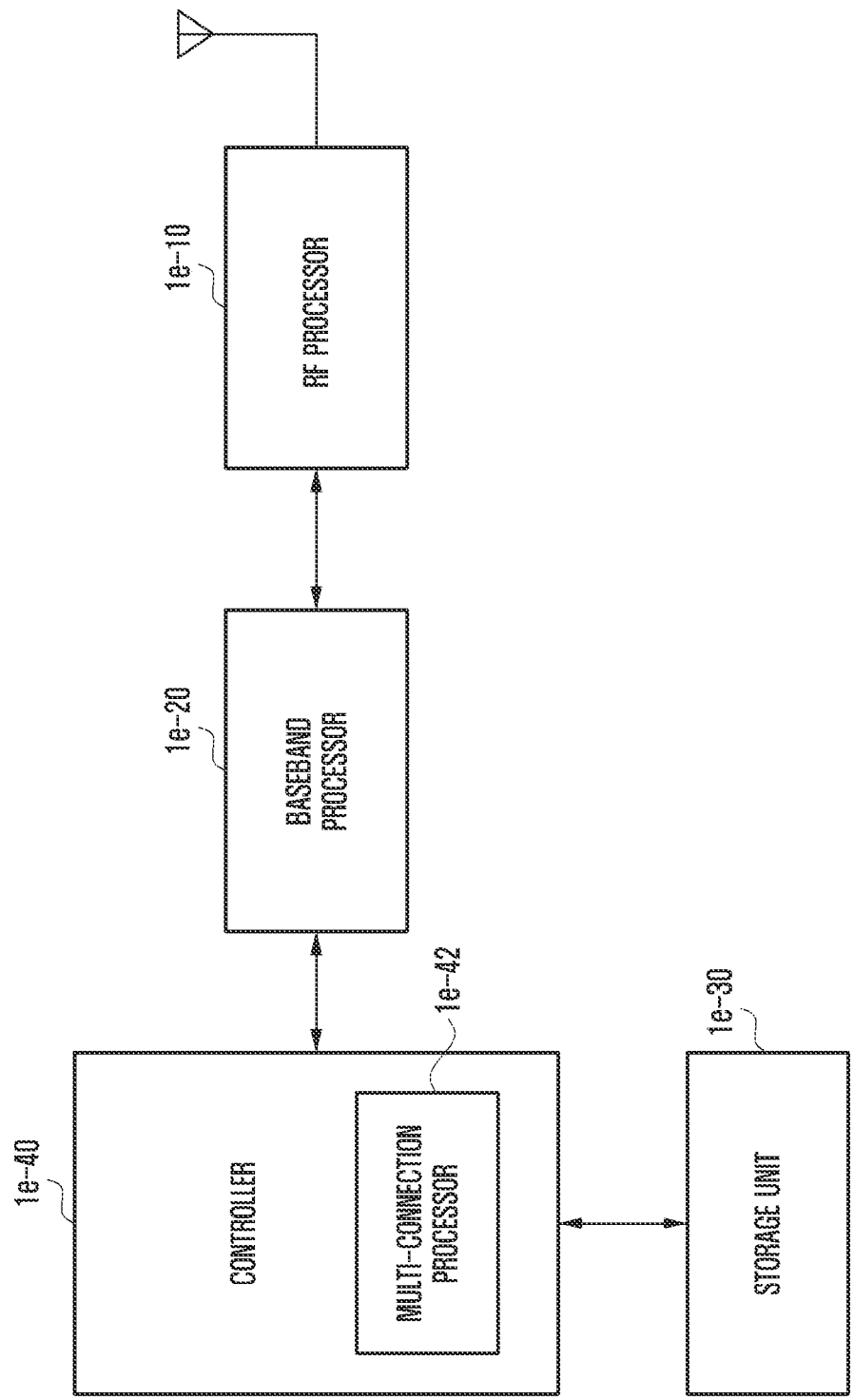
FIG. 1E is a block diagram illustrating the configuration of a terminal according to an embodiment of the disclosure.
Figure 1F:
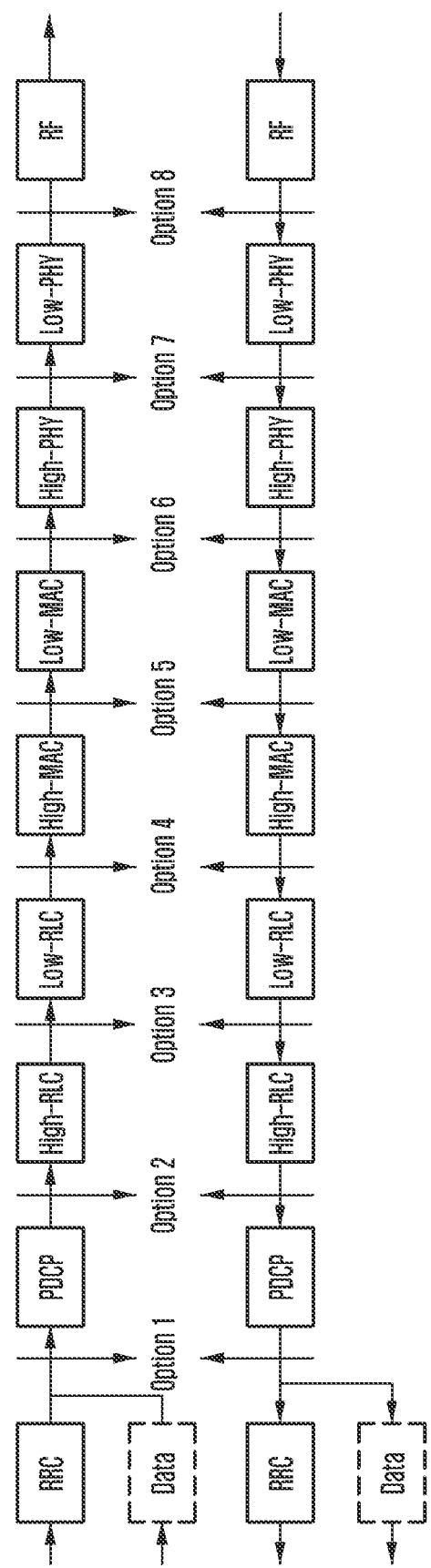
FIG. 1F is a diagram illustrating options for separating a central unit (CU) and a distributed unit (DU) according to an embodiment of the disclosure.

FIG. 1E is a block diagram illustrating the configuration of a terminal according to an embodiment of the disclosure.

Referring to FIG. 1E, the terminal includes a radio frequency (RF) processor 1e-10, a baseband processor 1e-20, a storage unit 1e-30, and a controller 1e-40.

The RF processor 1e-10 performs a function of transmitting and receiving a signal through a wireless channel, such as band conversion and amplification of a signal. That is, the RF processor 1e-10 up-converts a baseband signal provided from the baseband processor 1e-20 to an RF band signal to thus transmit the same through an antenna and down-converts an RF band signal received through the antenna to a baseband signal. For example, the RF processor 1e-10 may include a transmission filter, a reception filter, an amplifier, a mixer, an oscillator, a digital-to-analog converter (DAC), an analog-to-digital converter (ADC), and the like. Although only one antenna is illustrated in FIG. 1E, the terminal may have a plurality of antennas. In addition, the RF processor 1e-10 may include a plurality of RF chains. Further, the RF processor 1e-10 may perform beamforming. To perform beamforming, the RF processor 1e-10 may adjust the phases and magnitudes of signals transmitted and received through a plurality of antennas or antenna elements.

The baseband processor 1e-20 performs a function of conversion between a baseband signal and a bit string according to the physical layer specification of the system. For example, in the case of data transmission, the baseband processor 1e-20 encodes and modulates transmission bit strings, thereby generating complex symbols. In addition, upon receiving data, the baseband processor 1e-20 demodulates and decodes a baseband signal provided from the RF processor 1e-10 to thus recover reception bit strings. For example, in the case where an orthogonal frequency division multiplexing (OFDM) scheme is applied, when transmitting data, the baseband processor 1e-20 generates complex symbols by encoding and modulating transmission bit strings, maps the complex symbols with subcarriers, and then configures OFDM symbols through an inverse fast Fourier transform (IFFT) operation and cyclic prefix (CP) insertion. In addition, when receiving data, the baseband processor 1e-20 divides the baseband signal provided from the RF processor 1e-10 into OFDM symbol units, restores the signals mapped with the subcarriers through a fast Fourier transform (FFT) operation, and then restores reception bit strings through demodulation and decoding.

The baseband processor 1e-20 and the RF processor 1e-10 transmit and receive signals as described above. Accordingly, the baseband processor 1e-20 and the RF processor 1e-10 may be referred to as a "transmitter", a "receiver", a "transceiver", or a "communication unit". Further, at least one of the baseband processor 1e-20 and the RF processor 1e-10 may include different communication modules to process signals of different frequency bands. The different frequency bands may include super-high frequency (SHF) (e.g., 2.5 GHz or 5 GHz) bands and millimeter wave (e.g., 60 GHz) bands.

The storage unit 1e-30 stores data such as basic programs, application programs, and configuration information for the operation of the terminal.

The controller 1e-40 controls the overall operation of the terminal. For example, the controller 1e-40 transmits and receives signals through the baseband processor 1e-20 and the RF processor 1e-10. In addition, the controller 1e-40 records and reads data in and from the storage unit 1e-30. To this end, the controller 1e-40 may include at least one processor. For example, the controller 1e-40 may include a communication processor (CP) for controlling communication and an application processor (AP) for controlling higher layers such as application programs. According to an embodiment of the disclosure, the controller 1e-40 may include a multi-connection processor 1e-42 for performing a process for operation in a multi-connected mode. For example, the controller 1e-40 may perform control such that the terminal performs the operations illustrated in FIG. 1E.

According to an embodiment of the disclosure, the terminal may separately perform handover operations according to handover commands received from the base station, thereby securing communication without data loss even when performing handover to different types of base stations.

Methods according to the claims of the disclosure or the embodiments described in the specification may be implemented in hardware, software, or a combination thereof.

When the methods are implemented in software, a computer-readable storage medium storing one or more programs (software modules) may be provided. One or more programs stored in a computer-readable storage medium are configured to be executed by one or more processors in an electronic device. One or more programs include instructions that allow the electronic device to execute the methods according to the claims of the disclosure or the embodiments described in the specification.

These programs (software modules or software) may be stored in random access memory, non-volatile memory including flash memory, ROM (read-only memory), EEPROM (electrically erasable programmable read-only memory), magnetic disc storage devices, CD-ROM (compact disk-ROM), DVDs (digital versatile discs), other types of optical storage devices, or magnetic cassettes. Alternatively, the programs may be stored in the memory configured as a combination of some or all of the same. In addition, a plurality of memories may be included.

In addition, the above programs may be stored in an attachable storage device that is accessible through a communication network, such as the Internet, an intranet, a LAN (local area network), a WLAN (wide LAN), or a SAN (storage area network), or a communication network configured as a combination thereof. Such a storage device may be connected to the device for performing the embodiments of the disclosure via an external port. Further, a separate storage device in the communication network may be connected to the device for performing the embodiments of the disclosure.

Second Embodiment

Hereinafter, the operational principle of the disclosure will be described in detail with reference to the accompanying drawings. Hereinafter, a detailed description of known functions and configurations incorporated herein will be omitted if the description obscures the subject matter of the disclosure. In addition, the terms used herein are defined in consideration of the functions of the disclosure, and may be changed according to the intention or practices of the user or the operator, or the like. Therefore, the definition should be based on the content throughout this specification.

Hereinafter, terms for identifying connection nodes, terms referring to network entities, terms referring to messages, terms referring to interfaces between network entities, terms referring to a variety of identification information, and the like will be used as examples for the convenience of explanation. Therefore, the disclosure is not limited to the terms used herein, and other terms referring to objects having equivalent technical meanings may be used.

For the convenience of explanation, in the disclosure, terms and names defined in the 3rd generation partnership project long-term evolution (3GPP LTE) standard, which is the latest communication standard, among existing communication standards, will be used. However, the disclosure is not limited to the above-mentioned terms and names, and the disclosure may be equally applied to systems conforming to other standards. In particular, the disclosure is applicable to 3GPP New Radio (NR) (5th generation mobile communication standard).

The disclosure relates to a method for performing handover between heterogeneous systems without data loss in a wireless communication system.

Figure 2A:
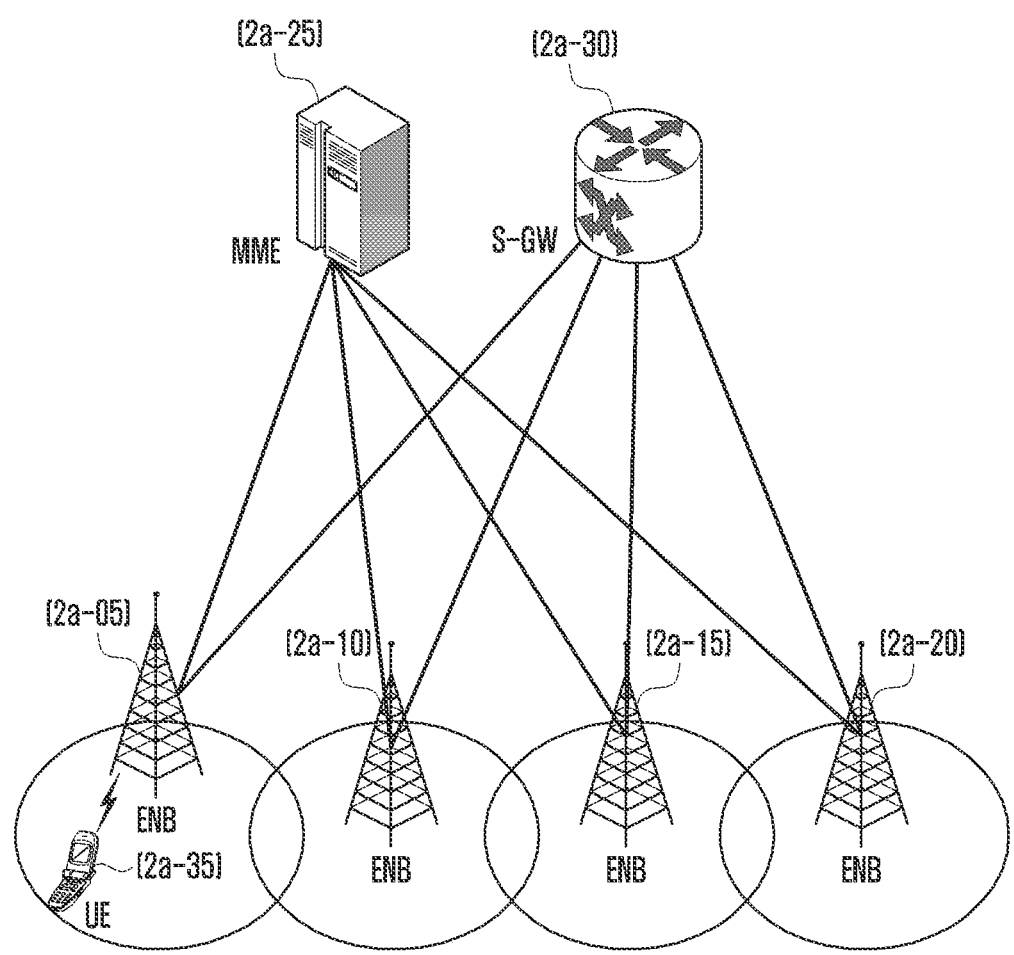
FIG. 2A is a diagram illustrating the structure of an LTE system according to an embodiment of the disclosure.

FIG. 2A is a diagram illustrating the structure of an LTE system according to an embodiment of the disclosure.

Referring to FIG. 2A, the wireless communication system includes a plurality of base stations 2a-05, 2a-10, 2a-15, and 2a-20, a mobility management entity (MME) 2a-25, and a serving gateway (S-GW) 2a-30. User equipment (hereinafter, referred to as "UE" or a "terminal") 2a-35 accesses an external network through the base stations 2a-05, 2a-10, 2a-15, and 2a-20 and the S-GW 2a-30.

The base stations 2a-05, 2a-10, 2a-15, and 2a-20 provide wireless access to terminals accessing the network as access nodes of a cellular network. That is, in order to serve traffic of users, the base stations 2a-05, 2a-10, 2a-15, and 2a-20 collect status information, such as buffer status, available transmission power status, channel status, and the like of terminals, and perform scheduling, thereby supporting connection between the terminals and a core network (CN). The MME 2a-25 performs various control functions, as well as a mobility management function for a terminal, and is connected to a plurality of base stations. The S-GW 2a-30 provides data bearers. The bearer is a logical path through which data passes, and there may be multiple bearers in one terminal. In addition, the MME 2a-25 and the S-GW 2a-30 may further perform authentication and bearer management for the terminal accessing the network, and may process packets received from the base stations 2a-05, 2a-10, 2a-15, and 2a-20 or packets to be transmitted to the base stations 2a-05, 2a-10, 2a-15, and 2a-20.

Figure 2B:
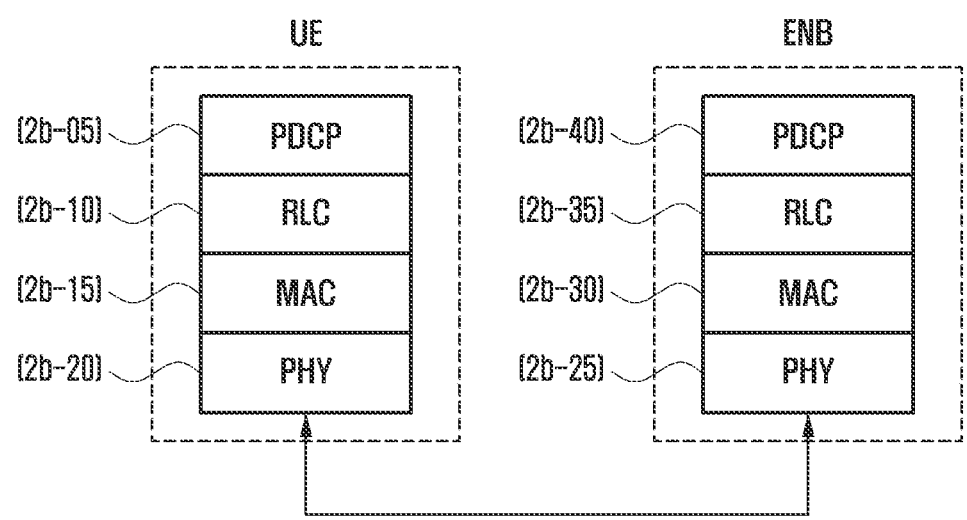
FIG. 2B is a diagram illustrating a wireless protocol structure of an LTE system according to an embodiment of the disclosure.

FIG. 2B is a diagram illustrating a wireless protocol structure of an LTE system according to an embodiment of the disclosure. The wireless protocol structure in the drawing may be different, in part, from that of NR, which will be defined later, but will be described for the convenience of explanation of the disclosure.

Referring to FIG. 2B, the wireless protocol of the LTE system includes a packet data convergence protocol (PDCP) 2b-05 or 2b-40, a radio link control (RLC) 2b-10 or 2b-35, and a medium access control (MAC) 2b-15 or 2b-30 in a terminal and an ENB, respectively. The packet data convergence protocol (PDCP) 2b-05 or 2b-40 performs operations, such as IP header compression/decompression and the like, and the radio link control (hereinafter, also referred to as "RLC") 2b-10 or 2b-35 reconfigures a PDCP PDU (packet data unit) to an appropriate size. In addition, an automatic repeat request (ARQ) operation for retransmission of data requiring reliability is also performed in the RLC layer, which is limited to a layer that operates in an acknowledgement mode (AM), among the RLC layers. An unacknowledgement mode (UM) is also defined as a corresponding concept. The MAC 2b-15 or 2b-30 is connected to a plurality of RLC entities configured in a single terminal, multiplexes RLC PDUs into MAC PDUs, and demultiplexes RLC PDUs from MAC PDUs. The physical layer 2b-20 or 2b-25 channel-codes and modulates higher layer data, and converts the same into OFDM symbols to then be transmitted through a wireless channel, or demodulates OFDM symbols received through a wireless channel and channel-decodes the same to then be transmitted to higher layers. In addition, hybrid ARQ (HARQ) is also used for additional error correction in the physical layer, and a receiving end transmits 1 bit of information indicating whether a packet transmitted from a transmitting end has been received. This is called HARQ ACK/NACK information. Downlink HARQ ACK/NACK information with respect to uplink transmission may be transmitted through a physical hybrid-ARQ indicator channel (PHICH), and uplink HARQ ACK/NACK information with respect to downlink transmission may be transmitted through a physical uplink control channel (PUCCH) or a physical uplink shared channel (PUSCH).

Although not shown in the drawing, a radio resource control (hereinafter, referred to as "RRC") layer exists in the higher layer of the PDCP layer of the terminal and the base station, respectively. The RRC layer may transmit and receive access/measurement-related configuration control messages for radio resource control. For example, it is possible to instruct the terminal to perform measurement using an RRC layer message, and the terminal may report a measurement result to the base station using an RRC layer message.

Figure 2C:
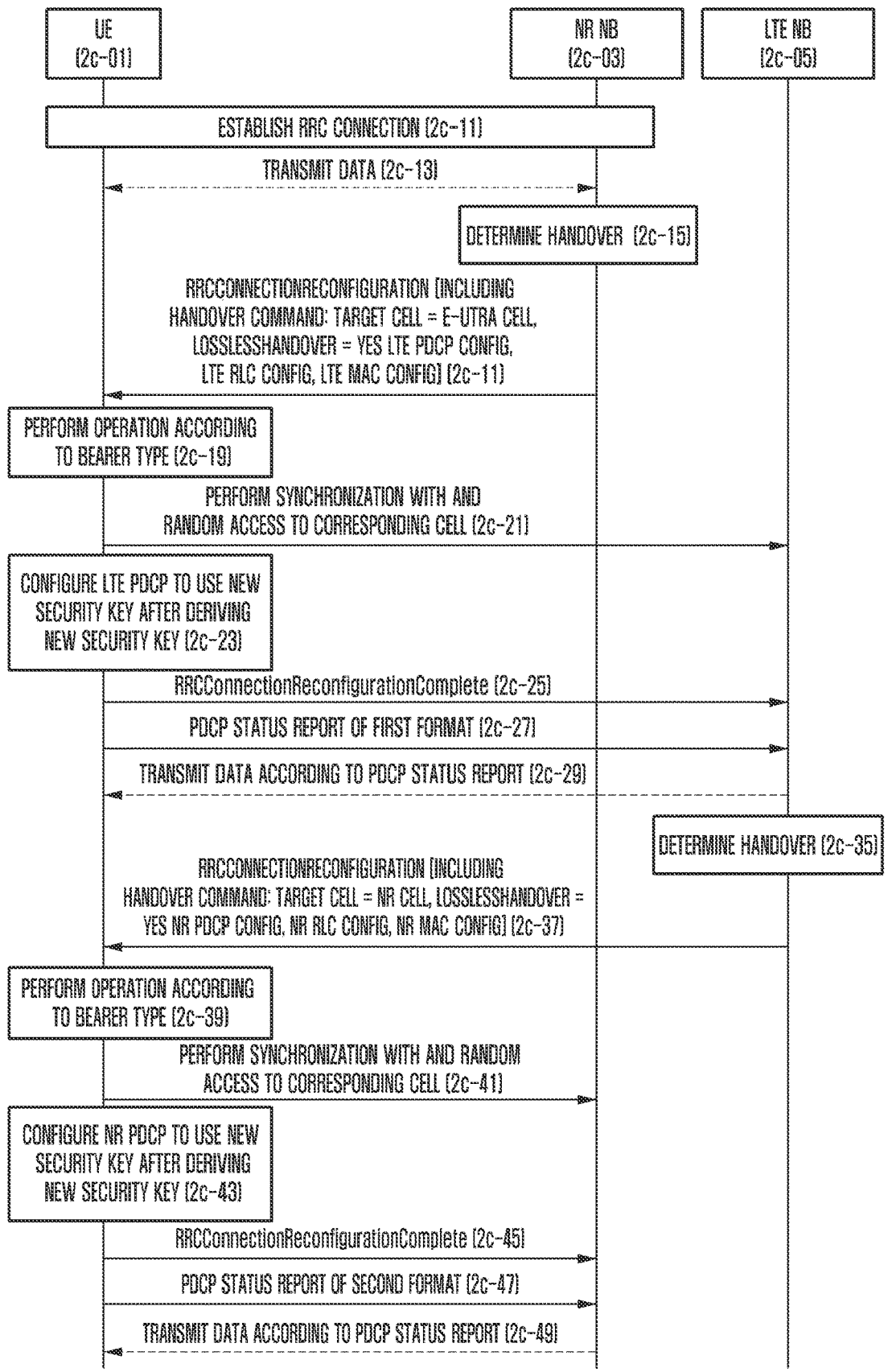
FIG. 2C is a diagram illustrating a message flow between a terminal and a base station according to an embodiment of the disclosure.

FIG. 2C is a diagram illustrating a message flow between a terminal and a base station when using a handover method between different systems, which is proposed in an embodiment of the disclosure.

In FIG. 2C, the terminal 2c-01 in an idle mode (RRC IDLE), which supports both NR and LTE, accesses a neighboring NR base station 2c-03 upon generation of transmission data or the like (2c-11). (Although it is assumed that the terminal accesses the NR base station for the convenience of explanation, the terminal may access an LTE base station.) Data cannot be transmitted in the idle mode because the terminal is disconnected from a network to save power or the like. Thus, switching to a connected mode (RRC_CONNECTED) is required in order to transmit data. If the terminal 2c-01 is successfully connected to the base station 2c-03, the terminal 2c-01 switches to a connected mode (RRC_CONNECTED), then the terminal 2c-01 and the base station 2c-03 are able to transmit and receive data (2c-13).

During the communication between the terminal 2c-01 and the base station 2c-03, the current base station (a serving cell) 2c-03 may determine handover in which the terminal 2c-01 moves to another base station 2c-05 according to signal-strength/quality information of the current base station 2c-03 and a neighboring base station, which is reported by the terminal 2c-01 due to movement of the terminal 2c-01 or the like (2c-15). In the embodiment of the disclosure, the LTE base station 2c-05 is assumed to be the most suitable cell for handover around the terminal, and thus the NR gNB 2c-03 transmits a command to instruct the terminal 2c-01 to perform handover to the LTE base station 2c-05 (2c-17). The handover command may be transmitted through an "RRCConnectionReconfiguration" message of the RRC layer, and the handover command message includes mobility control information (MCI) (MobilityControlInfo) indicating the base station to which the handover is directed (that is, the target cell is the LTE base station cell). Further, the RRC message may further include an indicator indicating lossless handover (e.g., losslessHandover), and may include configuration information about an PDCP layer, an RLC layer, and a MAC layer of LTE to be operated in the target LTE cell, which is received from the target LTE cell.

The lossless handover indicator denotes that the terminal applies lossless handover, which will be described later, to the first bearer satisfying a predetermined first condition, and even if the lossless handover indicator is configured (as being true), the lossless handover is not applied to the second bearer that does not satisfy the first condition (or that satisfies a second condition). The first bearer and the second bearer are defined as follows.

First bearer: The bearer satisfying a first condition: The bearer in which the length of a sequence number (SN) in the NR PDCP layer before handover is shorter than or equal to the length of an LTE PDCP SN after handover, among RLC-AM bearers (that is, there is no loss of data contained in the length before handover because the length after handover is greater than the length before handover)

Second bearer: The bearer satisfying a second condition: The bearer in which the length of an NR PDCP SN before handover is greater than the length of an LTE PDCP SN after handover, among all signaling radio bearers (SRBs) (i.e., signaling radio bearers for control signals), all RLC-UM bearers, and RLC-AM bearers (that is, there is loss of data contained in the length before handover because the length after handover is shorter than the length before handover)

Hereinafter, for the convenience of description, the PDCP SN length before handover is referred to as a "source PDCP SN length", and the PDCP SN length after handover is referred to as a "target PDCP SN length".

According to the above classification, the terminal 2c-01 performs different operations according to the type of bearer (i.e., the first bearer or the second bearer), among the bearers possessed by the terminal 2c-01 (2c-19). That is, the terminal 2c-01 applies a first operation below to the first bearer.

Generating LTE PDCP and LTE RLC layers to be used in a target

Processing the PDCP PDUs stored in the NR PDCP into PDCP SDUs (that is, encrypted packets are converted into decrypted packets) and then transmitting the same to the generated LTE PDCP Configuring a hyper frame number (TX_HFN) and an RX_HFN in the generated LTE PDCP layer in consideration of the values used in NR (e.g., the same value) and storing the received PDCP SDUs in a reordering buffer according to the PDCP SN The TX_HFN is an HFN value that is internally managed when a packet is transmitted in the PDCP layer. The HFN value and the PDCP SN included in the header of the packet to be transmitted are combined to generate a 32-bit COUNT value of the packet.

The RX_HFN is an HFN value that is internally managed when a packet is received in the PDCP layer. The HFN value and the PDCP SN included in the header of the received packet are combined to generate a 32-bit COUNT value of the packet.

Cancelling previous NR PDCP and NR RLC

Meanwhile, the terminal 2c-01 applies a second operation below to the second bearer.

Generating LTE PDCP and LTE RLC

Configuring initial values of TX_HFN and RX_HFN of LTE PDCP (e.g., set to 0)

Processing PDCP PDUs stored in NR PDCP into PDCP SDUs, and transmitting the same to the generated LTE PDCP layer Cancelling previous NR PDCP and NR RLC Thereafter, the terminal 2c-01 performs synchronization with and random access to the target cell 2c-05 to make downlink and uplink synchronization (2c-21), if the random access is successful, generates a new security key, and then configures the generated LTE PDCP to use the new security key (2c-23). In addition, the terminal 2c-01 transmits, to the target base station 2c-05, a message of the RRC layer, which is encrypted with the new security key and is integrity-protected, to notify that the handover has been successfully completed (2c-25). The message of the RRC layer may be an "RRCConnectionReconfigurationComplete" message.

Thereafter, the terminal 2c-01 generates a PDCP status report message in a first format for the PDCP of the first bearer, among the bearers configured to transmit PDCP status reports, and transmits the same to the target base station 2c-05 (2c-27). The PDCP status report in the first format includes a first missing SN (FMS) field and a bitmap. A first missing PDCP SN value is written in the FMS field, and the length of the PDCP SN follows the target PDCP SN length. Accordingly, the terminal 2c-01 may transmit information about the lost packets with respect to the first bearer to the target base station 2c-05, and thus the target base station 2c-05 may retransmit the lost packets to the terminal 2c-01 (2c-29), thereby performing lossless handover.

Subsequently, for the convenience of description, an operation opposite the above operation (that is, the case where handover is performed from an LTE base station to an NR base station) will be described with reference to the drawing.

As described above, during the communication between the terminal 2c-01 and the base station 2c-05, the current base station (a serving cell) 2c-05 may determine handover in which the terminal 2c-01 switches to another base station 2c-03 according to signal-strength/quality information of the current base station 2c-05 and a neighboring base station, which is reported by the terminal 2c-01 due to movement of the terminal 2c-01 or the like (2c-35). In this example, the NR base station 2c-03 is assumed to be the most suitable cell for handover around the terminal, and thus the LTE eNB 2c-05 transmits a command message to instruct the terminal 2c-01 to perform handover to the NR base station 2c-03 (2c-37). The handover command may be transmitted through an "RRCConnectionReconfiguration" message of the RRC layer, and the handover command message includes mobility control information (MCI) (MobilityControlInfo) indicating the base station to which the handover is directed (that is, the target cell is the NR base station cell). Further, the RRC message may further include an indicator indicating lossless handover (e.g., losslessHandover), and may include configuration information about an PDCP layer, an RLC layer, and a MAC layer of NR to be operated in the target NR cell, which is received from the target NR cell.

A first bearer that performs lossless handover and a second bearer that does not perform lossless handover according to the lossless handover indicator may be defined as follows, as described above.

First bearer: The bearer satisfying a first condition: The bearer in which the source PDCP SN length is shorter than or equal to the target PDCP SN length, among RLC-AM bearers Second bearer: The bearer satisfying a second condition: The bearer in which the source PDCP SN length is greater than the target PDCP SN length, among all SRBs, all UM bearers, and AM bearers According to the above classification, the terminal 2c-01 performs different operations according to the type of bearer (i.e., the first bearer or the second bearer), among the bearers possessed by the terminal 2c-01 (2c-39). That is, the terminal 2c-01 applies a first operation below to the first bearer.

Generating NR PDCP and NR RLC layers to be used in a target

Reassembling RLC PDUs stored (e.g., split) in LTE RLC into RLC SDUs and transmitting the same to LTE PDCP Processing (e.g., encrypted) PDCP PDUs stored in the LTE PDCP into PDCP SDUs (that is, encrypted packets are converted into decrypted packets) and then transmitting the same to the generated NR PDCP Configuring TX_HFN and RX_HFN in the generated NR PDCP layer in consideration of values used in LTE (e.g., the same value) and storing the received PDCP SDUs in a reordering buffer according to the PDCP SN The TX_HFN is an HFN value that is internally managed when a packet is transmitted in the PDCP layer. The HFN value and the PDCP SN included in the header of the packet to be transmitted are combined to generate a 32-bit COUNT value of the packet.

The RX_HFN is an HFN value that is internally managed when a packet is received in the PDCP layer. The HFN value and the PDCP SN included in the header of the received packet are combined to generate a 32-bit COUNT value of the packet.

Cancelling previous LTE PDCP and LTE RLC

Meanwhile, the terminal 2c-01 applies a second operation below to the second bearer.

Generating LTE PDCP and LTE RLC

Configuring initial values of TX_HFN and RX_HFN of LTE PDCP (e.g., set to 0)

Processing PDCP PDUs stored in NR PDCP into PDCP SDUs, and transmitting the same to the generated LTE PDCP layer Cancelling previous LTE PDCP and LTE RLC Thereafter, the terminal 2c-01 performs synchronization with and random access to the target cell 2c-03 to make downlink and uplink synchronization (2c-41), if the random access is successful, generates a new security key, and then configures the generated NR PDCP to use the new security key (2c-43). In addition, the terminal 2c-01 transmits, to the target base station 2c-03, a message of the RRC layer, which is encrypted with the new security key and is integrity-protected, to notify that the handover has been successfully completed (2c-45). The message of the RRC layer may be an "RRCConnectionReconfigurationComplete" message.

Thereafter, the terminal 2c-01 generates a PDCP status report message in a second format for the PDCP of the first bearer, among the bearers configured to transmit PDCP status reports, and transmits the same to the target base station (2c-47). The PDCP status report in the second format includes a FMS field and a bitmap. A first missing COUNT value is written in the FMS field, and the COUNT has 32 bits. Accordingly, the terminal 2c-01 may transmit information about the lost packets with respect to the first bearer to the target base station 2c-03, and thus the target base station 2c-03 may retransmit the lost packets to the terminal 2c-01 (2c-49), thereby performing lossless handover.

FIG. 2D is a diagram illustrating the operation sequence of a terminal when the disclosure is applied.

In FIG. 2D, it is assumed that the terminal is in a connected mode (RRC_CONNECTED) (2d-01). Thereafter, the terminal receives, from the base station, configuration of a data radio bearer (DRB) for data transmission and reception, transmits, to the base station, an acknowledgement message in response thereto, so that the terminal in the connected mode is able to transmit and receive data to and from the base station (2d-03). In order to configure the DRB, an "RRCConnectionReconfiguration" message of the RRC layer may be used, and an "RRCConnectionReconfigurationComplete" message may be used as the acknowledgement message. In addition, the DRB configuration may include configuration information of the PDCP and RLC layers for each bearer. More specifically, the DRB configuration may indicate the operation mode of the RLC layer {e.g., an acknowledgement mode (AM) and an unacknowledgement mode (UM)} and the like, and the configuration information of the PDCP layer may include an indicator indicating whether a status report is required to be transmitted after handover or when reconfiguring the PDCP layer for each bearer. That is, "statusReportRequired" information is included in PDCP-config. The bearer for which the PDCP status report is required to be transmitted as described above is referred to as a "first bearer". That is, "statusReportRequired" is configured as "TRUE" with respect to the first bearer. "StatusReportRequired" may be configured only for RLC-AM that may perform retransmission when data is lost.

Thereafter, the terminal may receive a handover command from the base station due to movement of the terminal or the like (2d-05). The handover command may be transmitted through an "RRCConnectionReconfiguration" message of the RRC layer, and the handover command message includes mobility control information (MCI) (MobilityControlInfo) indicating the base station to which the handover is directed (that is, the target base station is an LTE base station or NR base station). In the embodiment of the disclosure, a detailed description of the handover form NR to NR (2d-11) will be omitted, and the following detailed description will be made, based on the handover from NR to LTE and the handover from LTE to an NR base station. In the case of performing handover between base stations of different systems as described above, the embodiment of the disclosure further provides an indicator for lossless handover (e.g., losslessHandover). If the lossless handover indicator is configured, the operation may be performed according to the type of bearer as described above. A first bearer that performs lossless handover and a second bearer that does not perform lossless handover according to the lossless handover indicator may be defined as follows, as described above.

First bearer: The bearer satisfying a first condition: The bearer in which the source PDCP SN length is shorter than or equal to the target PDCP SN length, among RLC-AM bearers Second bearer: The bearer satisfying a second condition: The bearer in which the source PDCP SN length is greater than the target PDCP SN length, among all SRBs, all UM bearers, and AM bearers According to the above classification, in the case of performing handover from NR to LTE, the terminal applies a first operation below to the first bearer (2d-13).

Generating LTE PDCP and LTE RLC layers to be used in a target

Processing PDCP PDUs stored in the NR PDCP into PDCP SDUs (that is, encrypted packets are converted into decrypted packets) and then transmitting the same to the generated LTE PDCP Configuring TX_HFN and RX_HFN in the generated LTE PDCP layer in consideration of values used in NR (e.g., the same value) and storing the received PDCP SDUs in a reordering buffer according to the PDCP SN The TX_HFN is an HFN value that is internally managed when a packet is transmitted in the PDCP layer. The HFN value and the PDCP SN included in the header of the packet to be transmitted are combined to generate a 32-bit COUNT value of the packet.

The RX_HFN is an HFN value that is internally managed when a packet is received in the PDCP layer. The HFN value and the PDCP SN included in the header of the received packet are combined to generate a 32-bit COUNT value of the packet.

Cancelling previous NR PDCP and NR RLC

Meanwhile, the terminal applies a second operation below to the second bearer (2d-13).

Generating LTE PDCP and LTE RLC

Configuring initial values of TX_HFN and RX_HFN of LTE PDCP (e.g., set to 0)

Processing PDCP PDUs stored in NR PDCP into PDCP SDUs, and transmitting the same to the generated LTE PDCP layer Cancelling previous NR PDCP and NR RLC Thereafter, the terminal performs synchronization with and random access to the target cell to make downlink and uplink synchronization, if the random access is successful, generates a new security key, and then configures the generated LTE PDCP to use the new security key (2d-15). In addition, the terminal transmits, to the target base station, a message of the RRC layer, which is encrypted with the new security key and is integrity-protected, to notify that the handover has been successfully completed.

Thereafter, the terminal generates a PDCP status report message in a first format for the PDCP of the first bearer, among the bearers configured to transmit PDCP status reports, and transmits the same to the target base station (2d-17). The PDCP status report in the first format includes a FMS field and a bitmap. A first missing PDCP SN value is written in the FMS field, and the length of the PDCP SN follows the target PDCP SN length. Accordingly, the terminal may transmit information about the lost packets with respect to the first bearer to the target base station, and thus the target base station may retransmit the lost packets to the terminal, thereby performing lossless handover.

Meanwhile, in the case of performing handover from LTE to NR, the terminal applies a first operation below to the first bearer (2d-21).

Generating NR PDCP and NR RLC layers to be used in a target

Reassembling RLC PDUs stored (e.g., split) in LTE RLC into RLC SDUs and transmitting the same to LTE PDCP Processing (e.g., encrypted) PDCP PDUs stored in the LTE PDCP into PDCP SDUs (that is, encrypted packets are converted into decrypted packets) and then transmitting the same to the generated NR PDCP Configuring TX_HFN and RX_HFN of the generated NR PDCP layer in consideration of values used in LTE (e.g., the same value) and storing the received PDCP SDUs in a reordering buffer according to the PDCP SN The TX_HFN is an HFN value that is internally managed when a packet is transmitted in the PDCP layer. The HFN value and the PDCP SN included in the header of the packet to be transmitted are combined to generate a 32-bit COUNT value of the packet.

The RX_HFN is an HFN value that is internally managed when a packet is received in the PDCP layer. The HFN value and the PDCP SN included in the header of the received packet are combined to generate a 32-bit COUNT value of the packet.

Cancelling previous LTE PDCP and LTE RLC

Meanwhile, the terminal applies a second operation below to the second bearer (2d-21).

Generating LTE PDCP and LTE RLC

Configuring initial values of TX_HFN and RX_HFN of LTE PDCP (e.g., set to 0)

Processing PDCP PDUs stored in NR PDCP into PDCP SDUs, and transmitting the same to the generated LTE PDCP layer Cancelling previous LTE PDCP and LTE RLC Thereafter, the terminal performs synchronization with and random access to the target cell to make downlink and uplink synchronization, if the random access is successful, generates a new security key, and then configures the generated NR PDCP to use the new security key (2d-23). In addition, the terminal transmits, to the target base station, a message of the RRC layer, which is encrypted with the new security key and is integrity-protected, to notify that the handover has been successfully completed.

Thereafter, the terminal generates a PDCP status report message in a second format for the PDCP of the first bearer, among the bearers configured to transmit PDCP status reports, and transmits the same to the target base station (2d-25). The PDCP status report in the second format includes a FMC field and a bitmap. A first missing COUNT value is written in the FMS field, and the COUNT has 32 bits. Accordingly, the terminal may transmit information about the lost packets with respect to the first bearer to the target base station, and thus the target base station may retransmit the lost packets to the terminal, thereby performing lossless handover.

Figure 2E:
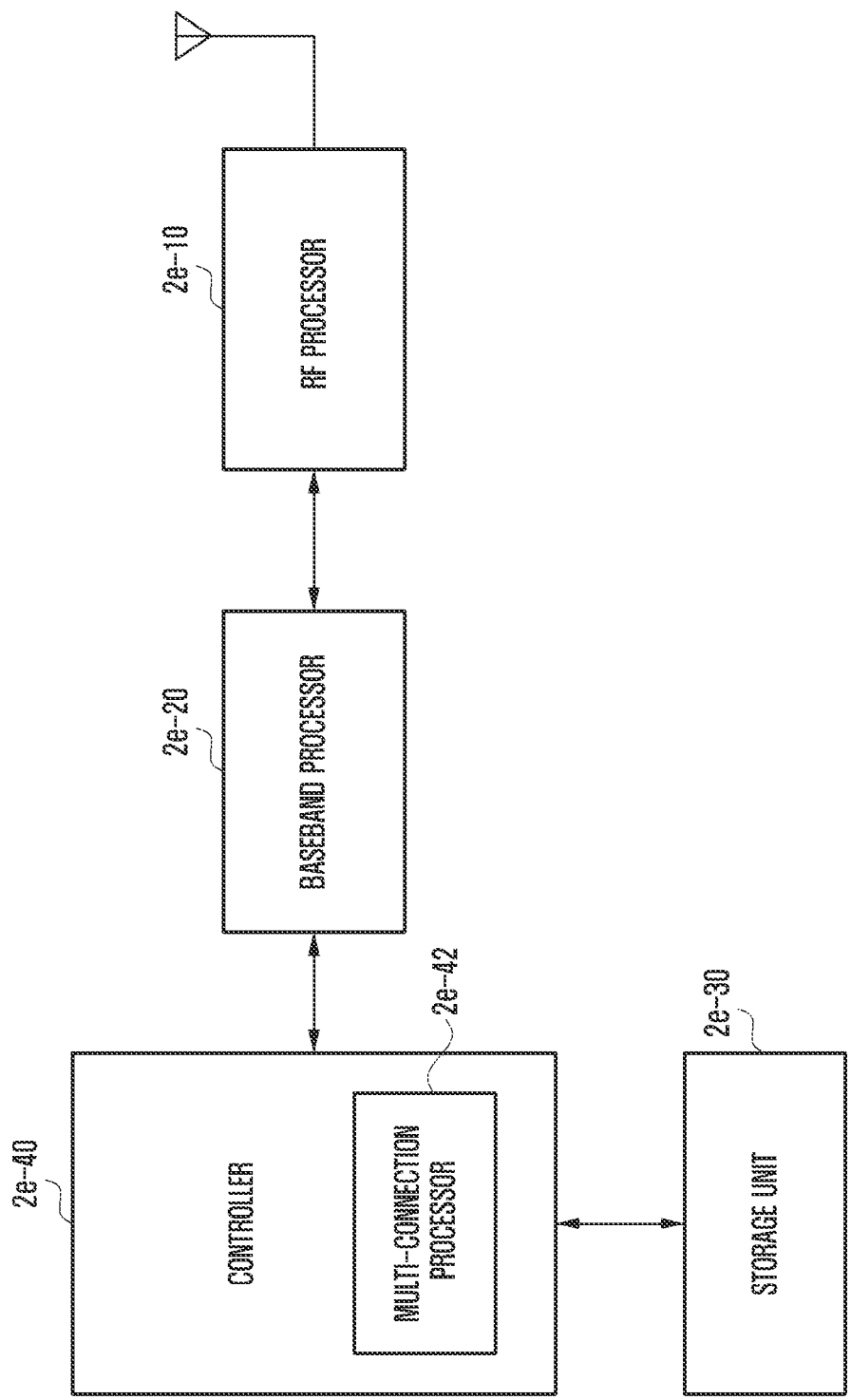
FIG. 2E is a block diagram illustrating the configuration of a terminal according to an embodiment of the disclosure.

FIG. 2E is a block diagram illustrating the configuration of a terminal according to an embodiment of the disclosure.

Referring to FIG. 2E, the terminal includes a radio frequency (RF) processor 2e-10, a baseband processor 2e-20, a storage unit 2e-30, and a controller 2e-40.

The RF processor 2e-10 performs a function of transmitting and receiving a signal through a wireless channel, such as band conversion and amplification of a signal. That is, the RF processor 2e-10 up-converts a baseband signal provided from the baseband processor 2e-20 to an RF band signal to thus transmit the same through an antenna and down-converts an RF band signal received through the antenna to a baseband signal. For example, the RF processor 2e-10 may include a transmission filter, a reception filter, an amplifier, a mixer, an oscillator, a digital-to-analog converter (DAC), an analog-to-digital converter (ADC), and the like. Although only one antenna is illustrated in FIG. 2E, the terminal may have a plurality of antennas. In addition, the RF processor 2e-10 may include a plurality of RF chains. Further, the RF processor 2e-10 may perform beamforming. To perform beamforming, the RF processor 2e-10 may adjust the phases and magnitudes of signals transmitted and received through a plurality of antennas or antenna elements.

The baseband processor 2e-20 performs a function of conversion between a baseband signal and a bit string according to the physical layer specification of the system. For example, in the case of data transmission, the baseband processor 2e-20 encodes and modulates transmission bit strings, thereby generating complex symbols. In addition, upon receiving data, the baseband processor 2e-20 demodulates and decodes a baseband signal provided from the RF processor 2e-10 to thus recover reception bit strings. For example, in the case where an orthogonal frequency division multiplexing (OFDM) scheme is applied, when transmitting data, the baseband processor 2e-20 generates complex symbols by encoding and modulating transmission bit strings, maps the complex symbols with subcarriers, and then configures OFDM symbols through an inverse fast Fourier transform (IFFT) operation and cyclic prefix (CP) insertion. In addition, when receiving data, the baseband processor 2e-20 divides the baseband signal provided from the RF processor 2e-10 into OFDM symbol units, restores the signals mapped with the subcarriers through a fast Fourier transform (FFT) operation, and then restores reception bit strings through demodulation and decoding.

The baseband processor 2e-20 and the RF processor 2e-10 transmit and receive signals as described above. Accordingly, the baseband processor 2e-20 and the RF processor 2e-10 may be referred to as a "transmitter", a "receiver", a "transceiver", or a "communication unit". Further, at least one of the baseband processor 2e-20 and the RF processor 2e-10 may include different communication modules to process signals of different frequency bands. The different frequency bands may include super-high frequency (SHF) (e.g., 2.5 GHz or 5 GHz) bands and millimeter wave (e.g., 60 GHz) bands.

The storage unit 2e-30 stores data such as basic programs, application programs, and configuration information for the operation of the terminal.

The controller 2e-40 controls the overall operation of the terminal. For example, the controller 2e-40 transmits and receives signals through the baseband processor 2e-20 and the RF processor 2e-10. In addition, the controller 2e-40 records and reads data in and from the storage unit 2e-30. To this end, the controller 2e-40 may include at least one processor. For example, the controller 2e-40 may include a communication processor (CP) for controlling communication and an application processor (AP) for controlling higher layers such as application programs. According to an embodiment of the disclosure, the controller 2e-40 may include a multi-connection processor 2e-42 for performing a process for operation in a multi-connected mode. For example, the controller 2e-40 may perform control such that the terminal performs the operations illustrated in FIG. 2E.

According to an embodiment of the disclosure, if a terminal receives a lossless handover command from a base station to a base station of another system, the terminal may perform an operation according to the type of bearer described above, thereby preventing packet loss.

Methods according to the claims of the disclosure or the embodiments described in the specification may be implemented in hardware, software, or a combination thereof.

When the methods are implemented in software, a computer-readable storage medium storing one or more programs (software modules) may be provided. One or more programs stored in a computer-readable storage medium are configured to be executed by one or more processors in an electronic device. One or more programs include instructions that allow the electronic device to execute the methods according to the claims of the disclosure or the embodiments described in the specification.

These programs (software modules or software) may be stored in random access memory, non-volatile memory including flash memory, ROM (read only memory), EEPROM (electrically erasable programmable read only memory), magnetic disk storage devices, CD-ROM (compact disk-ROM), DVDs (digital versatile discs), other types of optical storage devices, or magnetic cassettes. Alternatively, the programs may be stored in the memory configured as a combination of some or all of the same. In addition, a plurality of memories may be included.

In addition, the above programs may be stored in an attachable storage device that is accessible through a communication network, such as the Internet, an intranet, a LAN (local area network), a WLAN (wide LAN), or a SAN (storage area network), or a communication network configured as a combination thereof. Such a storage device may be connected to the device for performing the embodiments of the disclosure via an external port. Further, a separate storage device in the communication network may be connected to the device for performing the embodiments of the disclosure.

Third Embodiment

Hereinafter, the operational principle of the disclosure will be described in detail with reference to the accompanying drawings. Hereinafter, a detailed description of known functions and configurations incorporated herein will be omitted if the description obscures the subject matter of the disclosure. In addition, the terms used herein are defined in consideration of the functions of the disclosure, and may be changed according to the intention or practices of the user or the operator, or the like. Therefore, the definition should be based on the content throughout this specification.

Hereinafter, terms for identifying connection nodes, terms referring to network entities, terms referring to messages, terms referring to interfaces between network entities, terms referring to a variety of identification information, and the like will be used as examples for the convenience of explanation. Therefore, the disclosure is not limited to the terms used herein, and other terms referring to objects having equivalent technical meanings may be used.

For the convenience of explanation, in the disclosure, terms and names defined in the $3^{rd}$ generation partnership project long-term evolution (3GPP LTE) standard, which is the latest communication standard, among existing communication standards, will be used. However, the disclosure is not limited to the above-mentioned terms and names, and the disclosure may be equally applied to systems conforming to other standards.

If a multi-connection is used in a next-generation mobile communication system, a master base station and an auxiliary base station may transmit and receive duplicate data. In this case, the terminal must be able to transmit and receive the same RRC message to and from multiple base stations. In the existing LTE, if the wireless link from one base station is not of good quality, the wireless link failure is declared and a subsequent procedure is performed. However, In order to apply the above system, the radio link must be declared by collectively considering a plurality of radio links, which requires a new procedure. The disclosure proposes a procedure for applying radio link failure to the case where a multi-connection is used in a next-generation mobile communication system and embodies the operation of a terminal.

Figure 3A:
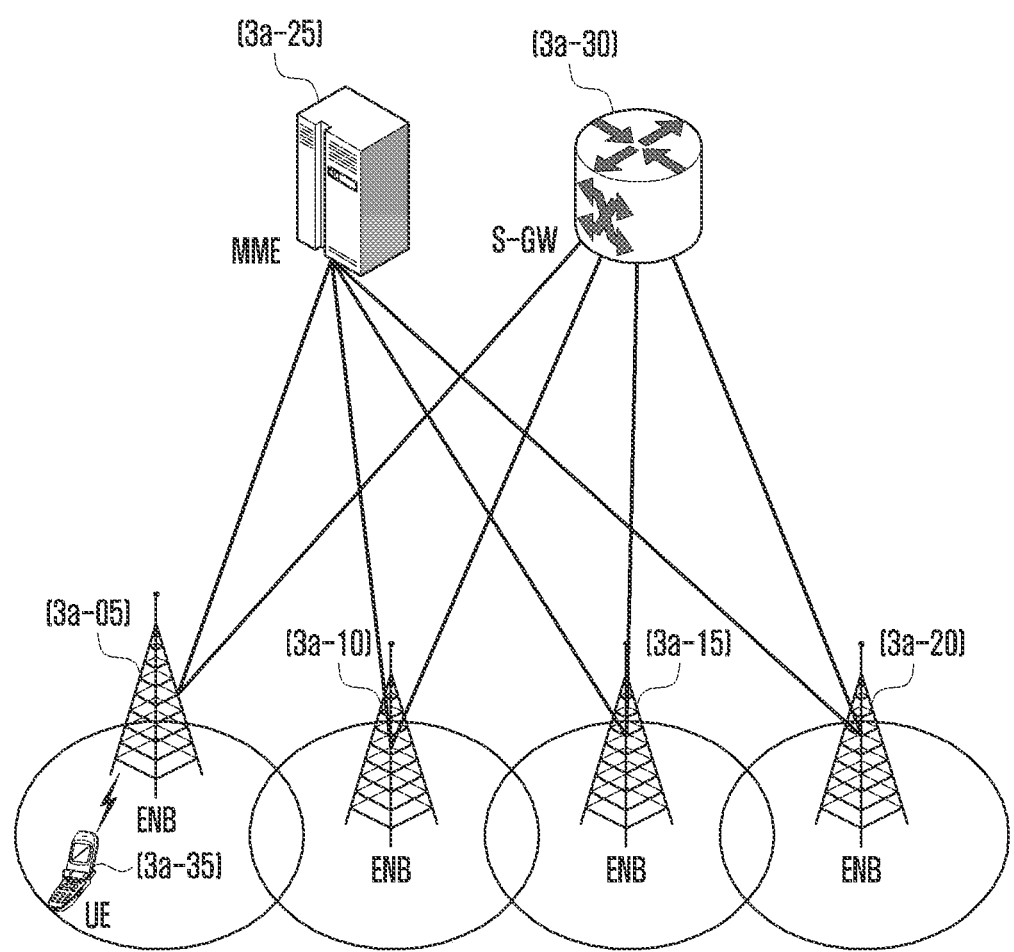
FIG. 3A is a diagram illustrating the structure of an LTE system according to an embodiment of the disclosure.

FIG. 3A is a diagram illustrating the structure of an LTE system according to an embodiment of the disclosure.

Referring to FIG. 3A, the wireless communication system includes a plurality of base stations 3a-05, 3a-10, 3a-15, and 3a-20, a mobility management entity (MME) 3a-25, and a serving gateway (S-GW) 3a-30. User equipment (hereinafter, referred to as "UE" or a "terminal") 3a-35 accesses an external network through the base stations 3a-05, 3a-10, 3a-15, and 3a-20 and the S-GW 3a-30.

The base stations 3a-05, 3a-10, 3a-15, and 3a-20 provide wireless access to terminals accessing the network as access nodes of a cellular network. That is, in order to serve traffic of users, the base stations 3a-05, 3a-10, 3a-15, and 3a-20 collect status information, such as buffer status, available transmission power status, channel status, and the like of terminals, and perform scheduling, thereby supporting connection between the terminals and a core network (CN). The MME 3a-25 performs various control functions, as well as a mobility management function for a terminal, and is connected to a plurality of base stations. The S-GW 3a-30 provides data bearers. In addition, the MME 3a-25 and the S-GW 3a-30 may further perform authentication and bearer management for the terminal accessing the network, and may process packets received from the base stations 3a-05, 3a-10, 3a-15, and 3a-20 or packets to be transmitted to the base stations 3a-05, 3a-10, 3a-15, and 3a-20.

Figure 3B:
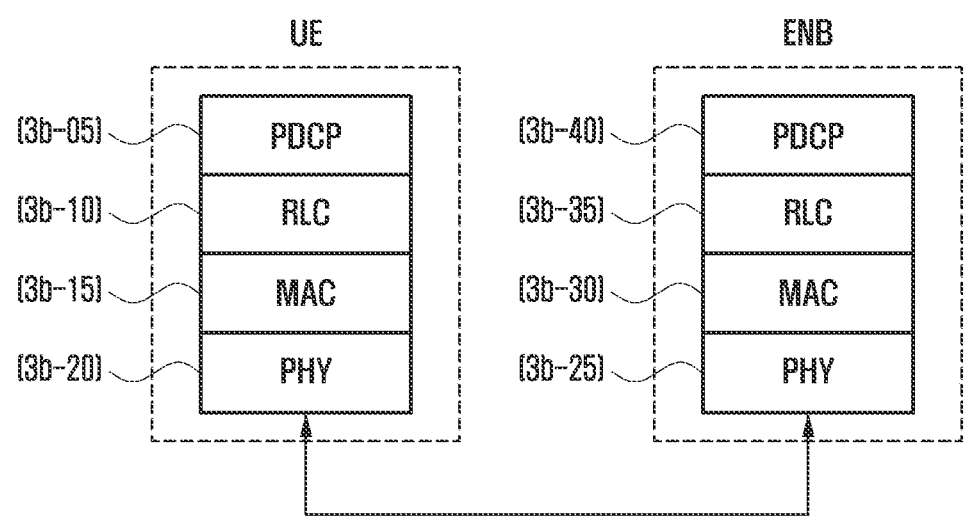
FIG. 3B is a diagram illustrating a wireless protocol structure of an LTE system according to an embodiment of the disclosure.

FIG. 3B is a diagram illustrating a wireless protocol structure of an LTE system according to an embodiment of the disclosure.

Referring to FIG. 3B, the wireless protocol of the LTE system includes a packet data convergence protocol (PDCP) 3b-05 or 3b-40, a radio link control (RLC) 3b-10 or 3b-35, and a medium access control (MAC) 3b-15 or 3b-30 in a terminal and an eNB, respectively. The PDCP 3b-05 or 3b-40 performs operations, such as IP header compression/decompression and the like. The primary functions of the PDCP are summarized as follows.

Header compression and decompression (ROHC only)
Transfer of user data
In-sequence delivery of upper layer PDUs at PDCP re-establishment procedure for RLC AM
Sequence reordering (for split bearers in DC (only support for RLC AM): PDCP PDU routing for transmission and PDCP PDU reordering for reception)
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The radio link control (hereinafter, referred to as "RLC") 3b-10 or 3b-35 reconfigures a PDCP PDU (packet data unit) to an appropriate size and performs ARQ operation and the like. The primary functions of the RLC are summarized as follows.

Data transfer function (transfer of upper layer PDUs)
ARQ function (error correction through ARQ (only for AM data transfer))
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 3b-15 or 3b-30 is connected to a plurality of RLC entities configured in a single terminal, multiplexes RLC PDUs into MAC PDUs, and demultiplexes RLC PDUs from MAC PDUs. The primary functions of the MAC are summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
HARQ function (error correction through HARQ)
Priority handling between logical channels of one UE
Priority handling between UEs by means of dynamic scheduling
MBMS service identification
Transport format selection
Padding The physical layer 3b-20 or 3b-25 channel-codes and modulates upper layer data, and converts the same into OFDM symbols to then be transmitted through a wireless channel, or demodulates OFDM symbols received through a wireless channel and channel-decodes the same to then be transmitted to higher layers.

Although not shown in the drawing, a radio resource control (hereinafter, referred to as "RRC") layer exists in the higher layer of the PDCP layer of the terminal and the base station, respectively. The RRC layer may transmit and receive access/measurement-related configuration control messages for radio resource control.

Figure 3C:
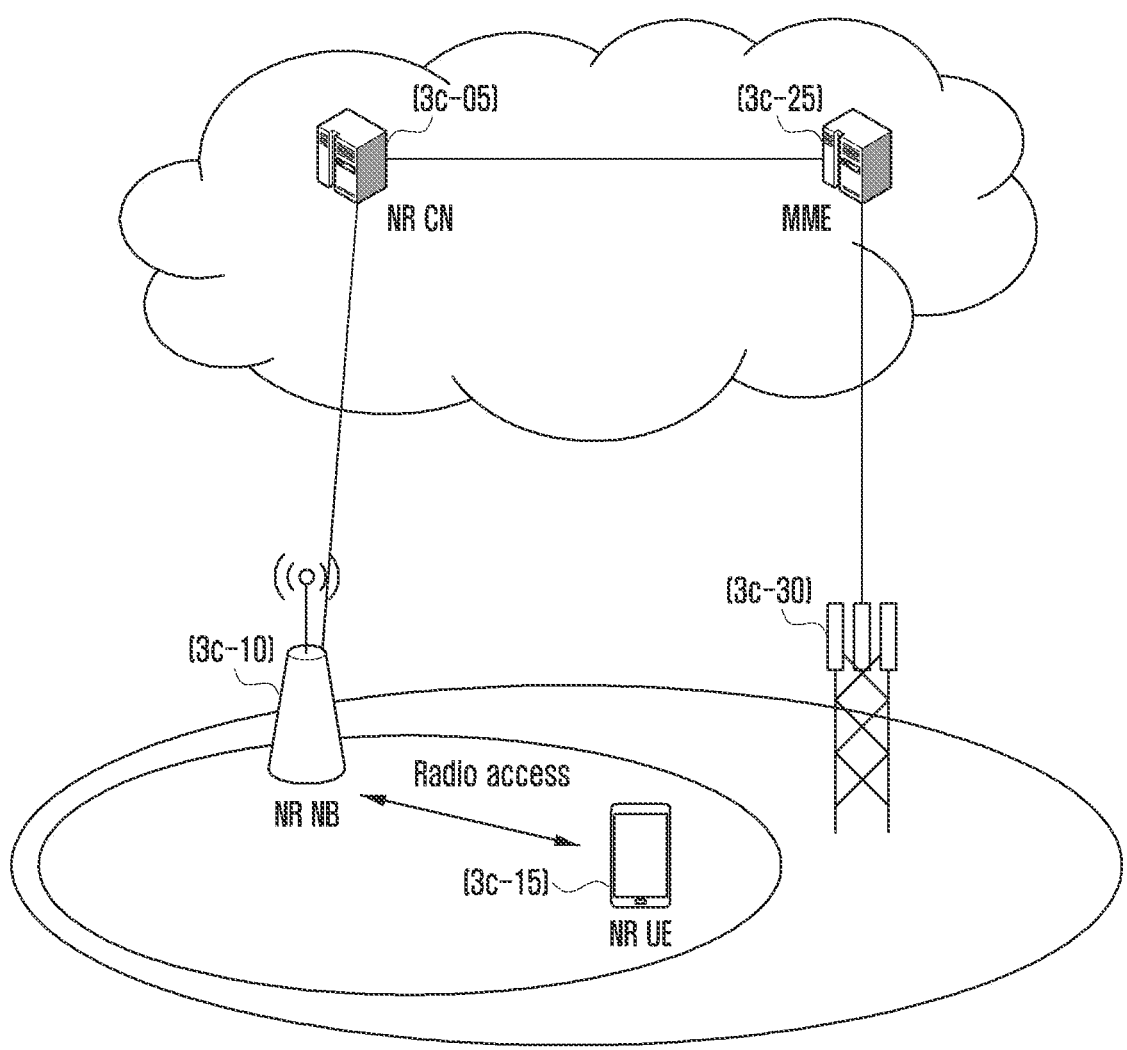
FIG. 3C is a diagram illustrating the structure of a next-generation mobile communication system according to an embodiment of the disclosure.

FIG. 3C is a diagram illustrating the structure of a next-generation mobile communication system according to an embodiment of the disclosure.

Referring to FIG. 3C, a wireless access network of a next-generation mobile communication system includes a new radio node B (hereinafter, referred to as "NR gNB" or an "NR base station") 3c-10 and a new radio core network (NR CN) 3c-05 as shown in the drawing. New radio user equipment (hereinafter, referred to as "NR UE" or a "terminal") 3c-15 accesses an external network through the NR gNB 3c-10 and the NR CN 3c-05.

In FIG. 3C, the NR gNB 3c-10 corresponds to an evolved node B (eNB) of an existing LTE system. The NR gNB 3c-10 is connected to the NR UE 3c-15 through a wireless channel, and may provide services superior to those of an existing node B. In the next-generation mobile communication system, since all user traffic is served through a shared channel, a device for collecting status information, such as buffer status, available transmission power status, and channel status of UEs, and performing scheduling is required. The NR gNB 3c-10 serves as such a device. One NR gNB 3c-10 typically controls multiple cells and includes a central unit (CU) for performing control and signaling and a distributed unit (DU) for performing transmission and reception of signals. In order to realize super-high data rates compared to the existing LTE system, the next-generation mobile communication system may have a bandwidth equal to or greater than the maximum bandwidth of the existing system, may employ, as wireless access technology, orthogonal frequency division multiplexing (hereinafter, referred to as "OFDM"), and may further employ a beamforming technique in addition thereto. In addition, an adaptive modulation and coding (hereinafter, referred to as "AMC") scheme is applied to determine a modulation scheme and a channel coding rate in accordance with the channel status of a terminal. The NR CN 3c-05 performs functions such as mobility support, bearer configuration, and QoS configuration. The NR CN 3c-05 is a device that performs various control functions, as well as a mobility management function for the terminal 3c-15, and is connected to a plurality of base stations. In addition, the next-generation mobile communication system may interwork with the existing LTE system, and the NR CN 3c-05 is connected to an MME 3c-25 through a network interface. The MIME 3c-25 is connected to the eNB 3c-30, which is an existing base station.

The embodiment of the disclosure relates to RRC diversity technology. RRC diversity is a technique in which the terminal transmits and receives the same RRC message to and from a plurality of base stations, thereby increasing the possibility of receipt of the RRC message. The RRC diversity may also be referred to as "packet duplication". The RRC diversity may be classified into downlink (DL) RRC diversity and uplink (UL) RRC diversity. In the case of DL RRC diversity, the terminal receives the same RRC message from a plurality of base stations. According to the embodiment, the DL RRC diversity is effective particularly in the handover process in which the reception signal strength is unstable. In the case of UL RRC diversity, the terminal transmits the same RRC message to a plurality of base stations. Likewise, the probability of successful transmission of the RRC message may be increased in the cell boundary region.

Figure 3D:
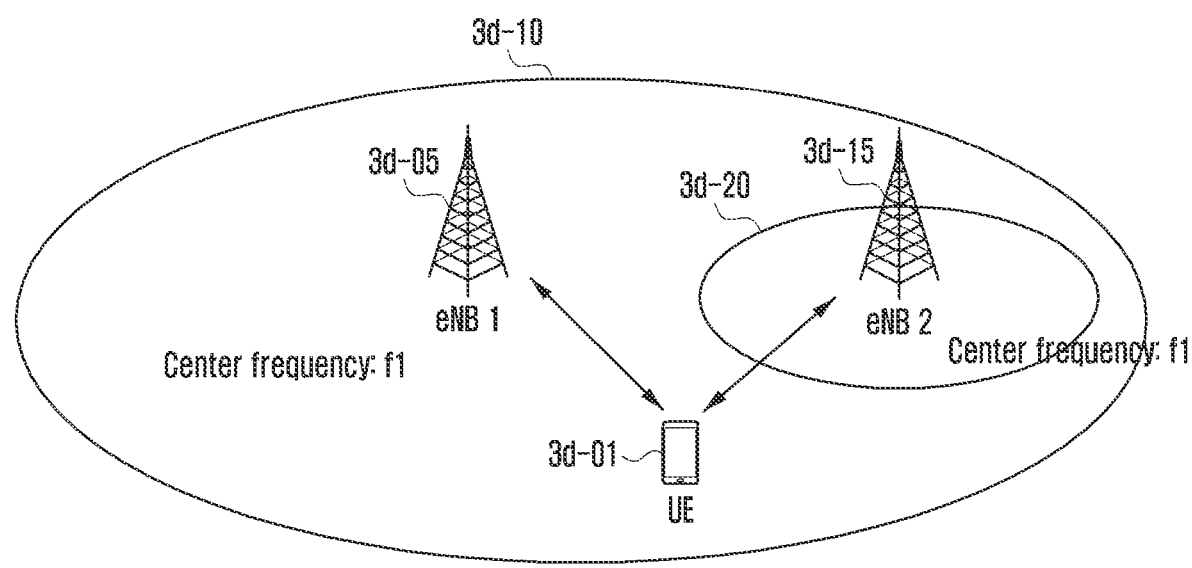
FIG. 3D is a diagram schematically illustrating an RRC diversity operation in a multi-connection according to an embodiment of the disclosure.

FIG. 3D is a diagram schematically illustrating an RRC diversity operation in a multi-connection according to an embodiment of the disclosure.

Referring to FIG. 3D, in the case where base station 1 (3d-05) transmits/receives a carrier of center frequency f1 and base station 2 (3d-15) transmits/receives a carrier of center frequency f2, if the terminal 3d-01 combines a forward carrier of center frequency f1 and a forward carrier of center frequency f2, one terminal may transmit/receive data to/from two or more base stations. The LTE system supports the above operation, which is referred to as "dual connectivity" (hereinafter, referred to as "DC").

Hereinafter, in the embodiments of the disclosure, the operation in which the terminal receives data through an arbitrary forward carrier or transmits data through an arbitrary uplink carrier means that the terminal transmits/receives data using a control channel and a data channel provided from the cell corresponding to the center frequency and frequency band, which characterize the carrier. In the embodiments of the disclosure, a set of serving cells controlled by the same base station is defined as a cell group (CG). The cell group is divided into a master cell group (MCG) and a secondary cell group (SCG). The MCG refers to a set of serving cells controlled by a base station (master eNB, MeNB) that controls a primary cell (PCell), and the SCG refers to a set of serving cells controlled by a base station (secondary eNB, SeNB), which controls only secondary cells (SCells), other than the base station controlling the PCell. The base station informs the terminal of whether a specific serving cell belongs to the MCG or the SCG in the process of configuring the corresponding serving cell. The PCell or the SCell indicate the type of serving cell configured with respect to the terminal. There are some differences between the PCell and the SCell. For example, the PCell is always in the active state, but the SCell switches between the active state and the inactive state according to the instruction of the base station. The mobility of the terminal is controlled by the PCell, and the SCell may be understood as an additional serving cell for data transmission and reception. The PCell and the SCell in the embodiments of the disclosure denote the PCell and the SCell defined in LTE standard 36.331 or 36.321.

Referring back to FIG. 3D, if base station 1 (3d-05) is MeNB and base station 2 (3d-15) is SeNB, a serving cell 3d-10 having center frequency f1 belongings to the MCG, and a serving cell 3d-20 having center frequency f2 belongings to the SCG. In addition, it may be practically impossible to transmit the HARQ feedback and the CSI of the SCG SCells through a physical uplink control channel (PUCCH) of the PCell. The HARQ feedback must be delivered within a HARQ round trip time (RTT) (typically, 8 ms) because the transmission delay between the MeNB 3d-10 and the SeNB 3d-15 may be greater than the HARQ RTT. Due to the above problem, PUCCH transmission resources are configured in a cell of the SCells that belong to the SCG, i.e., the primary SCell (PSCell), and the HARQ feedback and CSI for the SCG SCells are transmitted through the PUCCHs.

In the disclosure, in the case where RRC diversity is applied, the terminal 3d-01 may simultaneously receive RRC messages including the same information from two base stations, i.e., the MeNB 3d-05 and the SeNB 3d-15. The RRC messages to be transmitted to the terminal 3d-01 may be exchanged through an Xn backhaul to which the MeNB 3d-05 and the SeNB 3d-15 are connected. Two base stations 3d-05 and 3d-15 may use the same or different frequencies.

Figure 3E:
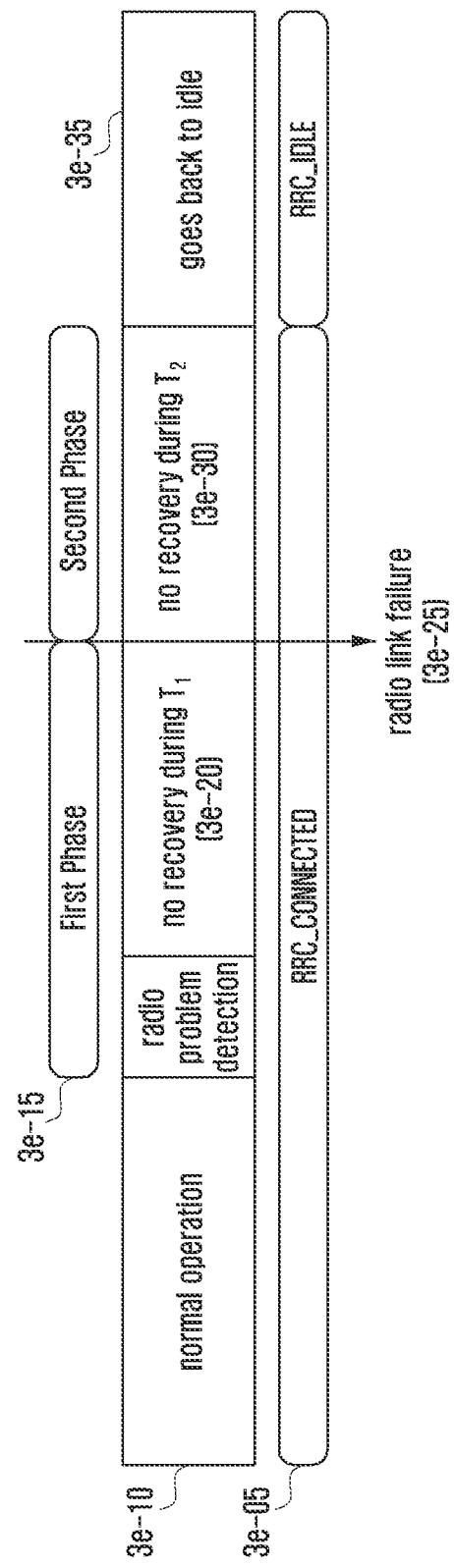
FIG. 3E is a diagram illustrating a radio link monitoring operation and a radio link failure operation in LTE according to an embodiment of the disclosure.

FIG. 3E is a diagram for explaining a radio link monitoring operation and a radio link failure operation in LTE according to an embodiment of the disclosure.

Referring to FIG. 3E, a procedure in which the terminal performs a radio link monitoring (RLM) operation and a radio link failure (RLF) operation in the PCell will be described. The terminal in the RRC connected state (3e-05) may perform normal operation with the PCell (3e-10), and may not receive a signal with a sufficient strength from the MeNB. This situation may happen frequently when the terminal moves rapidly from a serving cell to a target cell, or when the quality of the radio link is suddenly degraded. In this case, the terminal receives, from the physical layer, an "out-of-sync" signal indicating that services are no longer provided from the MeNB (3e-15). If the signal is received N310 times, the terminal recognizes the problem of the radio connection with the MeNB and starts a T310 timer (3e-20). The terminal does not perform a radio link recovery operation while the timer is operating. If the timer expires, the terminal declares RLF (3e-25) and performs an RRC connection re-establishment procedure. For the RRC connection re-establishment procedure, the terminal performs cell selection, MAC reset, RB suspension, and the like. In addition, if the RRC connection re-establishment procedure is started, the terminal starts a T311 timer and does not perform a radio link recovery operation while the timer is operating (3e-30). If the RRC connection re-establishment is not performed while the timer is operating, and if the timer expires, the terminal switches to the RRC idle state (3e-35).

Figure 3F:
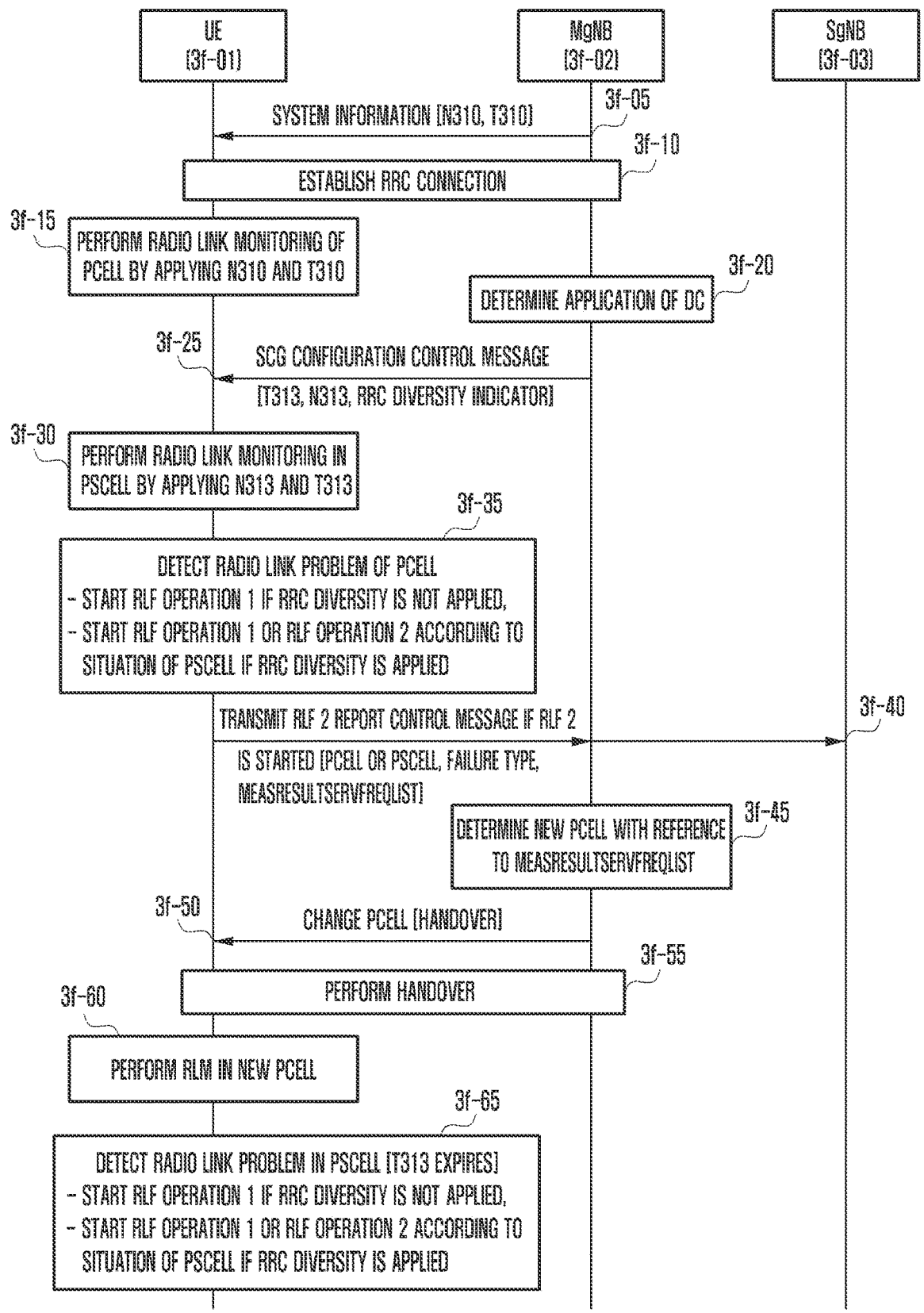
FIG. 3F is a diagram illustrating the overall operations of radio link monitoring (RLM) and radio link failure (RLF) of a primary cell (PCell) and a primary secondary cell (PSCell) in the case where RRC diversity is applied according to an embodiment of the disclosure.

FIG. 3F is a diagram illustrating the overall operation of RLM and RLF of a PCell and a PSCell in the case where RRC diversity is applied according to an embodiment of the disclosure.

The terminal 3*f*-01 establishes an RRC connection with the MgNB 3*f*-03 (3*f*-10) after receiving system information from the MgNB 3*f*-03 (3*f*-05). The system information includes time information about N310 and T310 timers in LTE. The terminal 3*f*-01 performs radio link monitoring in the PCell by applying the received N310 and T310 (3*f*-15). At the same time, MgNB 3*f*-02 may determine the DC application of the terminal 3*f*-01 to the SgNB 3*f*-03 if certain conditions are satisfied (3*f*-20). An example of the conditions is that the terminal measures neighboring cells periodically or according to the configuration of the base station and transmits a measurement value indicating that a multi-connection for handover is required. That is, the conditions may include the event in which the strength of a signal received by the terminal from the source base station is reduced, whereas the strength of a signal received by the terminal from the target base station is increased, and the source base station that received the same may recognize the mobility of the terminal, and may be prepared for handover.

The MgNB 3*f*-03 transmits, to the terminal 3*f*-01, an SCG configuration control message including T313, N313, and an RRC diversity indicator (3*f*-25). The timer is intended for RLM in the PSCell, and the RRC diversity indicator indicates whether to apply RRC diversity in the configured DC. Thereafter, the terminal 3*f*-01 detects a radio link problem due to the expiration of the T310 timer in the PCell (3*f*-35). If RLF occurs in the PCcell of the existing LTE, the RRC connection re-establishment operation is started as described in FIG. 3E. However, in the RRC diversity environment, even if RLF occurs in the PCell, the following method may be performed in consideration of the situation, instead of immediately starting the RRC connection re-establishment.

In the case where RRC diversity is not applied: Perform RLF operation 1.

In the case where RRC diversity is applied: Start RLF operation 1 or RLF operation 2 according to the situation of the PSCell.

RLF operation 1 denotes operations of resetting MAC, stopping SRBs 1 and 2 and all DRBs, and releasing MCG SCells. RLF operation 2 includes interrupting uplink transmission and reporting the RLF.

Referring again to step 3*f*-35, if the T310 in the PCell expires without indication of the RRC diversity from the MgNB 3*f*-02, the terminal 3*f*-01 performs RLF operation 1. That is, the terminal resets MAC, stops SRBs 1 and 2 and all DRBs, and releases MCG SCells. On the other hand, if the terminal 3*f*-01 receives, from the MgNB 3*f*-02, indication of the RRC diversity, and if the T310 in the PCell expires, the RLF operation differs depending on the condition of the PSCell. If the PSCell is of good quality and if normal transmission/reception is performed in the PSCell, the terminal 3*f*-01 performs RLF operation 1. However, if the PSCell is of poor quality and if the transmission/reception is not normally performed (if T313 is in operation or if RLF 1 has recently been declared in n ms in the PSCell), the terminal 3*f*-01 performs RLF operation 2. The RLF operation 2 may correspond to the case where a radio link problem occurs in both the PCell and the PSCell, and only in this case, the terminal 3*f*-01 declares and reports the RLF.

If the RLF operation 2 is started, the terminal 3*f*-01 transmits a control message for reporting RLF 2 to the SgNB 3*f*-03 (3*f*-40). Alternatively, the terminal may also transmit the corresponding information to the MgNB 3*f*-02. The control message for reporting RLF 2 may include the following information.

Indicator indicating PCell or PSCell

FailureType: timer expiration, a random access problem, a maximum RLC transfer count problem, an SCG change problem, etc.

measResultServFreqList: a serving frequency identifier and information on the measured SCell quality (RSRP and RSRQ), etc.

Thereafter, the MgNB 3*f*-02 determines a new PCell with reference to "measResultServFreqList" received from the terminal 3*f*-01 and transmits, to the terminal 3*f*-01, a handover RRC message indicating the change of the PCell (3*f*-50). The terminal 3*f*-01 performs handover to the new PCell indicated (3*f*-55), and performs RLM in the PCell (3*f*-60). In addition, the terminal 3*f*-01 may also perform radio link problem detection, i.e., an RLF declaration operation, in the PSCell in parallel with the RLM and RLF procedures in the PCell. That is, if the T313 in the PSCell expires without indication of RRC diversity from the MgNB 3*f*-02, the terminal 3*f*-01 performs RLF operation 1. RLF operation 1 refers to operations of resetting MAC, stopping SRBs 1 and 2 and all DRBs, and releasing SCG SCells. On the other hand, if the terminal 3*f*-01 receives, from the MgNB 3*f*-02, indication of RRC diversity, and if the T313 expires in the PSCell, the RLF operation differs depending on the condition of the PCell. If the PCell is of good quality and if normal transmission/reception is performed in the PCell, the terminal performs RLF operation 1. However, if the PCell is of poor quality and if the transmission/reception is not normally performed (if T310 is in operation or if RLF 1 has recently been declared within n ms in the PCell), the terminal performs RLF operation 2. RLF operation 2 may correspond to the case where a radio link problem occurs in both the PCell and the PSCell, and only in this case, the terminal 3*f*-01 declares and reports the RLF (3*f*-65).

Figure 3G:
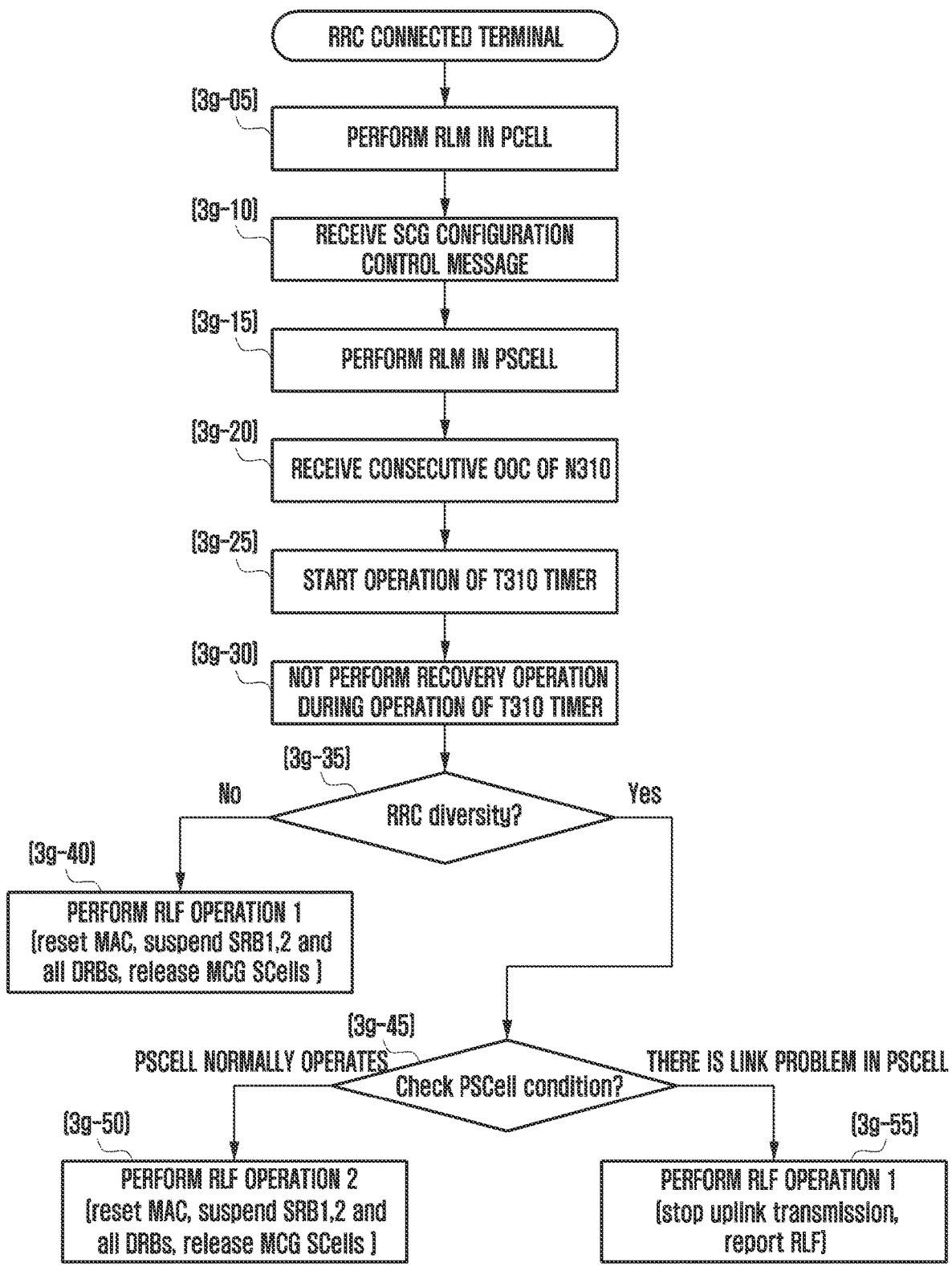
FIG. 3G is a diagram illustrating RLM and RLF procedures of a terminal in a PCell in the case where RRC diversity is applied according to an embodiment of the disclosure.

FIG. 3G is a diagram illustrating RLM and RLF procedures of a terminal in a PCell in the case where RRC diversity is applied according to an embodiment of the disclosure.

The terminal in the RRC connected state performs RLM in the PCell with reference to N310 and T310 timer information received from system information of the base station (3g-05). Thereafter, the terminal receives an SCG configuration control message from the base station in a specific condition (3g-10), and performs RLM in the PSCell corresponding to the received configuration (3g-15). Upon receiving a consecutive out-of-sync (00C) indication of N310 from the physical layer (3g-20), the terminal starts a T310 timer (3g-25). The terminal does not perform an operation for radio link recovery while the timer is operating (3g-30). If the SCG configuration control message is received from the base station, a subsequent operation of the terminal differs depending on whether RRC diversity is configured.

First, if an RRC diversity operation is not configured, and if the T310 timer expires, the terminal performs RLF operation 1. RLF operation 1 refers to operations of resetting MAC, stopping SRBs 1 and 2 and all DRBs, and releasing MCG SCells. On the other hand, if an RRC diversity operation is configured, and if the T310 timer expires, the terminal performs different RLF operations according to the condition of the PSCell (3g-45). If the PSCell is of good quality, and if normal transmission/reception is performed in the PSCell, the terminal performs RLF operation 2 (3g-50). However, if the PSCell is of poor quality, and if the transmission/reception is not normally performed (if T313 is in operation, or if RLF 1 has recently been declared within n ms in the PSCell), the terminal performs RLF operation 1 (3g-55). RLF operation 1 includes interrupting uplink transmission and reporting the RLF. That is, the terminal declares and reports the RLF to the base station only in the case where a radio link problem occurs in both the PCell and the PSCell (in the case where RLF 1 is started).

Figure 3H:
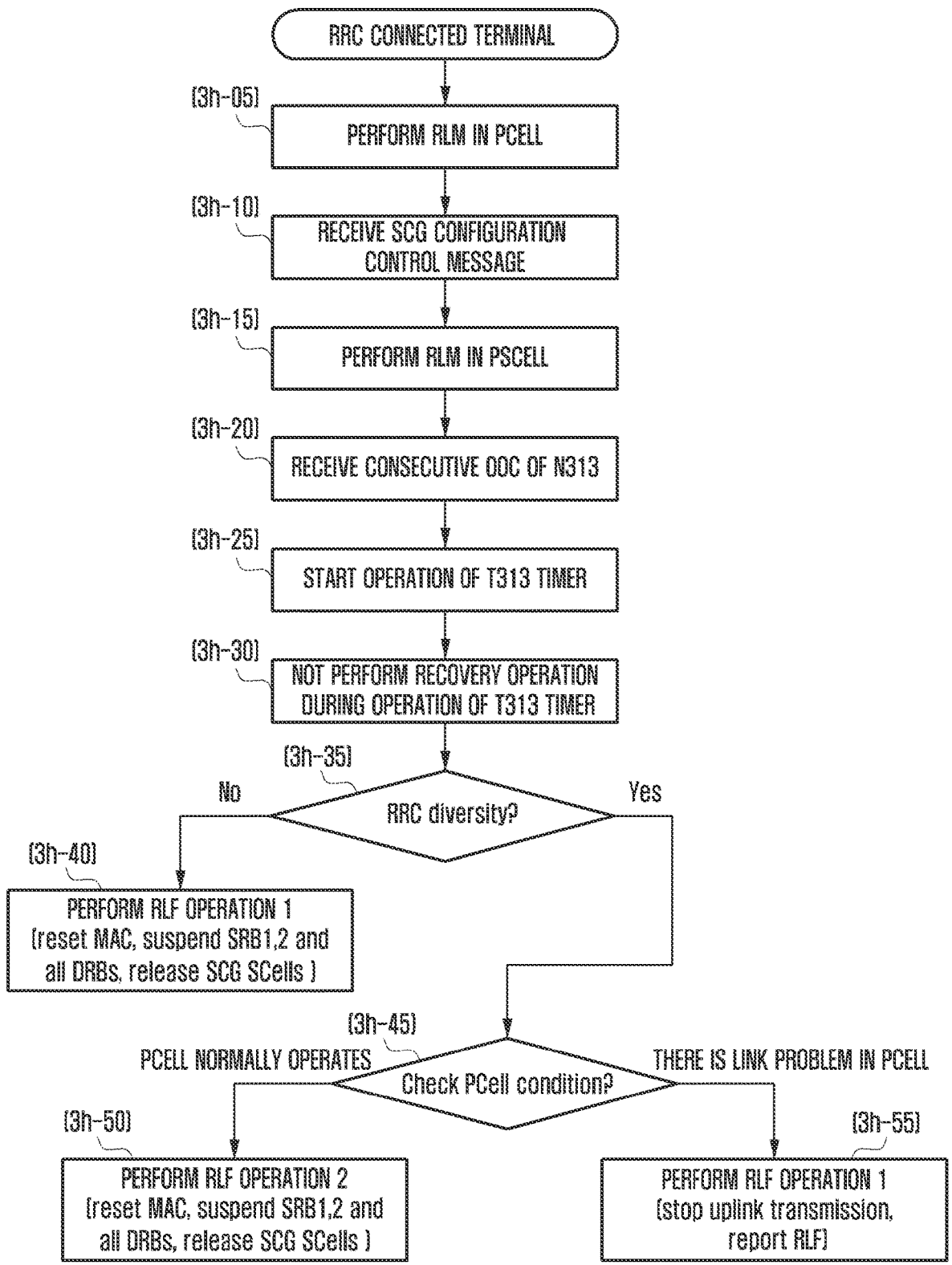
FIG. 3H is a diagram illustrating RLM and RLF procedures of a terminal in a PSCell in the case where RRC diversity is applied according to an embodiment of the disclosure.
Figure 31:
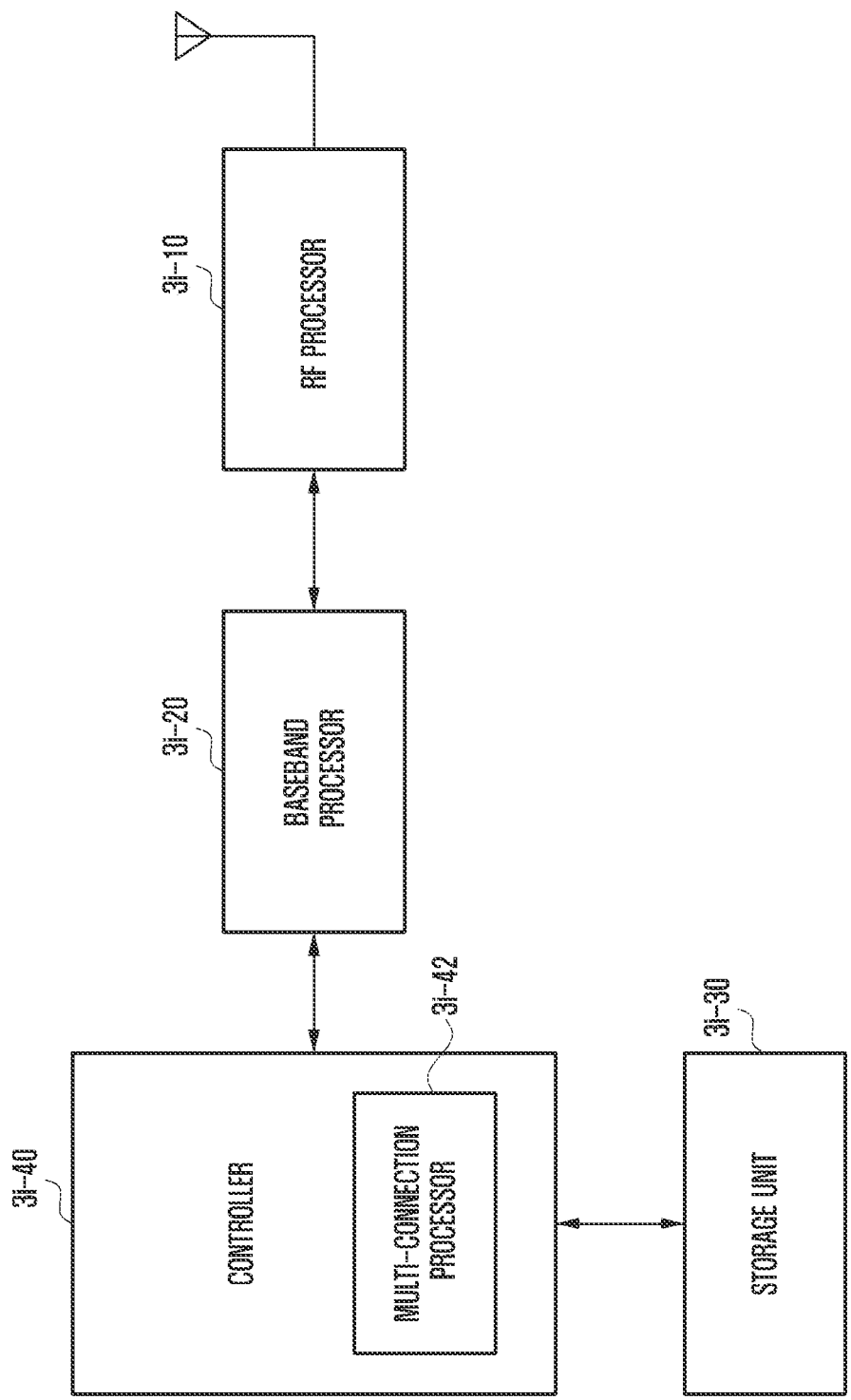

FIG. 3H is a diagram illustrating RLM and RLF procedures of a terminal in a PSCell in the case where RRC diversity is applied according to an embodiment of the disclosure.

The terminal in the RRC connected state performs RLM in the PCell with reference to N313 and T313 timer information received from system information of the base station (3h-05). Thereafter, the terminal receives an SCG configuration control message from the base station in a specific condition (3h-10), and performs RLM in the PSCell corresponding to the received configuration (3h-15). Upon receiving a consecutive out-of-sync indication of N313 from the physical layer (3h-20), the terminal starts a T313 timer (3h-25). The terminal does not perform an operation for radio link recovery while the timer is operating (3h-30). If the SCG configuration control message is received from the base station, a subsequent operation of the terminal differs depending on whether RRC diversity is configured.

First, if an RRC diversity operation is not configured, and if the T313 timer expires, the terminal performs RLF operation 1. RLF operation 1 refers to operations of resetting MAC, stopping SRBs 1 and 2 and all DRBs, and releasing SCG SCells. On the other hand, if an RRC diversity operation is configured, and if the T313 timer expires, the terminal performs different RLF operations according to the condition of the PCell (3h-45). If the PCell is of good quality, and if normal transmission/reception is performed in the PCell, the terminal performs RLF operation 2 (3h-50). However, if the PCell is of poor quality, and if the transmission/reception is not normally performed (if T310 is in operation, or if RLF 1 has recently been declared within n ms in the PCell), the terminal performs RLF operation 1 (3h-55). RLF operation 1 includes interrupting uplink transmission and reporting the RLF. That is, the terminal declares and reports the RLF to the base station only in the case where a radio link problem occurs in both the PCell and the PSCell (in the case where RLF 1 is started).

FIG. 3I is a block diagram illustrating the structure of a terminal according to an embodiment of the disclosure.

Referring to the drawing above, the terminal includes a radio frequency (RF) processor 3i-10, a baseband processor 3i-20, a storage unit 3i-30, and a controller 3i-40.

The RF processor 3i-10 performs a function of transmitting and receiving a signal through a wireless channel, such as band conversion and amplification of a signal. That is, the RF processor 3i-10 up-converts a baseband signal provided from the baseband processor 3i-20 to an RF band signal to thus transmit the same through an antenna and down-converts an RF band signal received through the antenna to a baseband signal. For example, the RF processor 3i-10 may include a transmission filter, a reception filter, an amplifier, a mixer, an oscillator, a digital-to-analog converter (DAC), an analog-to-digital converter (ADC), and the like. Although only one antenna is illustrated in the above drawing, the terminal may have a plurality of antennas. In addition, the RF processor 3i-10 may include a plurality of RF chains. Further, the RF processor 3i-10 may perform beamforming. To perform beamforming, the RF processor 3i-10 may adjust the phases and magnitudes of signals transmitted and received through a plurality of antennas or antenna elements. In addition, the RF processor may perform MIMO, and may receive a plurality of layers when performing the MIMO operation.

The baseband processor 3i-20 performs a function of conversion between a baseband signal and a bit string according to the physical layer specification of the system. For example, in the case of data transmission, the baseband processor 3i-20 encodes and modulates transmission bit strings, thereby generating complex symbols. In addition, upon receiving data, the baseband processor 3i-20 demodulates and decodes a baseband signal provided from the RF processor 3i-10 to thus recover reception bit strings. For example, in the case where an orthogonal frequency division multiplexing (OFDM) scheme is applied, when transmitting data, the baseband processor 3i-20 generates complex symbols by encoding and modulating transmission bit strings, maps the complex symbols with subcarriers, and then configures OFDM symbols through an inverse fast Fourier transform (IFFT) operation and cyclic prefix (CP) insertion. In addition, when receiving data, the baseband processor 3i-20 divides the baseband signal provided from the RF processor 3i-10 into OFDM symbol units, restores the signals mapped with the subcarriers through a fast Fourier transform (FFT) operation, and then restores reception bit strings through demodulation and decoding.

The baseband processor 3i-20 and the RF processor 3i-10 transmit and receive signals as described above. Accordingly, the baseband processor 3i-20 and the RF processor 3i-10 may be referred to as a "transmitter", a "receiver", a "transceiver", or a "communication unit". Further, at least one of the baseband processor 3i-20 and the RF processor 3i-10 may include a plurality of communication modules to support a plurality of different radio access technologies. In addition, at least one of the baseband processor 3i-20 and the RF processor 3i-10 may include different communication modules to process signals of different frequency bands. For example, the different radio access technologies may include wireless LANs (e.g., IEEE 802.11), cellular networks (e.g., LTE), and the like. In addition, the different frequency bands may include super-high frequency (SHF) (e.g., 2.NRHz or NRhz) bands and millimeter wave (e.g., 60 GHz) bands.

The storage unit 3*i*-30 stores data such as basic programs, application programs, and configuration information for the operation of the terminal. In particular, the storage unit 3*i*-30 may store information related to a second access node for performing wireless communication using a second radio access technique. In addition, the storage unit 3*i*-30 provides the stored data according to a request by the controller 3*i*-40.

The controller 3*i*-40 controls the overall operation of the terminal. For example, the controller 3*i*-40 transmits and receives signals through the baseband processor 3*i*-20 and the RF processor 3*i*-10. In addition, the controller 3*i*-40 records and reads data in and from the storage unit 3*i*-30. To this end, the controller 3*i*-40 may include at least one processor. For example, the controller 3*i*-40 may include a communication processor (CP) for controlling communication and an application processor (AP) for controlling higher layers such as application programs.

Figure 3J:
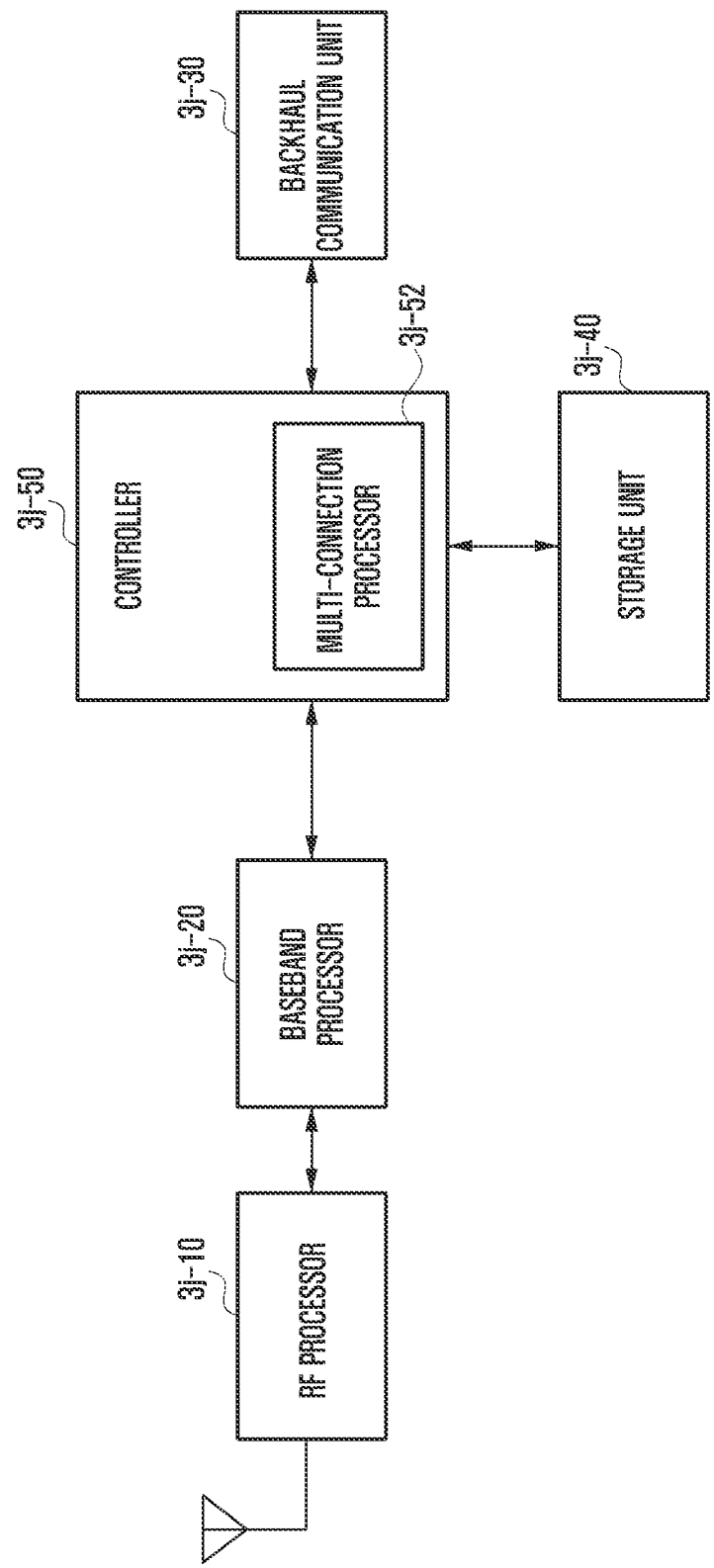
FIG. 3J is a block diagram illustrating the configuration of an NR base station according to an embodiment of the disclosure.

FIG. 3J is a block diagram illustrating the configuration of an NR base station according to an embodiment of the disclosure.

As shown in the drawing, the base station includes an RF processor 3*j*-10, a baseband processor 3*j*-20, a backhaul communication unit 3*j*-30, a storage unit 3*j*-40, and a controller 3*j*-50.

The RF processor 3*j*-10 performs a function of transmitting and receiving signals through a wireless channel, such as band conversion and amplification of a signal. That is, the RF processor 3*j*-10 up-converts a baseband signal provided from the baseband processor 3*j*-20 to an RF band signal, to thus transmit the same through an antenna, and down-converts an RF band signal received through the antenna to a baseband signal. For example, the RF processor 3*j*-10 may include a transmission filter, a reception filter, an amplifier, a mixer, an oscillator, a DAC, an ADC, and the like. Although only one antenna is shown in the drawing, the first access node may have a plurality of antennas. In addition, the RF processor 3*j*-10 may include a plurality of RF chains. Further, the RF processor 3*j*-10 may perform beamforming. To perform beamforming, the RF processor 3*j*-10 may adjust the phases and magnitudes of signals transmitted and received through a plurality of antennas or antenna elements. The RF processor may perform a downlink MIMO operation by transmitting one or more layers.

The baseband processor 3*j*-20 performs a function of conversion between a baseband signal and a bit string according to a physical layer specification of a first radio access technique. For example, in the case of data transmission, the baseband processor 3*j*-20 encodes and modulates transmission bit strings, thereby generating complex symbols. In addition, upon receiving data, the baseband processor 3*j*-20 demodulates and decodes a baseband signal provided from the RF processor 3*j*-10 to thus recover reception bit strings. For example, in the case where an OFDM scheme is applied, when transmitting data, the baseband processor 3*j*-20 generates complex symbols by encoding and modulating transmission bit strings, maps the complex symbols with subcarriers, and then configures OFDM symbols through the IFFT operation and CP insertion. In addition, when receiving data, the baseband processor 3*j*-20 divides the baseband signal provided from the RF processor 3*j*-10 into OFDM symbol units, restores the signals mapped with the subcarriers through the FFT operation, and then restores reception bit strings through demodulation and decoding. The baseband processor 3*j*-20 and the RF processor 3*j*-10 transmit and receive signals as described above. Accordingly, the baseband processor 3*j*-20 and the RF processor 3*j*-10 may be referred to as a "transmitter", a "receiver", a "transceiver", a "communication unit", or a "wireless communication unit".

The backhaul communication unit 3*j*-30 provides an interface for performing communication with other nodes in the network. That is, the backhaul communication unit 3*j*-30 converts a bit string, transmitted from the primary base station to another node, such as a secondary base station, a core network, etc., into a physical signal, and converts physical signals received from other nodes into bit strings.

The storage unit 3*j*-40 stores data such as basic programs, application programs, and configuration information for the operation of the primary base station. In particular, the storage unit 3*j*-40 may store information about bearers allocated to a connected terminal, a measurement result reported from a connected terminal, and the like. In addition, the storage unit 3*j*-40 may store information that is a criterion for determining whether multiple connections are provided to the terminal or are released. In addition, the storage unit 3*j*-40 provides the stored data in response to a request from the controller 3*j*-50.

The controller 3*j*-50 controls the overall operation of the primary base station. For example, the controller 3*j*-50 transmits and receives signals through the baseband processor 3*j*-20 and the RF processor 3*j*-10 or the backhaul communication unit 3*j*-30. In addition, the controller 3*j*-50 records and reads data in and from the storage unit 3*j*-40. To this end, the controller 3*j*-50 may include at least one processor.

The embodiment of the disclosure may be configured to have the following configuration.

A method of configuring RRC diversity in a terminal supporting DC such that an RLF declaration procedure differs depending on RRC diversity configuration A method of performing RLF operation 1 if a wireless link problem is detected in the PCell or PSCell in the case where RRC diversity is not configured in the terminal A method of declaring RLF differently according to a wireless link and operation state of the PSCell if a wireless link problem is detected in the PCell in the case where RRC diversity is configured in the terminal A method of performing RLF operation 1 if the PSCell is in a good radio state or if the PSCell is in normal operation A method of performing RLF operation 2 if the PSCell is not in a good radio state or if the PSCell is not in normal operation RLF operation 1 includes operations of resetting MAC, stopping SRBs 1 and 2 and all DRBs, and releasing MCG SCells.

RLF operation 2 includes operations of stopping uplink transmission and reporting RLF.

A method of performing RLF operation 2 if the PSCell is not in a good radio state or if the PSCell is not in normal operation A method of declaring RLF differently according to a wireless link and operation state of the PSCell if a wireless link problem is detected in the PCell in the case where RRC diversity is configured A method of performing RLF operation 1 if the PCell is in a good radio state or if the PCell is in normal operation A method of performing RLF operation 2 if the PCell is not in a good radio state or if the PSCell is not in normal operation RLF operation 1 includes operations of resetting MAC, stopping SRBs 1 and 2 and all DRBs, and releasing MCG SCells.

RLF operation 2 includes operations of stopping uplink transmission and reporting RLF.

Fourth Embodiment

Hereinafter, a detailed description of known functions and configurations incorporated herein will be omitted if the description obscures the subject matter of the disclosure. Hereinafter, an embodiment of the disclosure will be described with reference to the accompanying drawings.

Figure 4A:
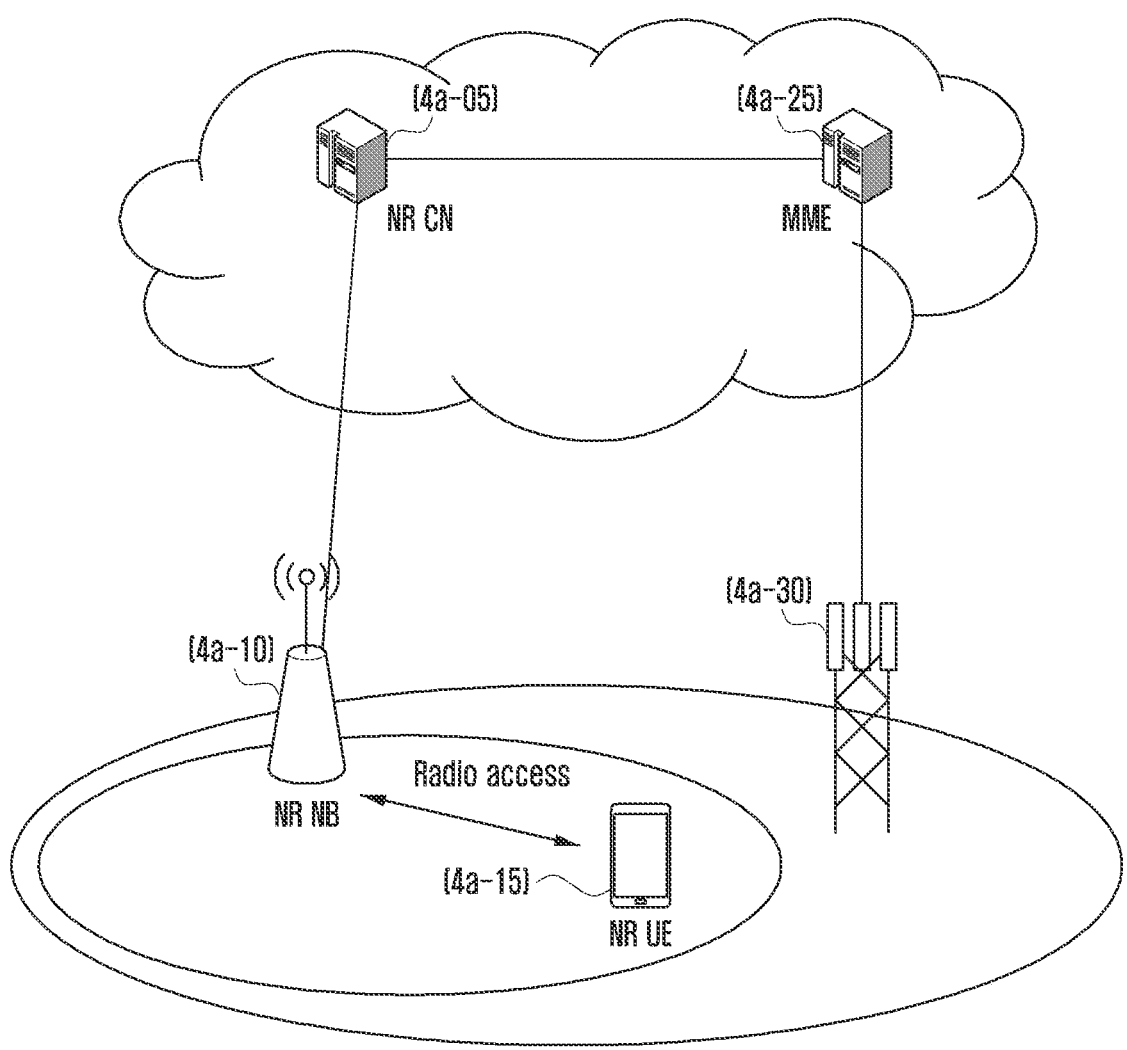
FIG. 4A is a diagram illustrating the structure of a next-generation mobile communication system according to an embodiment of the disclosure.

FIG. 4A is a diagram illustrating the structure of a next-generation mobile communication system according to an embodiment of the disclosure.

Referring to FIG. 4A, a wireless access network of a next-generation mobile communication system includes a new radio node B (hereinafter, referred to as "NR NB") 4a-10 and a new radio core network (NR CN) 4a-05 as shown in the drawing. New radio user equipment (hereinafter, referred to as "NR UE" or a "terminal") 4a-15 accesses an external network through the NR NB 4a-10 and the NR CN 4a-05.

In FIG. 4A, the NR NB 4a-10 corresponds to an evolved node B (eNB) of an existing LTE system. The NR NB is connected to the NR UE 4a-15 through a wireless channel, and may provide services superior to those of the existing node B. In the next-generation mobile communication system, since all user traffic is served through a shared channel, a device for collecting status information, such as buffer status, available transmission power status, and channel status of UEs, and performing scheduling is required. The NR NB 4a-10 serves as such a device. One NR NB 4a-10 typically controls multiple cells. In order to realize super-high data rates compared to the existing LTE system, the next-generation mobile communication system may have a bandwidth equal to or greater than the maximum bandwidth of the existing system, may employ, as wireless access technology, orthogonal frequency division multiplexing (hereinafter, referred to as "OFDM"), and may further employ a beamforming technique in addition thereto. In addition, an adaptive modulation and coding (hereinafter, referred to as "AMC") scheme is applied to determine a modulation scheme and a channel coding rate in accordance with the channel status of a terminal. The NR CN 4a-05 performs functions such as mobility support, bearer configuration, and QoS configuration. The NR CN 4a-05 is a device that performs various control functions, as well as a mobility management function for a terminal, and is connected to a plurality of base stations. In addition, the next-generation mobile communication system may inter-work with the existing LTE system, and the NR CN 4a-05 is connected to an MME 4a-25 through a network interface. The MME 4a-25 is connected to the eNB 4a-30, which is an existing base station.

One of the methods for improving power consumption is increasing a DRX cycle. The terminal performs a reception operation to receive a paging signal from the base station. However, since the paging signal is not transmitted frequently, the reception operation performed by the terminal during a cycle of time in which the paging signal is not received may increase power loss. Therefore, in order to reduce power consumption, the terminal may perform the operation of receiving the paging signal periodically only during a specific cycle of time, which is referred to as "DRX". In the LTE system, DRX operation of a terminal in an idle mode is performed using Equation 1 below. A system frame number (SFN) is increased by 1 every radio frame. If a paging signal is transmitted in a radio frame satisfying the equation, the terminal performs a reception operation through DRX. The radio frame is called a "paging frame (PF)".

$$\text{SFN mod } T = (T \text{ div } N) * (UE\_ID \text{ mod } N) \quad \text{<Equation 1>}$$

Here,

SFN: system frame number. 10 bits (MSB 8 bits explicit and LBS 2 bits implicit)

T: DRX cycle of the UE. Transmitted on SIB2. ENUMERATED {rf32, rf64, rf128, rf256}

N: min (T, nB)

nB: Transmitted on SIB2. ENUMERATED {4T, 2T, T, T/2, T/4, T/8, T/16, T/32}.

UE_ID: IMSI mod 1024 (IMSI is a unique number assigned to each terminal)

8 bits of a master information block (MIB) of a physical broadcast channel (PBCH) represents the SFN. T and nB are values provided from the base station while being included in SIB2 (system information block type 2). T may have one of {rf32, rf64, rf128, rf256}, where r32 denotes the length of 32 radio frames. That is, r32 means 320 ms.

Figure 4B:
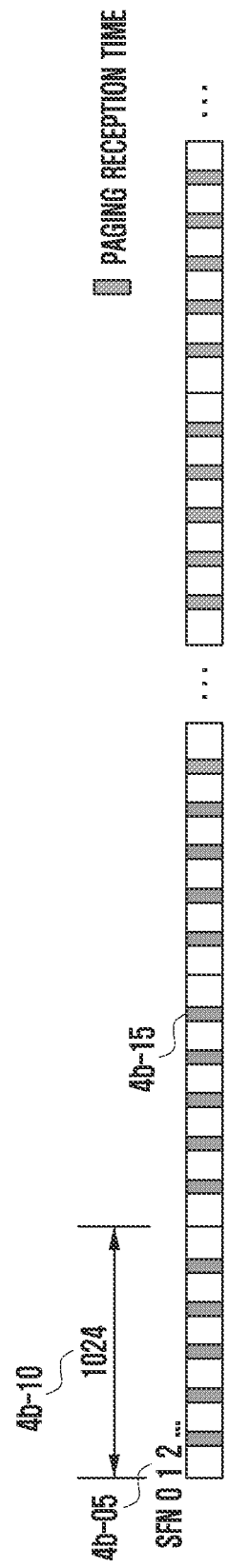
FIG. 4B is a conceptual diagram illustrating a paging time in LTE technology according to an embodiment of the disclosure.

FIG. 4B conceptually illustrates a paging time in the LTE technology according to an embodiment of the disclosure. The SFN is incremented by 1 for every radio frame (4b-05). The value of the SFN is reset to 0 every cycle of 1024 (4b-10). According to Equation 1, the same pattern of paging is repeated every SFN cycle (4b-15). From the above equation, it can be seen that the maximum DRX cycle in the current LTE standard is 2.56 seconds, and even if the DRX cycle is maximally increased, it cannot exceed the SFN cycle, i.e., 10.24 seconds. In other words, in order to increase the DRX cycle to 10.24 seconds or more for reduction in the power consumption, the SFN cycle must also be increased.

In the embodiment of the disclosure, in order to increase the SFN cycle, an additional SFN bit is included in an existing or new SIB, and the terminal receives the same, which will be described below. The SFN bits are incremented by 1 every SFN cycle. In addition, the SIB including the additional SFN bit does not need to be received by all terminals, and it is characterized in that only the terminal to which a very long DRX cycle is applied may try to receive the same. In addition, a "systemInfoValueTag" value (an IE included in SIB 1), which is generally incremented by 1 every time SIB information is changed, and a "systemInfoModification" IE, which is included in paging and informs of whether the system information is changed, are not affected by a change in the SFN bit value. That is, even if the SFN bit value is changed, the "systemInfoValueTag" IE is not updated, and the "systemInfoModification" IE is not transmitted through paging.

Figure 4C:
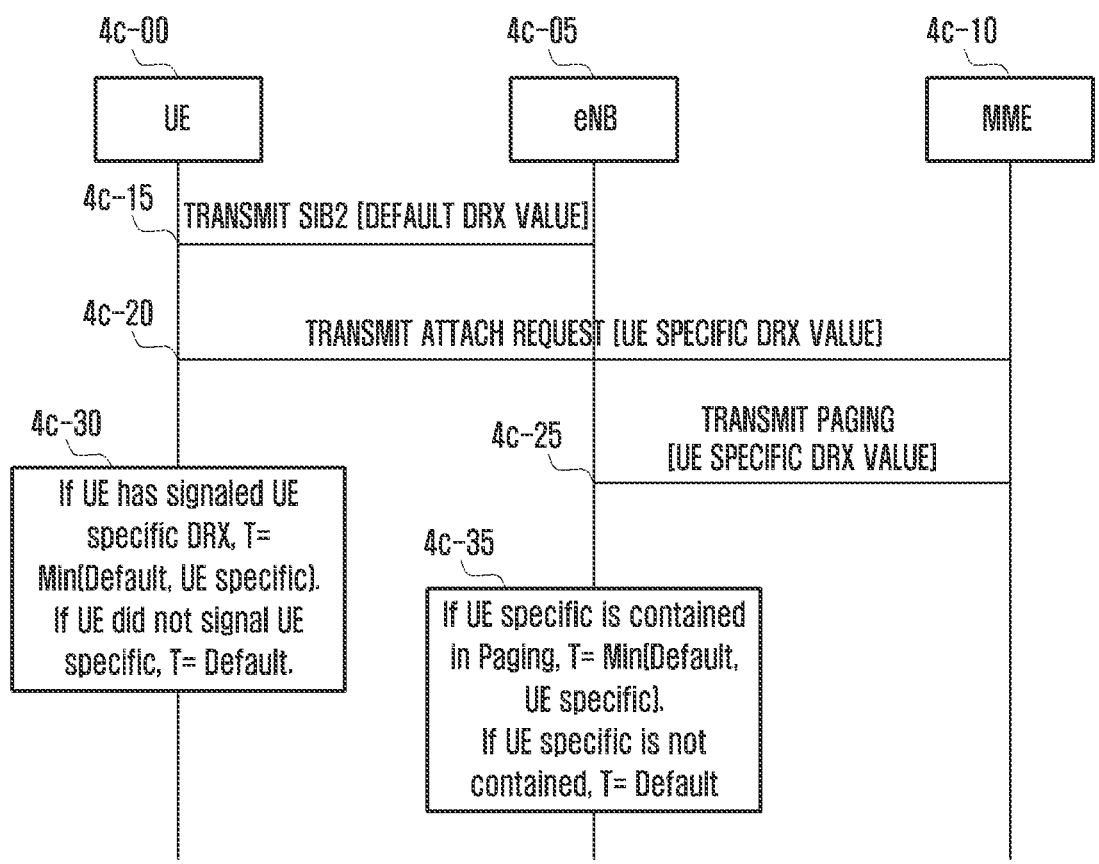
FIG. 4C is a diagram illustrating a process of determining a DRX cycle of a terminal in LTE technology according to an embodiment of the disclosure.

FIG. 4C is a diagram for explaining a process of determining a DRX cycle of a terminal in LTE technology according to an embodiment of the disclosure.

The base station 4c-05 provides the terminal 4c-00 with a default DRX value using SIB 1, which is one piece of broadcast system information (4c-15). If the terminal desires a shorter DRX cycle than the default DRX value, the terminal provides the MME 4c-10 with a desired DRX value as a UE-specific DRX value through an ATTACH process (4c-20). If there is a paging with respect to the terminal 4c-00, the MME 4c-10 transmits the UE-specific DRX value provided from the terminal 4c-00 together with the paging to the base station 4c-05. The terminal 4c-00 determines a small one of the UE-specific DRX value transmitted to the MME 4c-10 and the default DRX value provided from the base station 4c-05 to be a DRX cycle (4c-30). The base station 4c-05 also determines a small one of the UE-specific DRX value received from the MME 4c-10 and the default DRX value broadcast by the base station 4c-10 to be a DRX cycle (4c-35). Accordingly, the terminal 4c-00 and the base station 4c-05 select the same DRX cycle, and the base station 4c-05 determines the PF, based on the DRX cycle and transmits a paging message to the terminal 4c-00.

Figure 4D:
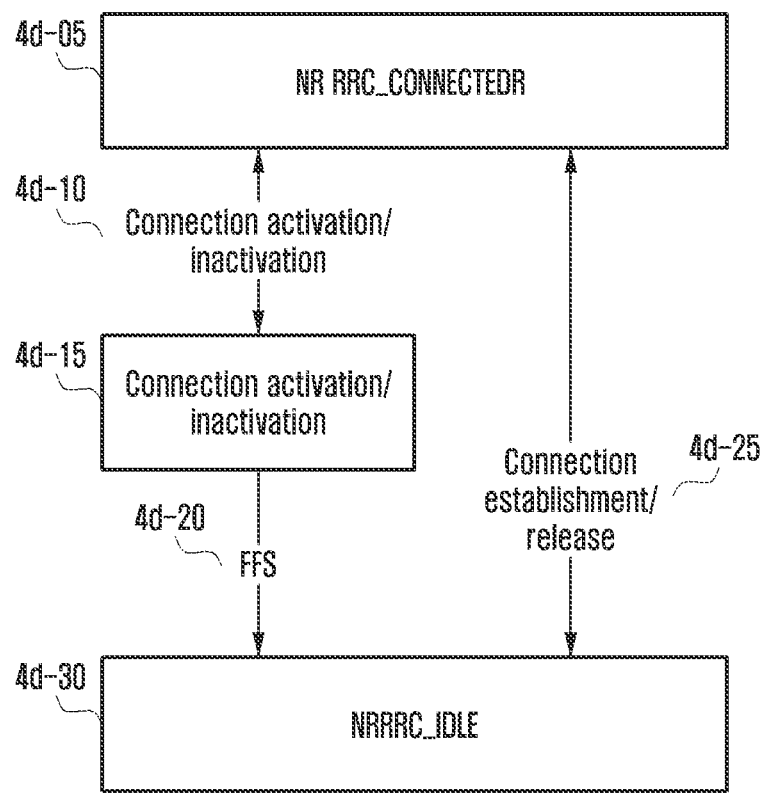
FIG. 4D is a diagram illustrating switching of a radio access state in a next-generation mobile communication system according to an embodiment of the disclosure.

FIG. 4D is a diagram for explaining switching of a radio access state in a next-generation mobile communication system according to an embodiment of the disclosure.

The next-generation mobile communication system has three radio connection states (RRC states). A connected mode (RRC_CONNECTED) 4d-05 is the radio access state in which the terminal may transmit and receive data. An idle mode (RRC IDLE) 4d-30 is a radio access state in which the terminal monitors whether a paging message is received. The above two modes are radio access states applied to the existing LTE system, and the detailed description thereof is the same as that of the existing LTE system. In the next-generation mobile communication system, an RRC INACTIVE radio access state (4d-15) has been newly defined. In this radio access state, the UE context is maintained in the base station and the terminal, and RAN-based paging is supported. The features of the new radio access state are listed as follows.

- Cell re-selection mobility;
- CN-NR RAN connection (both C/U-planes) has been established for UE;
- The UE AS context is stored in at least one gNB and the UE;
- Paging is initiated by NR RAN;
- RAN-based notification area is managed by NR RAN; and
- NR RAN knows the RAN-based notification area which the UE belongs to.

The new inactive radio access state may switch to the connected mode or the idle mode using a specific procedure. According to connection activation, the inactive mode switches to the connected mode, and the connected mode switches to the inactive mode using a connection inactivation procedure (4d-10). The connection activation/inactivation procedure is performed through one or more RRC messages between the terminal and the base station and includes one or more steps. The inactive mode may also switch to the idle mode according to a specific procedure (4d-20). A specific message exchange or timer-based or event-based various methods may be considered as the above-mentioned specific procedure. Switching between the connected mode and the idle mode follows the existing LTE technology. That is, the switching between the modes is performed through a connection establishment or release procedure (4d-25).

The embodiment of the disclosure proposes an operation of a terminal according to a procedure in which the base station configures a DRX cycle and according to the type of paging when the terminal in the RRC inactive state applies DRX. As described above, the existing LTE system applies UE_ID when calculating paging frames (PFs) and paging occasions (POs). In LTE, the UE_ID is defined as IMSI mod 1024. The MME provides the terminal with UE_ID information, instead of an IMSI. This is intended to maintain high security. The international mobile subscriber identity (IMSI) is a unique ID representing the user, and the MME is provided from a mobile communication service provider server. The IMSI may have a size of 15 digits or more and includes "MCC+MNC+MSIN". The MCC (mobile country code) is a country code, the MNC (mobile network code) is a service provider code, and the MSIN (mobile subscriber identification number) is a user code assigned by the service provider. In addition, the base station has only the UE_ID information, and calculates the time to transmit a paging message to the terminal, i.e., the PF and PO. In a next-generation mobile communication system, a base station may independently generate paging. This means that the base station may independently configure the PF or PO. However, if the base station has IMSI when configuring the PF or PO, it may be vulnerable in terms of security. Therefore, in the embodiment of the disclosure, a base station and a core network (e.g., an NG core in the embodiment of the disclosure) use the same PF and PO, and to this end, they also use the same UE_ID. In addition, the embodiment of the disclosure proposes to use SAE temporary mobile subscriber identity (S-TMSI), instead of the IMSI, in order to maintain high security. The S-TMSI is a unique ID indicating a specific terminal in a single MME group, and has a length (40 bits) less than that of the IMSI. The S-TMSI includes "MMEC+M-TMSI". The MMEC (MME code) is an ID indicating a specific MME in a single service provider network, and the M-TMSI (MME mobile subscriber identity) is an ID indicating a specific terminal in a single MME. In the disclosure, UE_ID is used as the following equation.

$$\text{UE\_ID} = S\text{-TMSI} \bmod N$$

N in the above equation is a positive integer, and may be, for example, 1024. In the next generation mobile communication system, it is assumed that since the NG core corresponds to the MME, the definition of the S-TMSI may be replaced with the NG Core of the next-generation mobile communication system, and that the concept of the ID is maintained even though the length of the ID may be different from that of the LTE.

The procedure of determining a DRX cycle in the existing LTE system has been described above. In the next-generation mobile communication system, it is assumed that the paging triggered by the base station and the paging triggered in the core network have the same paging cycle or a relationship of a common multiple. This is intended to eliminate unnecessary complexity and to minimize power consumption of a terminal. In order for the paging triggered by the base station to have the same paging cycle as that of the paging triggered in the core network or to have a common multiple relationship with the same, the base station must be aware of a paging cycle (a DRX period) derived through a predetermined procedure between the core network and the terminal. To this end, in the disclosure, the terminal reports a UE-specific DRX cycle or an eDRX cycle to the base station according to request of the base station. As an alternative, the base station may make a request to the NG core for a UE-specific DRX cycle, an eDRX cycle, or paging cycle information, which is derived through a predetermined procedure with the terminal, and the NG core may report the same to the base station. In an embodiment of the disclosure, the terminal may receive two types of paging, i.e., the paging triggered by the base station and the paging triggered by the core network. Therefore, the terminal performs different operations according to the type of the received paging. If the terminal receives the paging triggered by the core network, the terminal performs a service request.

If the terminal receives the paging triggered by the base station, the terminal performs RAN area update.

Figure 4E:
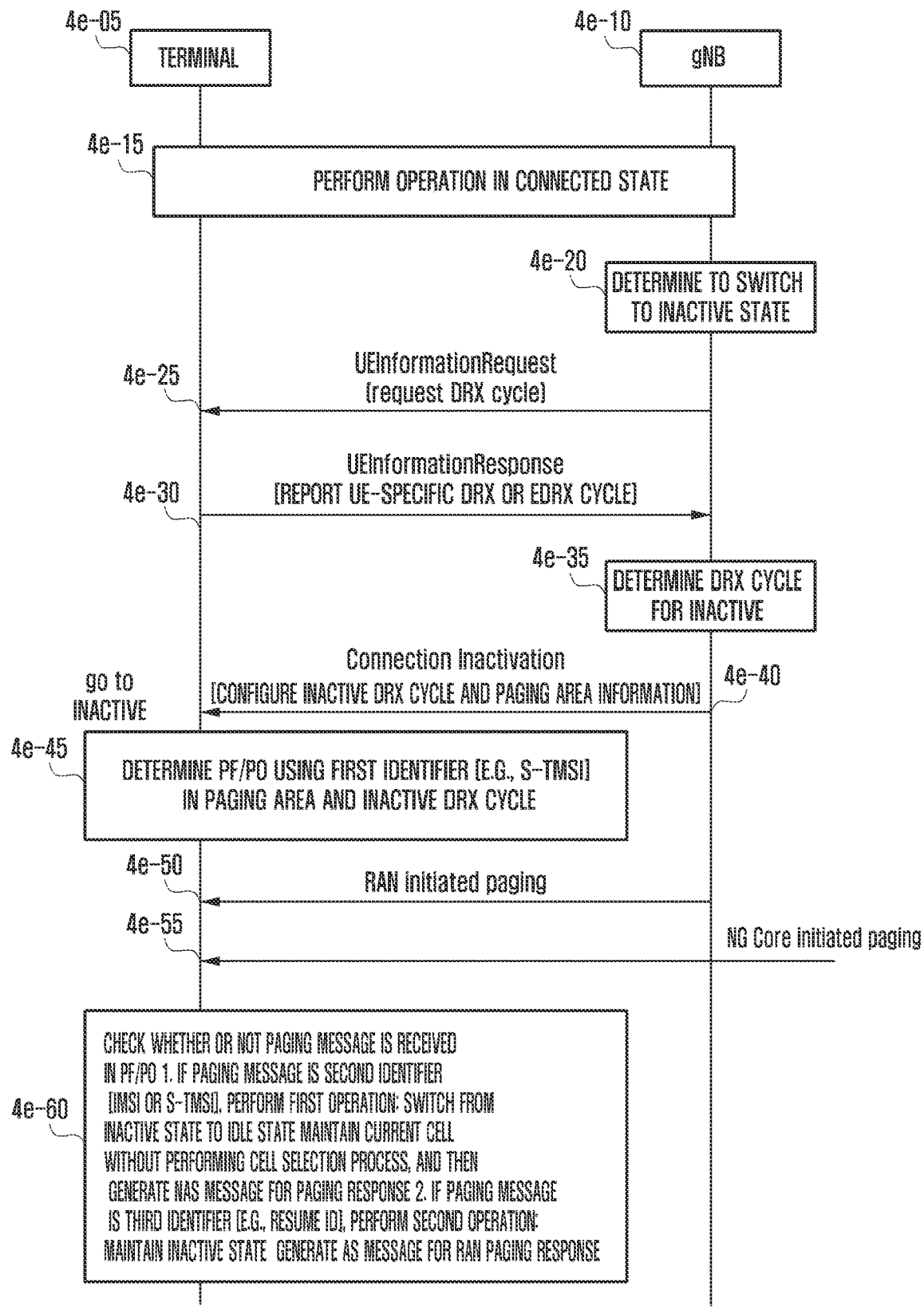
FIG. 4E is a flowchart illustrating a process of transmitting a paging message when a terminal is in an RRC inactive state according to an embodiment of the disclosure.

FIG. 4E is a flowchart illustrating a process of transmitting a paging message when a terminal is in an RRC inactive state according to an embodiment of the disclosure.

The terminal 4e-05 is in connection with the base station (gNB) 4e-10 (4e-15). In this case, the base station 4e-10 determines that the terminal 4g-05 is to switch to an inactive state (4e-20). The base station 4g-10 makes a request to the terminal 4g-05 for DRX cycle information of the terminal 4g-05 using a predetermined RRC message (4e-25). The DRX cycle information refers to a UE-specific DRX cycle or eDRX cycle value of the terminal. The terminal 4e-05 that has received the request transmits, to the base station 4e-10, the DRX cycle information using a predetermined RRC message (4e-30). Using the DRX cycle information reported by the terminal 4e-05, the base station 4e-10 derives a DRX cycle that the terminal 4e-05 in the inactive state applies (4e-35). The derived DRX cycle is the same as the DRX cycle determined by the terminal 4e-05 and the core network or has a common multiple relationship with the same. The base station 4e-10 instructs the terminal 4e-05 to switch to the inactive state using a predetermined RRC message (4e-40). The message includes a DRX cycle value to be applied by the terminal 4e-05 in the inactive state and paging area information. The terminal 4e-05 that has received the message switches to the inactive state and determines a timing at which the paging triggered by the base station 4e-10 is transmitted, i.e., the PF and PO, using the configuration information and the UE_ID (=S-TMSI mod N) previously provided from the core network (4e-45). The terminal 4e-05 may receive both the paging 4e-50 triggered by the base station 4e-10 and the paging 4e-55 triggered by the core network. When the terminal 4e-05 receives the paging message at the PF/PO above, the terminal 4e-05 determines a paging ID included in the paging message. The terminal 4e-05 performs one of the following operations according to the paging ID (4e-60). If the paging ID is a second identifier (IMSI or S-TMSI), the terminal performs a first operation. The first operation is as follows.

Switching from in an inactive state to an IDLE state

Generating a NAS message for paging response after maintaining the current cell without performing a cell selection process. The NAS message is a service request.

If the paging ID is a third identifier (e.g., RESUME ID), the terminal performs a second operation. The second operation is as follows.

Maintaining the inactive state

Generating an AS message for RAN paging response

The inactive UE may move to LTE. At this time, the terminal performs inter-RAT cell reselection, omits the cell selection process, and switches to the IDLE mode. In this case, the paging timing (PF/PO) is determined using a fourth identifier (IMSI) and CN paging cycle (the shorter one of the default DRX cycle and the UE DRX cycle, or the eDRX cycle).

Figure 4F:
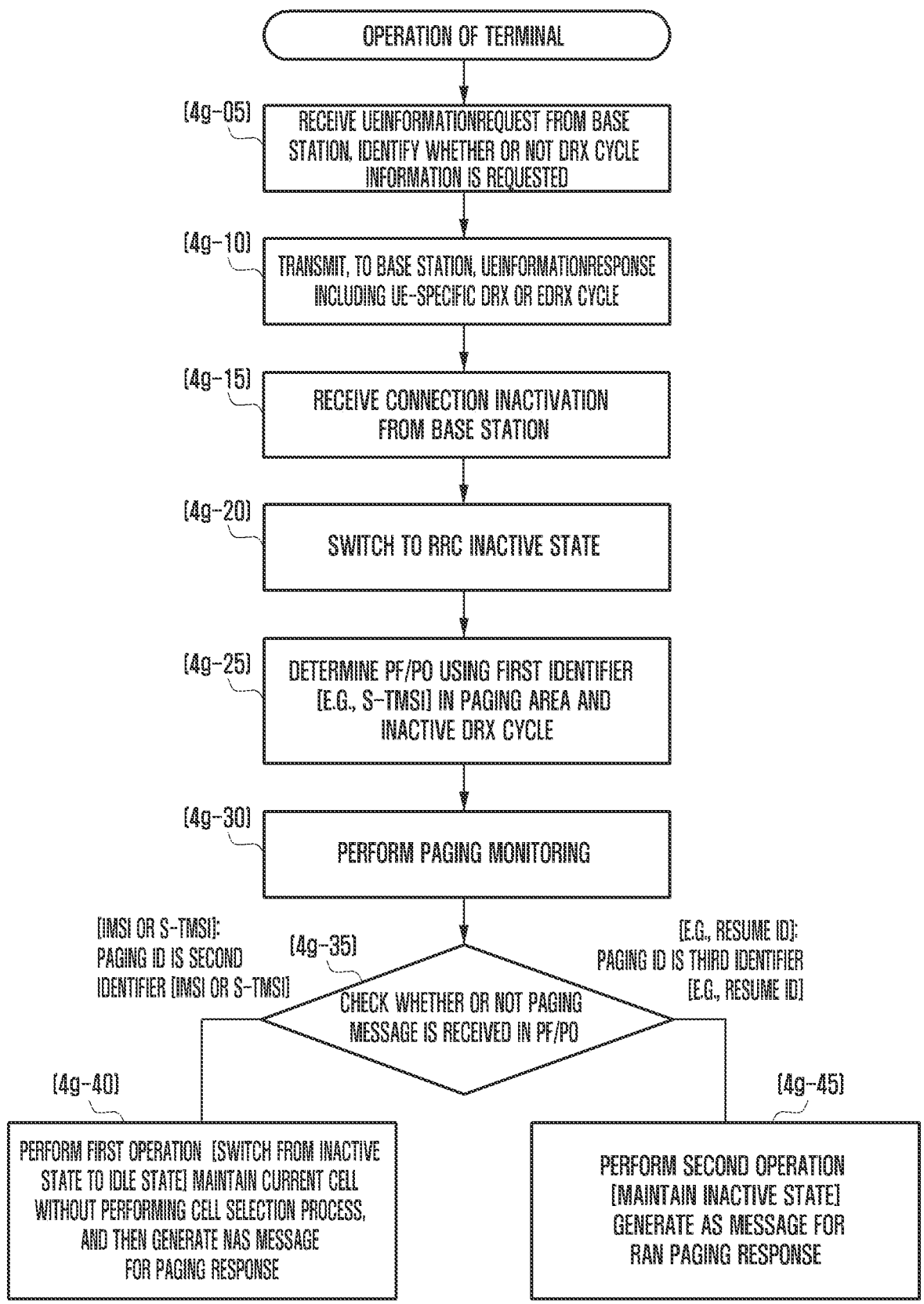
FIG. 4F is a diagram illustrating the operation of a terminal according to an embodiment of the disclosure.

FIG. 4F is a diagram for explaining the operation of a terminal according to an embodiment of the disclosure.

In step 4f-05, the terminal receives, from the base station, a predetermined RRC message requesting DRX cycle information of the terminal. In step 4f-10, the terminal that has received the request transmits, to the base station, the DRX cycle information using a predetermined RRC message. In step 4f-15, the terminal receives, from the base station, a predetermined RRC message instructing the terminal to switch to the inactive state. In step 4f-20, the terminal switches to the inactive state. The message includes a DRX cycle value be applied by the terminal in the inactive state and paging area information. In step 4f-25, the terminal determines the timing at which the paging triggered by the base station is transmitted, i.e., the PF and PO, within the paging area indicated above using the configuration information and the UE_ID (=S-TMSI mod N) previously provided from the core network. In step 4f-30, the terminal determines whether a paging message has been received. If one paging message is received, the terminal checks an identifier included in the paging message in step 4f-35. The terminal may receive both the paging message triggered by the base station and the paging message triggered the core network. The paging message triggered by the base station includes a third identifier, and the paging message triggered by the core network includes a second identifier. If the paging ID is a second identifier (IMSI or S-TMSI), the terminal performs a first operation in step 4f-40. The first operation has been described above. If the paging ID is a third identifier (e.g., RESUME ID), the terminal performs a second operation in step 4f-45. The second operation has been described above.

Figure 4G:
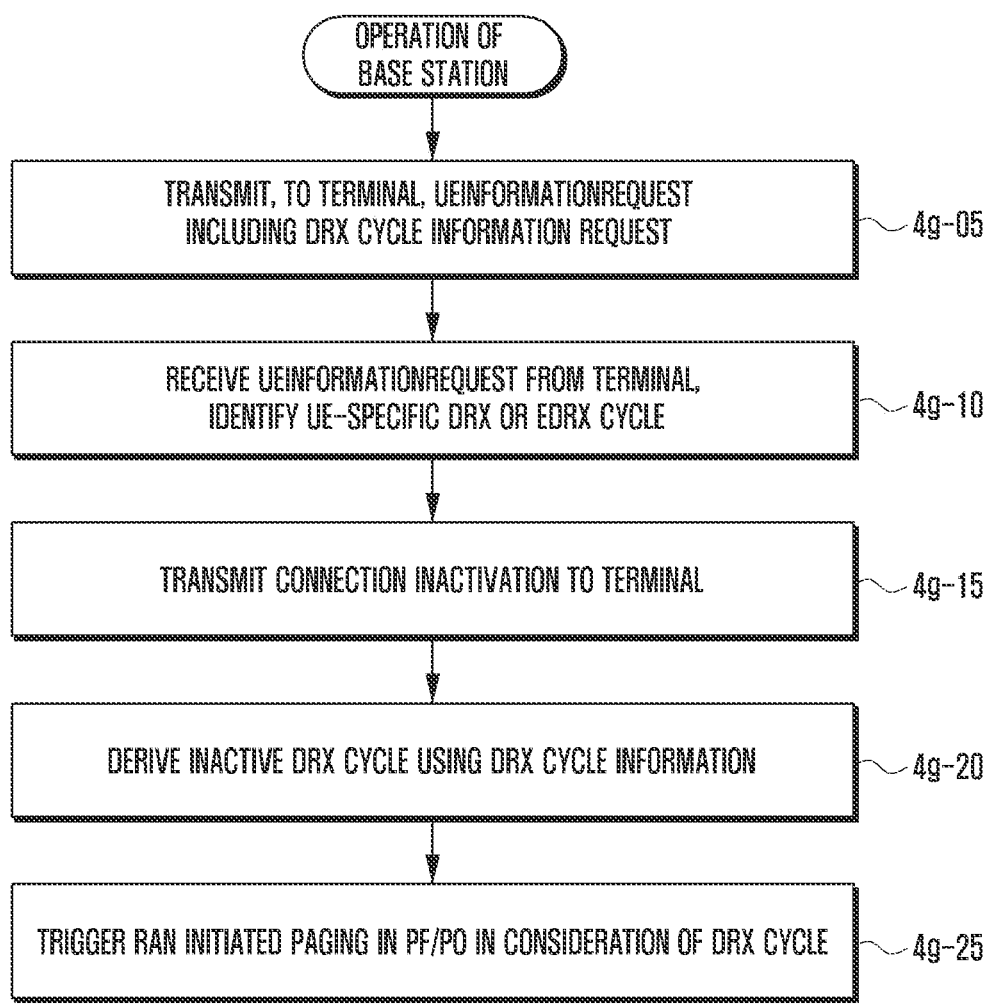
FIG. 4G is a diagram illustrating the operation of a base station according to an embodiment of the disclosure.

FIG. 4G is a diagram for explaining the operation of a base station according to an embodiment of the disclosure.

In step 4g-05, the base station transmits, to the terminal, a predetermined RRC message requesting DRX cycle information of the terminal. In step 4g-10, the base station receives a predetermined RRC message including the DRX cycle information from the terminal to which the request for information is transmitted. In step 4g-15, the base station transmits a predetermined RRC message instructing the terminal to switch to the inactive state. In step 4g-20, the base station derives a DRX cycle to be applied by the terminal in the inactive state using the reported information. In step 4g-25, the base station may transmit a paging message triggered by the base station at the PF and PO obtained by applying the derived DRX cycle.

Figure 4H:
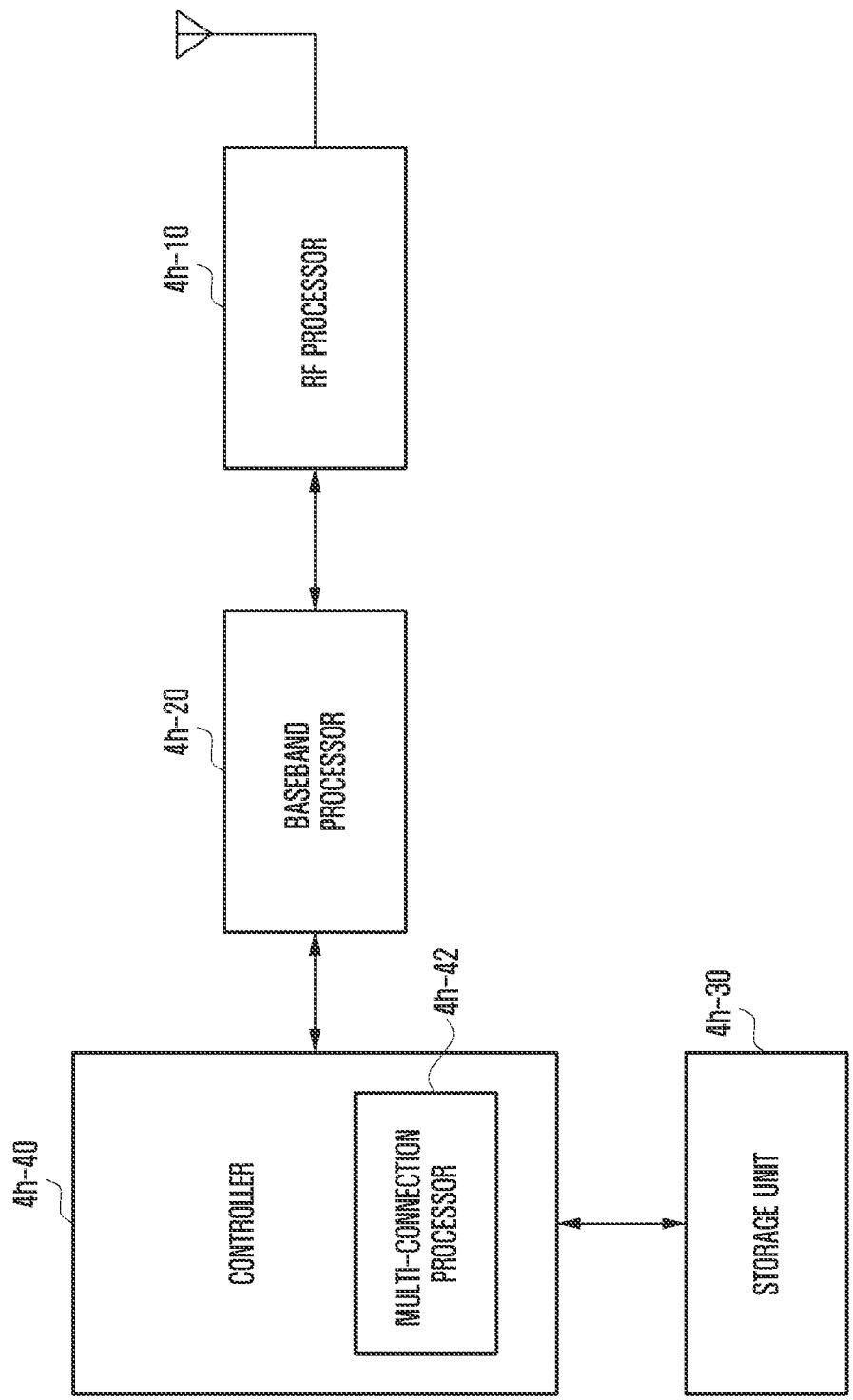
FIG. 4H is a block diagram illustrating the structure of a terminal according to an embodiment of the disclosure.
Figure 41:
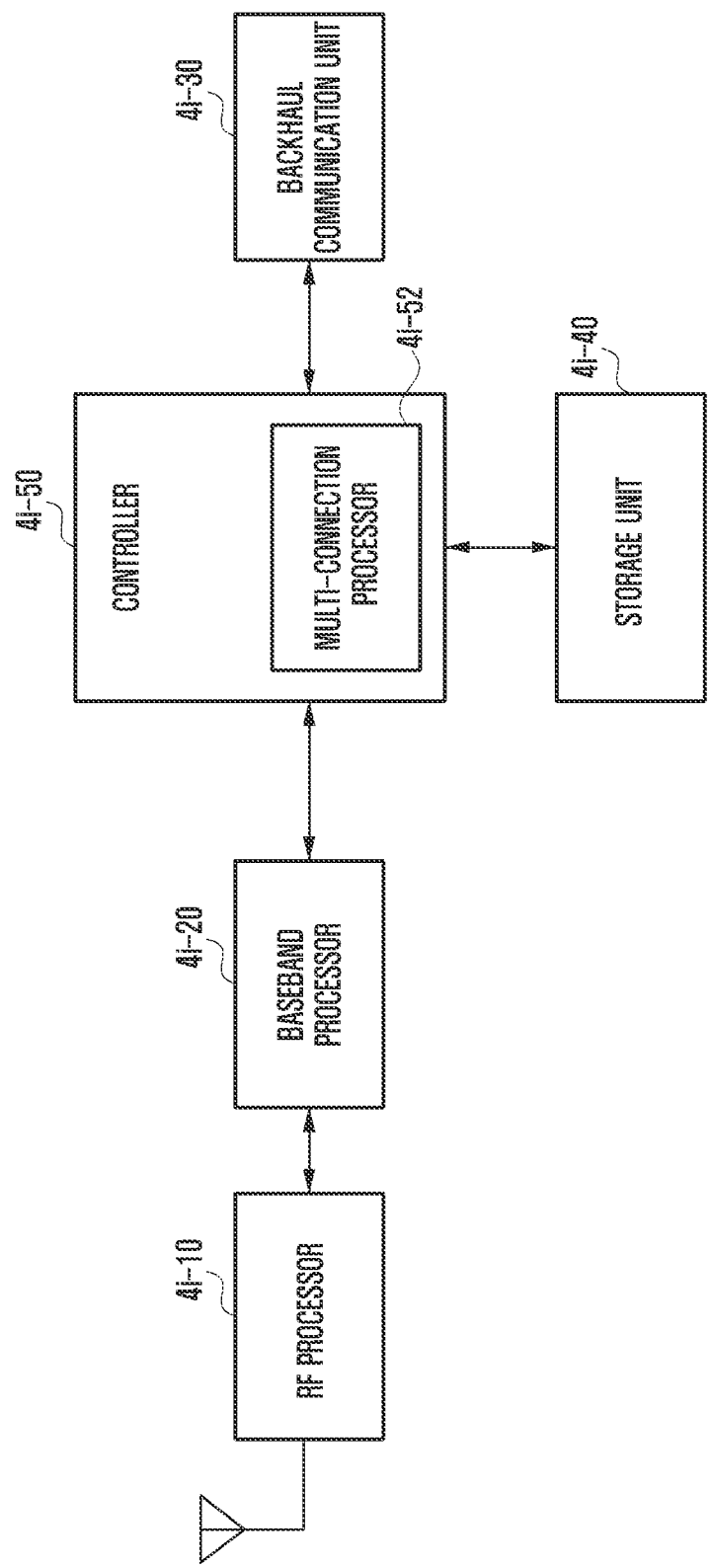

FIG. 4H is a diagram illustrating the structure of a terminal according to an embodiment of the disclosure.

Referring to the drawing above, the terminal includes a radio frequency (RF) processor 4h-10, a baseband processor 4h-20, a storage unit 4h-30, and a controller 4h-40.

The RF processor 4h-10 performs a function of transmitting and receiving a signal through a wireless channel, such as band conversion and amplification of a signal. That is, the RF processor 4h-10 up-converts a baseband signal provided from the baseband processor 4h-20 to an RF band signal to thus transmit the same through an antenna and down-converts an RF band signal received through the antenna to a baseband signal. For example, the RF processor 4h-10 may include a transmission filter, a reception filter, an amplifier, a mixer, an oscillator, a digital-to-analog converter (DAC), an analog-to-digital converter (ADC), and the like. Although only one antenna is illustrated in the above drawing, the terminal may have a plurality of antennas. In addition, the RF processor 4h-10 may include a plurality of RF chains. Further, the RF processor 4h-10 may perform beamforming. To perform beamforming, the RF processor 4h-10 may adjust the phases and magnitudes of signals transmitted and received through a plurality of antennas or antenna elements. In addition, the RF processor may perform MIMO, and may receive a plurality of layers when performing the MIMO operation.

The baseband processor 4h-20 performs a function of conversion between a baseband signal and a bit string according to the physical layer specification of the system. For example, in the case of data transmission, the baseband processor 4*h*-20 encodes and modulates transmission bit strings, thereby generating complex symbols. In addition, upon receiving data, the baseband processor 4*h*-20 demodulates and decodes a baseband signal provided from the RF processor 4*h*-10 to thus recover reception bit strings. For example, in the case where an orthogonal frequency division multiplexing (OFDM) scheme is applied, when transmitting data, the baseband processor 4*h*-20 generates complex symbols by encoding and modulating transmission bit strings, maps the complex symbols with subcarriers, and then configures OFDM symbols through an inverse fast Fourier transform (IFFT) operation and cyclic prefix (CP) insertion. In addition, when receiving data, the baseband processor 4*h*-20 divides the baseband signal provided from the RF processor 4*h*-10 into OFDM symbol units, restores the signals mapped with the subcarriers through a fast Fourier transform (FFT) operation, and then restores reception bit strings through demodulation and decoding.

The baseband processor 4*h*-20 and the RF processor 4*h*-10 transmit and receive signals as described above. Accordingly, the baseband processor 4*h*-20 and the RF processor 4*h*-10 may be referred to as a "transmitter", a "receiver", a "transceiver", or a "communication unit". Further, at least one of the baseband processor 4*h*-20 and the RF processor 4*h*-10 may include a plurality of communication modules to support a plurality of different radio access technologies. In addition, at least one of the baseband processor 4*h*-20 and the RF processor 4*h*-10 may include different communication modules to process signals of different frequency bands. For example, the different radio access technologies may include wireless LANs (e.g., IEEE 802.11), cellular networks (e.g., LTE), and the like. In addition, the different frequency bands may include super-high frequency (SHF) (e.g., 2.NRHz or NRhz) bands and millimeter wave (e.g., 60 GHz) bands.

The storage unit 4*h*-30 stores data such as basic programs, application programs, and configuration information for the operation of the terminal. In particular, the storage unit 4*h*-30 may store information related to a second access node for performing wireless communication using a second radio access technique. In addition, the storage unit 4*h*-30 provides the stored data according to a request by the controller 4*h*-40.

The controller 4*h*-40 controls the overall operation of the terminal. For example, the controller 4*h*-40 transmits and receives signals through the baseband processor 4*h*-20 and the RF processor 4*h*-10. In addition, the controller 4*h*-40 records and reads data in and from the storage unit 4*h*-30. To this end, the controller 4*h*-40 may include at least one processor. For example, the controller 4*h*-40 may include a communication processor (CP) for controlling communication and an application processor (AP) for controlling higher layers such as application programs.

FIG. 4I is a block diagram of the configuration of a base station in a wireless communication system according to an embodiment of the disclosure.

As shown in the drawing, the base station includes an RF processor 4*i*-10, a baseband processor 4*i*-20, a backhaul communication unit 4*i*-30, a storage unit 4*i*-40, and a controller 4*i*-50.

The RF processor 4*i*-10 performs a function of transmitting and receiving signals, such as band conversion and amplification of a signal, through a wireless channel. That is, the RF processor 4*i*-10 up-converts a baseband signal provided from the baseband processor 4*i*-20 to an RF band signal, to thus transmit the same through an antenna, and down-converts an RF band signal received through the antenna to a baseband signal. For example, the RF processor 4*i*-10 may include a transmission filter, a reception filter, an amplifier, a mixer, an oscillator, a DAC, an ADC, and the like. Although only one antenna is shown in the drawing, the first access node may have a plurality of antennas. In addition, the RF processor 4*i*-10 may include a plurality of RF chains. Further, the RF processor 4*i*-10 may perform beamforming. To perform beamforming, the RF processor 4*i*-10 may adjust the phases and magnitudes of signals transmitted and received through a plurality of antennas or antenna elements. The RF processor may perform a downlink MIMO operation by transmitting one or more layers.

The baseband processor 4*i*-20 performs a function of conversion between a baseband signal and a bit string according to a physical layer specification of a first radio access technique. For example, in the case of data transmission, the baseband processor 4*i*-20 encodes and modulates transmission bit strings, thereby generating complex symbols. In addition, upon receiving data, the baseband processor 4*i*-20 demodulates and decodes a baseband signal provided from the RF processor 4*i*-10 to thus recover reception bit strings. For example, in the case where an OFDM scheme is applied, when transmitting data, the baseband processor 4*i*-20 generates complex symbols by encoding and modulating transmission bit strings, maps the complex symbols with subcarriers, and then configures OFDM symbols through the IFFT operation and CP insertion. In addition, when receiving data, the baseband processor 4*i*-20 divides the baseband signal provided from the RF processor 4*i*-10 into OFDM symbol units, restores the signals mapped with the subcarriers through the FFT operation, and then restores reception bit strings through demodulation and decoding. The baseband processor 4*i*-20 and the RF processor 4*i*-10 transmit and receive signals as described above. Accordingly, the baseband processor 4*i*-20 and the RF processor 4*i*-10 may be referred to as a "transmitter", a "receiver", a "transceiver", a "communication unit", or a "wireless communication unit".

The backhaul communication unit 4*i*-30 provides an interface for performing communication with other nodes in the network. That is, the backhaul communication unit 4*i*-30 converts a bit string, transmitted from the primary base station to another node, such as a secondary base station, a core network, etc., into a physical signal, and converts physical signals received from other nodes into bit strings.

The storage unit 4*i*-40 stores data such as basic programs, application programs, and configuration information for the operation of the primary base station. In particular, the storage unit 4*i*-40 may store information about bearers allocated to a connected terminal, a measurement result reported from a connected terminal, and the like. In addition, the storage unit 4*i*-40 may store information that is a criterion for determining whether multiple connections are provided to the terminal or are released. In addition, the storage unit 4*i*-40 provides the stored data in response to a request from the controller 4*i*-50.

The controller 4*i*-50 controls the overall operation of the primary base station. For example, the controller 4*i*-50 transmits and receives signals through the baseband processor 4*i*-20 and the RF processor 4*i*-10 or the backhaul communication unit 4*i*-30. In addition, the controller 4*i*-50 records and reads data in and from the storage unit 4*i*-40. To this end, the controller 4*i*-50 may include at least one processor.

Fifth Embodiment

Hereinafter, a detailed description of known functions and configurations incorporated herein will be omitted if the description obscures the subject matter of the disclosure. Hereinafter, an embodiment of the disclosure will be described with reference to the accompanying drawings.

Figure 5A:
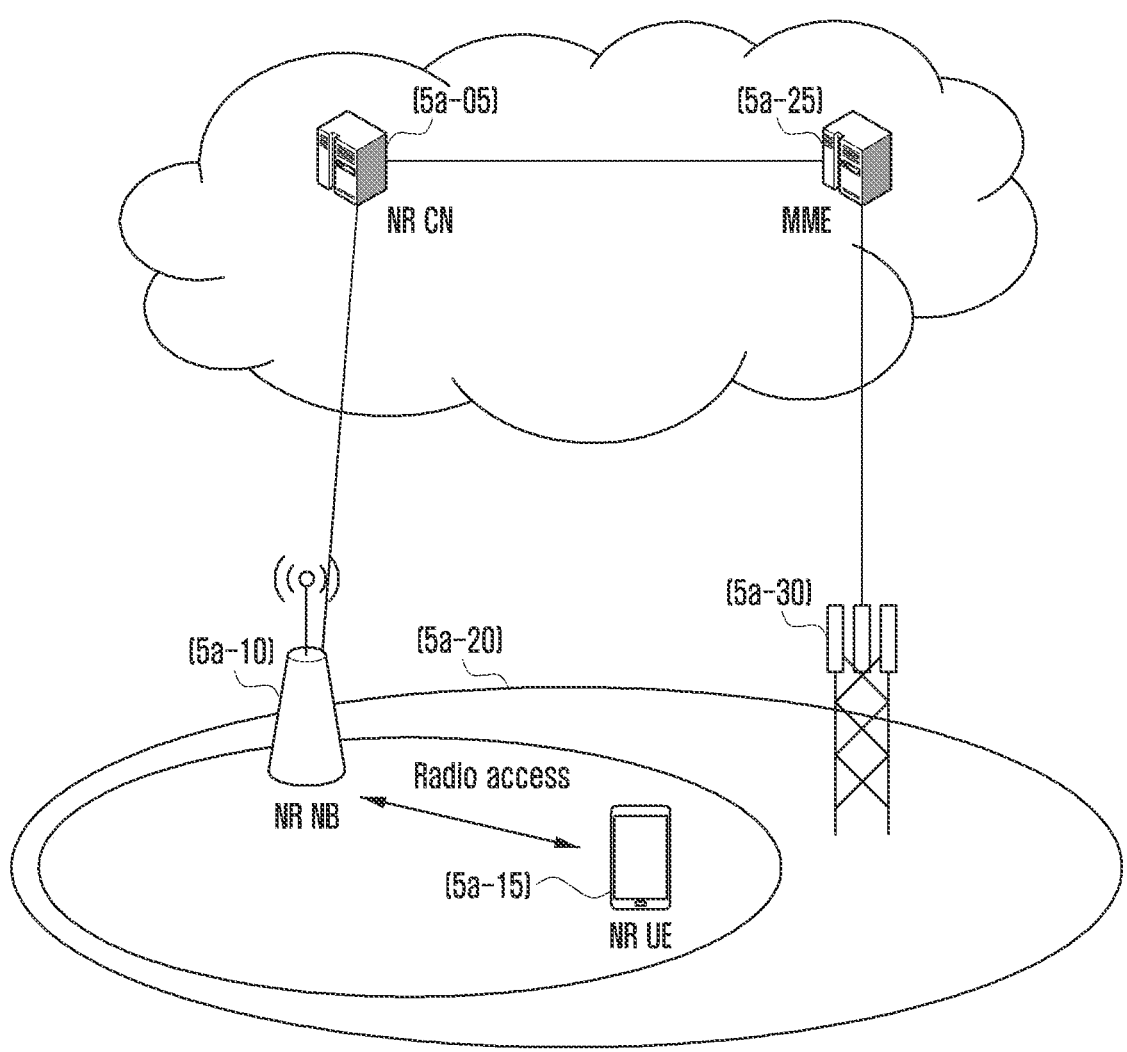
FIG. 5A is a diagram illustrating the structure of a next-generation mobile communication system according to an embodiment of the disclosure.

FIG. 5A is a diagram illustrating the structure of a next-generation mobile communication system according to an embodiment of the disclosure.

Referring to FIG. 5A, a wireless access network of a next-generation mobile communication system includes a new radio node B (hereinafter, referred to as "NR NB") 5a-10 and a new radio core network (NR CN) 5a-05 as shown in the drawing. New radio user equipment (hereinafter, referred to as "NR UE" or a "terminal") 5a-15 accesses an external network through the NR NB 5a-10 and the NR CN 5a-05.

In FIG. 5A, the NR NB 5a-10 corresponds to an evolved node B (eNB) of an existing LTE system. The NR NB is connected to the NR UE 5a-15 through a wireless channel, and may provide services superior to those of the existing node B. In the next-generation mobile communication system, since all user traffic is served through a shared channel, a device for collecting status information, such as buffer status, available transmission power status, and channel status of UEs, and performing scheduling is required. The NR NB 5a-10 serves as such a device. One NR NB typically controls multiple cells. In order to realize super-high data rates compared to the existing LTE system, the next-generation mobile communication system may have a bandwidth equal to or greater than the maximum bandwidth of the existing system, may employ, as wireless access technology, orthogonal frequency division multiplexing (hereinafter, referred to as "OFDM"), and may further employ a beamforming technique in addition thereto. In addition, an adaptive modulation and coding (hereinafter, referred to as "AMC") scheme is applied to determine a modulation scheme and a channel coding rate in accordance with the channel status of a terminal. The NR CN 5a-05 performs functions such as mobility support, bearer configuration, and QoS configuration. The NR CN 5a-05 is a device that performs various control functions, as well as a mobility management function for a terminal, and is connected to a plurality of base stations. In addition, the next-generation mobile communication system may interwork with the existing LTE system, and the NR CN 5a-05 is connected to an MME 5a-25 through a network interface. The MME 5a-25 is connected to the eNB 5a-30, which is an existing base station.

Figure 5B:
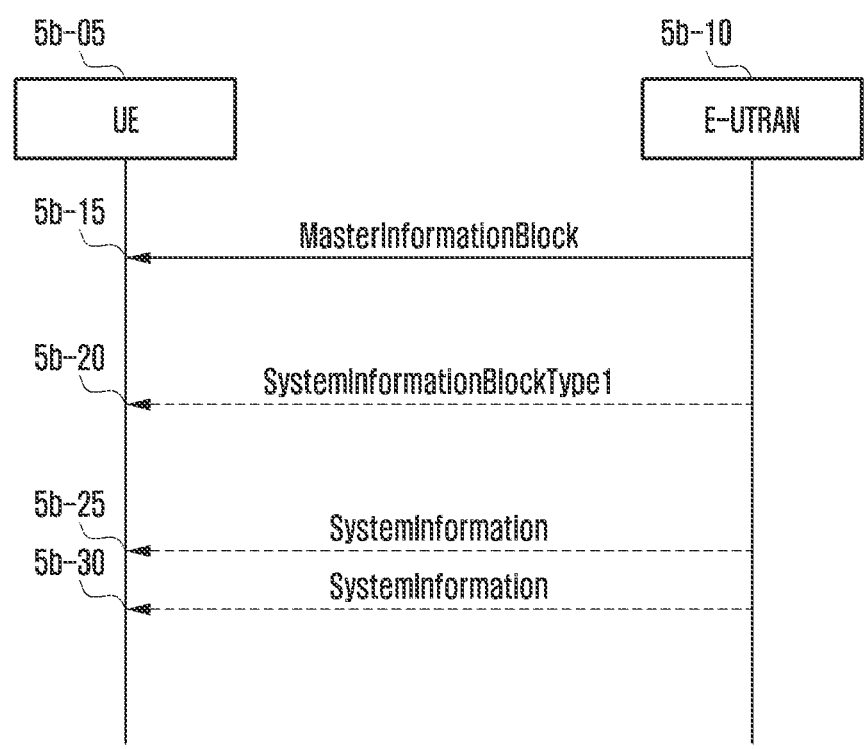
FIG. 5B is a diagram illustrating a method of providing system information in an LTE system according to an embodiment of the disclosure.

FIG. 5B is a diagram illustrating a method of providing system information in an LTE system according to an embodiment of the disclosure.

In the LTE system, the system information broadcast by the base station 5b-10 is divided into "MasterInformationBlock" (MIB) and several "SystemInformationBlocks" (SIBs) to then be transmitted to the terminal 5b-05. The MIB 5b-15 includes only limited pieces of essential information and periodically transmits necessary information in order to obtain other information from the cell. The SIBs 5b-25, excluding SIB 1 (5b-15), are transmitted using a system information (SI) message, and the mapping information between the SIB and the SI message is included in SIB 1 (5b-15). Each SIB can be included in only one SI message. SIB 1 (5b-15) includes SI scheduling information necessary for receiving another SIB 5b-25. SIB 1 also includes "systemInfoValueTag" IE, which is information related to SI update. The value tag information is incremented by 1 each time the SIBs, excluding MIB, SIB 1, SIB 10, SIB 11, SIB 12, and SIB 14, are updated. This is used for the terminal to determine whether its own system information matches the system information currently being broadcast. In the LTE system, the value tag may be configured as 5 bits, and may be counted from 0 to 31. Thus, if the value tag is changed 32 times or more, the value tag is wrapped around to zero. Thus, it may be inappropriate to determine whether the stored system information is the latest version using the value tag after a long time. Therefore, the terminal has a validity timer and resets the timer every time the SI update occurs. If the timer expires, the terminal updates the system information again. In the LTE system, the duration of the timer is 3 hours.

Figure 5C:
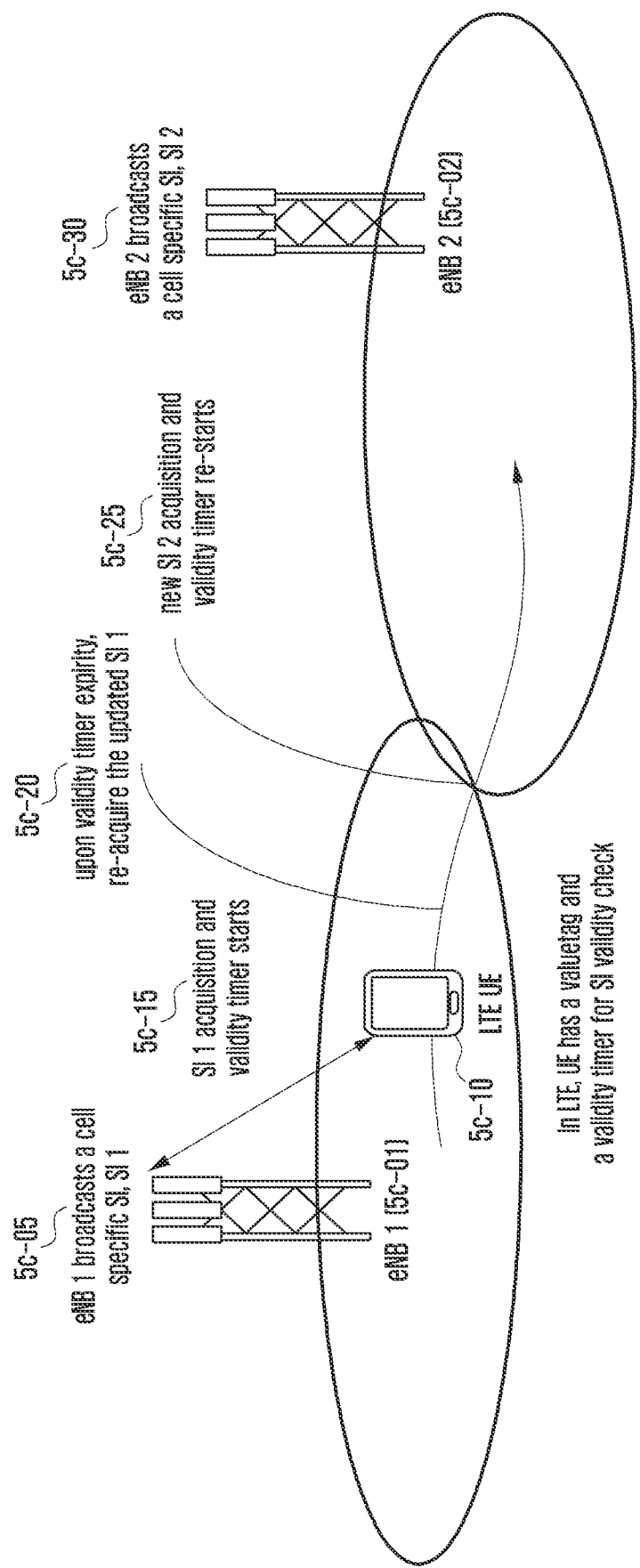
FIG. 5C is a diagram illustrating a method for updating system information in an LTE system according to an embodiment of the disclosure.

FIG. 5C is a diagram illustrating a method for updating system information in an LTE system according to an embodiment of the disclosure.

System information broadcast by a first LTE base station (eNB1) 5c-01 (hereinafter, referred to as a "first base station") is valid only in the corresponding base station (5c-05). System information broadcast by a second base station (eNB2) 5c-02 is valid only in the corresponding base station (5c-30). If the terminal 5c-10 newly receives system information broadcast from the first base station 5c-05, the terminal drives only one validity timer (5c-15). In addition, the terminal 5c-10 records value tag information provided in SIB 1. The value tag is incremented by 1 each time the system information is updated. If the terminal 5c-10 returns from the shadow area, the terminal compares the stored value tag with the value tag included in the currently broadcast SIB 1, and if the stored value tag is the same as the value tag included in the SIB 1, the terminal does not perform system information update. If the stored value tag is different from the value tag included in the SIB 1, it means that the system information has been changed while the terminal 5c-10 is staying in the shaded area, and thus the terminal 5c-10 must receive newly updated system information. If the validity timer expires, the terminal 5c-10 acquires system information again from the first base station 5c-01 (5c-20). If the terminal 5c-10 moves to the service area of the adjacent second base station (eNB2) 5c-02, the terminal 5c-10 receives new system information broadcast from the second base station 5c-02 and resets the validity timer in operation, thereby restarting the same (5c-25). At this time, the terminal 5c-10 records the value tag information provided in the SIB 1 transmitted by the second base station 5c-02.

Figure 5D:
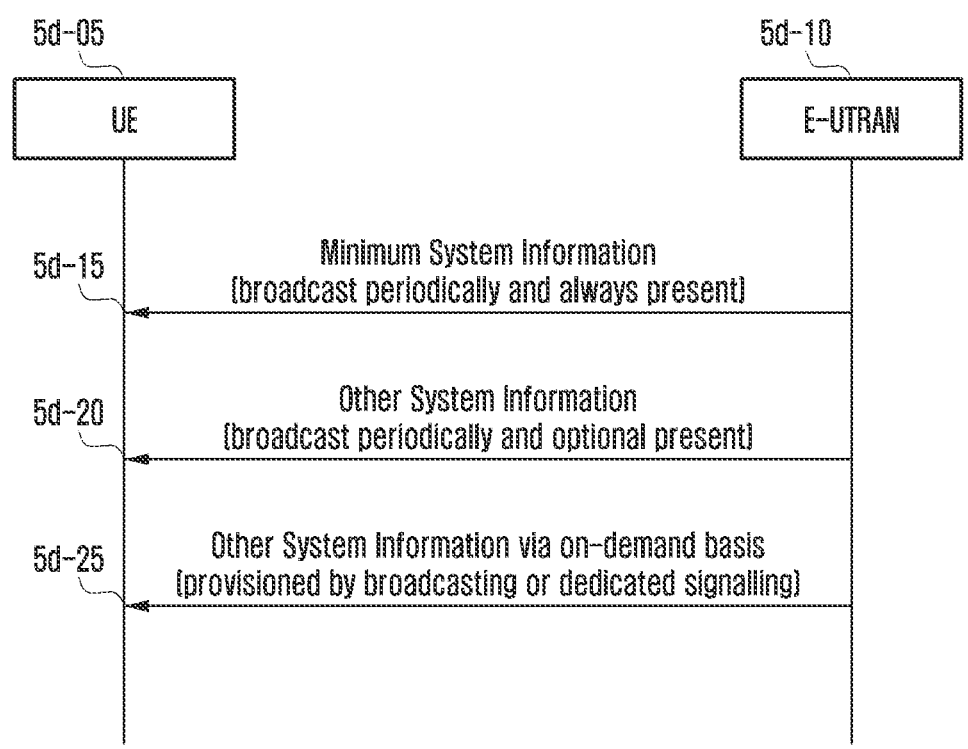
FIG. 5D is a diagram illustrating a method of providing system information in a next-generation mobile communication system according to an embodiment of the disclosure.

FIG. 5D is a diagram illustrating a method of providing system information in a next-generation mobile communication system according to an embodiment of the disclosure.

In the next-generation mobile communication system, the system information broadcast by the base station 5d-10 is divided into minimum system information (SI) and other system information. The minimum SI is broadcast periodically (5d-15) and includes configuration information necessary for initial access and SI scheduling information necessary for receiving other SI broadcast periodically or upon a request. Basically, the other SI includes all configuration information, which is not included in the minimum SI. The other SI is broadcast periodically (5d-20) or upon a request of the terminal, or is provided from the base station (gNB) 5d-10 to the terminal (UE) 5d-05 using dedicated signaling (5d-25). In the case where the terminal 5d-05 requests and receives the other SI, the terminal 5d-05 needs to check whether the other SI is valid in the cell or whether the other SI is currently being broadcast (by the request of another terminal) before making the request. The checking above may be performed through specific information provided by the minimum SI. A terminal in an idle mode (RRC IDLE) or in an inactive mode (RRC INACTIVE) may request the other SI without changing the current RRC state. A terminal in a connected mode (RRC_CONNECTED) may request and receive the other SI through dedicated RRC signaling. The other SI is broadcast for a predetermined period of time in every configured cycle. Public warning system (PWS) information is categorized and provided as the other SI. Whether to broadcast the other SI or whether to provide the other SI via dedicated RRC signaling depends on network implementation.

Figure 5E:
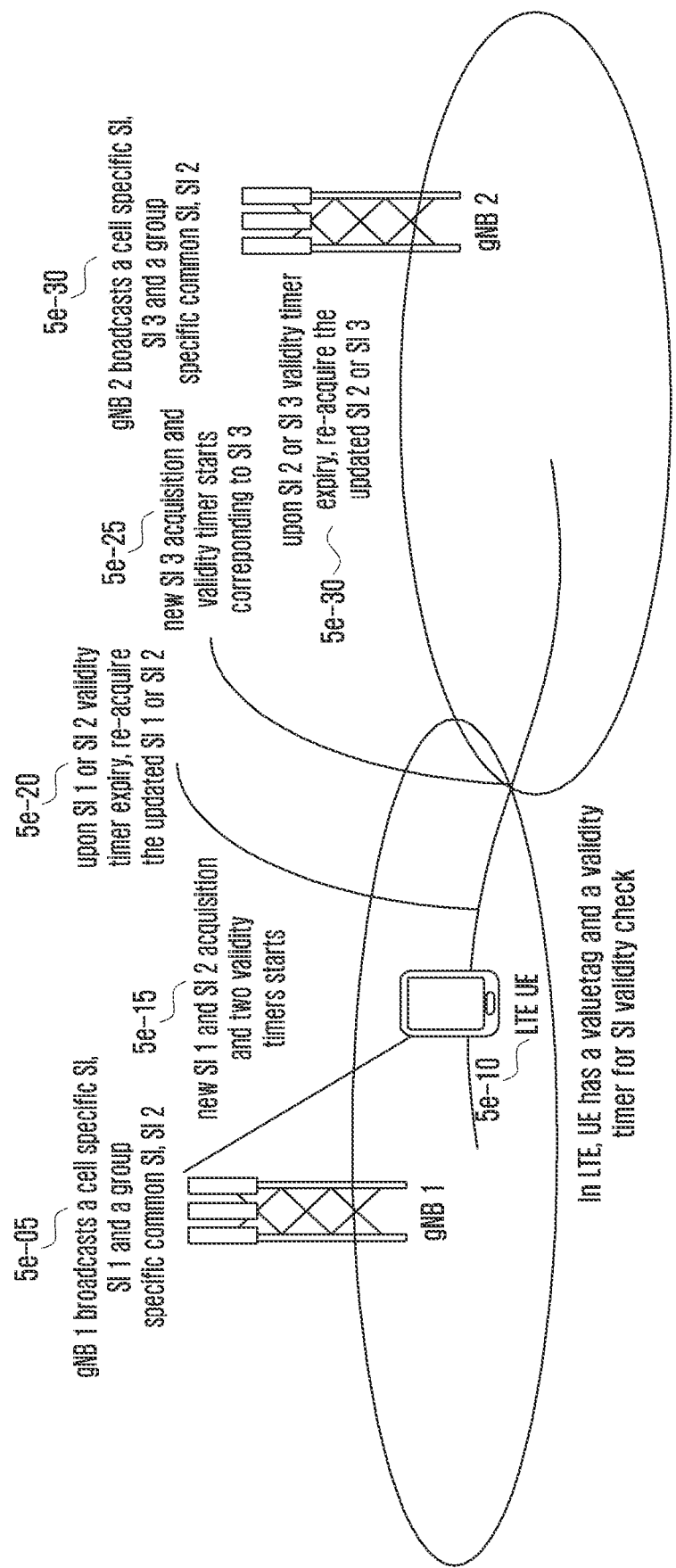
FIG. 5E is a diagram illustrating a method for updating system information according to an embodiment of the disclosure.

FIG. 5E is a diagram for explaining a method for updating system information according to an embodiment of the disclosure.

As described above, in LTE, system information is reacquired every 3 hours, regardless of whether the value tag is changed. This is intended to prevent the case where the same value as that of the terminal 5e-10 is used because the value tag is wrapped around for 3 hours. In addition, if the terminal 5e-10 changes a serving cell, the terminal 5e-10 reacquires system information and resets the validity timer, regardless of a change in the value tag.

The embodiment of the disclosure shows first system information applied to only one cell and second system information commonly applied to an area including several cells adjacent to each other. A specific cell provides the first system information and the second system information to the terminal 5e-10 (5e-05). In addition, the first system information and the second system information may have a first value tag and a first validity timer, and a second value tag and a second validity timer, respectively. The first validity timer may not be used. If the timer is configured, the terminal 5e-10 may start the corresponding timer. The updating of the first system information may be performed by a method of updating system information in the LTE system. With regard to the second system information, the terminal 5e-10 reacquires the second system information every time the validity timer expires in the same cell (5e-20). However, the terminal reacquires the second system information only if the value tag is different when the cell is changed, and if the value tag is the same, the terminal does not perform reacquisition of the second system information and reset of the validity timer even if the cell is changed (5e-25).

If a specific area including a plurality of cells is changed, the terminal 5e-10 updates the second system information, regardless of the second value tag value. If the terminal 5e-10 is able to store system information for the corresponding cell or area, it is also possible to maintain a validity timer corresponding to the system information. This is intended to prevent the terminal 5e-10 from unnecessarily reacquiring identical second system information when the terminal 5e-10 returns to the previous area. The following table summarizes the operation of a terminal in relation to update of system information in a specific situation in the disclosure.

TABLE 1

|  | LTE | NR |
|---|---|---|
| Validity timer | Use one value tag and one validity timer for all system information | First system information valid only in one cell and second system information valid in specific cell group have corresponding value tag and validity timer, respectively |
| Terminal operation in same cell | Update entire system information every time validity timer expires Re-drive validity timer every time system information is acquired | If validity timer expires, system information corresponding to the expired validity timer is updated. System information updating method follows method of obtaining minimum SI or other SI. In addition, validity timer is restarted. |
| If cell is changed in same area to which second system information is applied | Update system information and re-drive validity timer | Update first system information and restart first validity timer regardless of first value tag. Update second system information and restart second validity timer only if second value tag is different. Otherwise, if second value tag is same, second system information is not updated, and validity timer remains in operation |
| When cell is changed to another area to which other second system information is applied | Same as above | Update first and second system information and restart first and second validity timers regardless of first and second value tags |
| Stored SI for another cell/area | Not implemented | If system information about area x is acquired, terminal drives validity timer. When validity timer expires, if terminal is still in area x, system information is re-acquired. When validity timer expires, if terminal is in area y, system information is discarded. On-demand SI procedure is not started. |

Figure 5F:
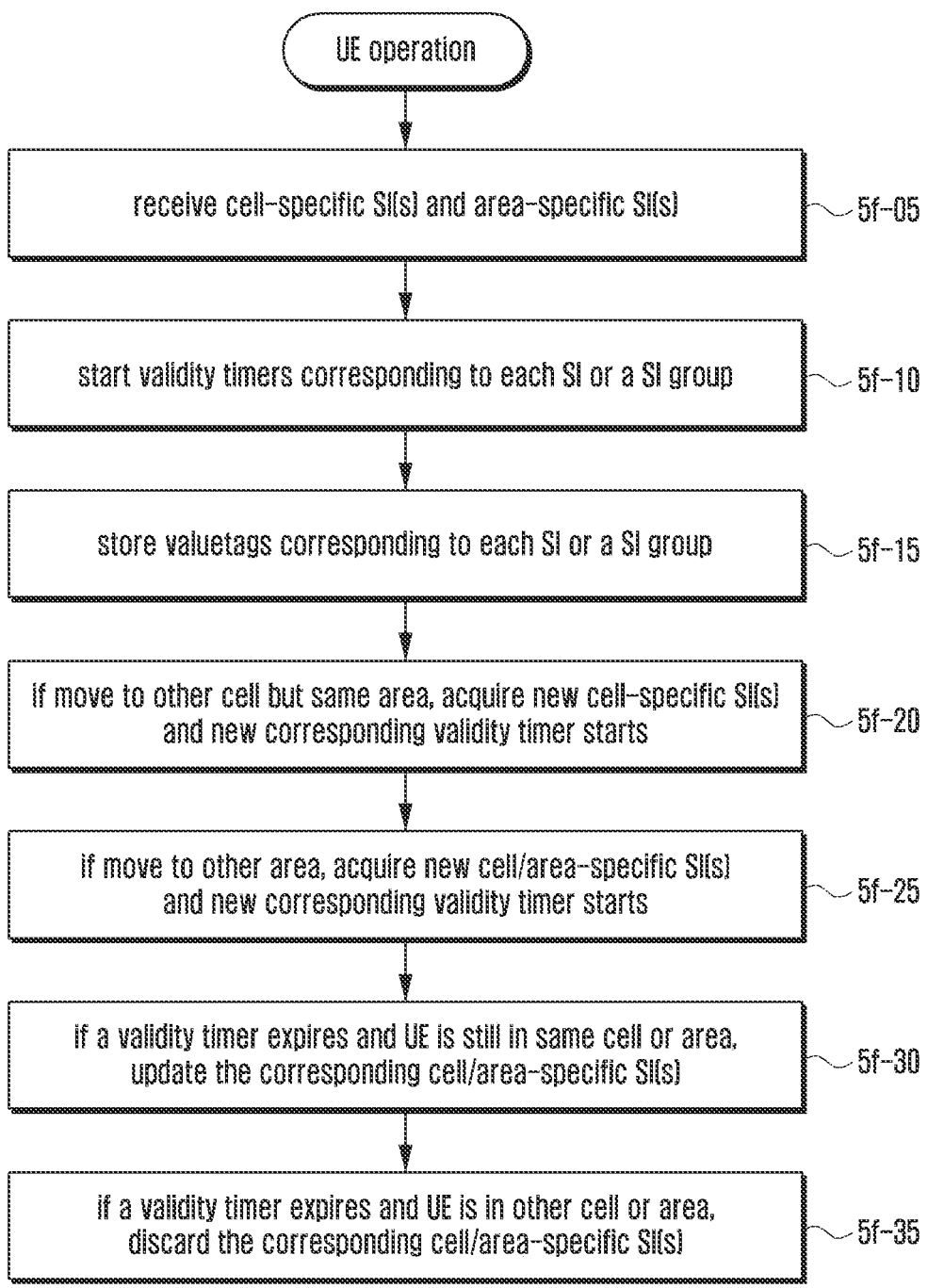
FIG. 5F is a diagram illustrating the operation of a terminal for operating cell- or area-based system information and a validity timer corresponding thereto according to an embodiment of the disclosure.

FIG. 5F is a diagram illustrating the operation of a terminal for operating cell- or area-based system information and a validity timer corresponding thereto according to an embodiment of the disclosure.

In step 5f-05, the terminal receives first system information and second system information from the base station. The system information is provided to the terminal by means of periodical broadcasting, request-based broadcasting, or dedicated signaling. The first system information may be a cell-specific SI(s) applied only to one cell, and the second system information may be an area-specific SI(s), which may be commonly applied to an area including several cells adjacent to each other (a group including a plurality of cells). The first system information may include a master information block (MIB). In addition, the first system information may include system information block 1 (SIB 1). The second system information may include system information, excluding the first system information.

In step 5f-10, the terminal drives a first validity timer and a second validity timer corresponding to the first system information and the second system information, respectively. In step 5f-15, the terminal stores a first value tag and a second value tag corresponding to the first system information and the second system information. The first and second value tag information is provided as specific system information such as minimum SI. The first validity timer may not be configured, and in this case, an operation of driving the validity timer 1 and operations according thereto may be omitted below.

In step 5f-20, if the terminal moves to another cell in the area sharing the second system information, the terminal updates only the first system information and restarts the first validity timer corresponding thereto. In step 5f-25, if the terminal moves to another cell in the area where the second system information is not shared, the terminal updates both the first and second systems and restarts the validity timers corresponding thereto.

In step 5f-30, if the terminal is still within the same cell or area when a specific validity timer expires, the terminal updates the system information corresponding thereto. In step 5f-35, if the terminal is in another cell or area when a specific validity timer expires, the terminal deletes system information corresponding thereto.

Figure 5G:
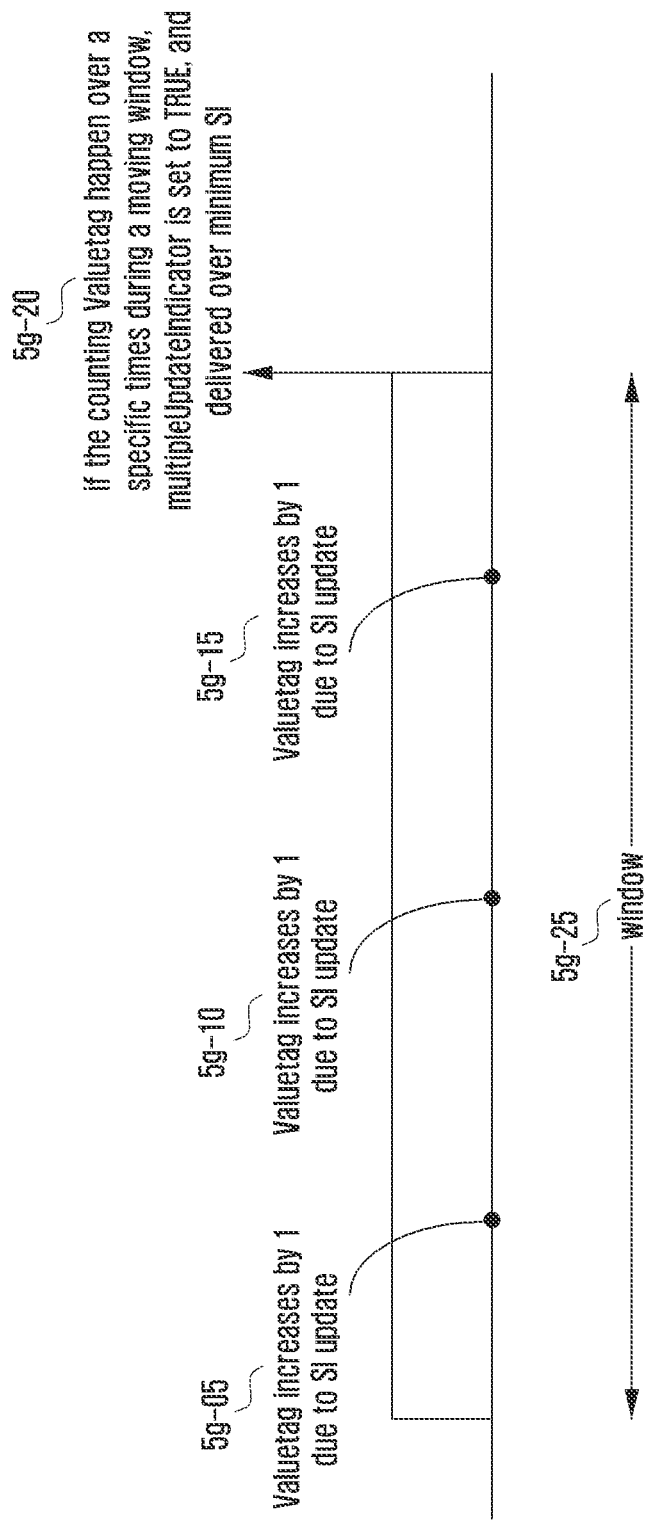
FIG. 5G is a diagram illustrating a method of performing system information update according to an embodiment of the disclosure.

FIG. 5G is a diagram for explaining a method of performing system information update according to an embodiment of the disclosure.

Reacquisition of the system information every time the validity timer expires, regardless of whether the value tag is changed, is due to the fact that the value tag is wrapped around after a long time so that the same value as the value held by the terminal may be used. If the base station provides the system information stating that the value tag has not been changed by a specific number of times within a specific period of time before the current time, the terminal may determine whether the stored value tag value is still valid even if the validity timer expires. For example, even though the validity timer has expired, there is no need to update the value tag (length=n bits) unless it changes $2n$ times. Therefore, the base station provides the value tag corresponding to the system information and 1-bit information (multipleUpdateIndicator) indicating whether the system information has been updated $2n$ times or more within a specific period of time before the current time (5g-05, 5g-10, and 5g-15) using specific system information, such as minimum SI and the like (5g-20). If the information is "TRUE", it means that the system information has been updated $2n$ times or more. If it is "FALSE", it means that the system information has not been updated $2n$ times or more. The specific period of time is shorter than the duration of the validity timer. The terminal checks "multipleUpdateIndicator" provided from the specific system information immediately before or when the validity timer expires, and if the indicator is "TRUE", discards the system information and reacquires system information. If the indicator is "FALSE" and if the value tag is different, the terminal reacquires system information. If the indicator is "FALSE" and if the value tag is the same, the terminal applies the currently stored system information and restarts the validity timer corresponding thereto.

Figure 5H:
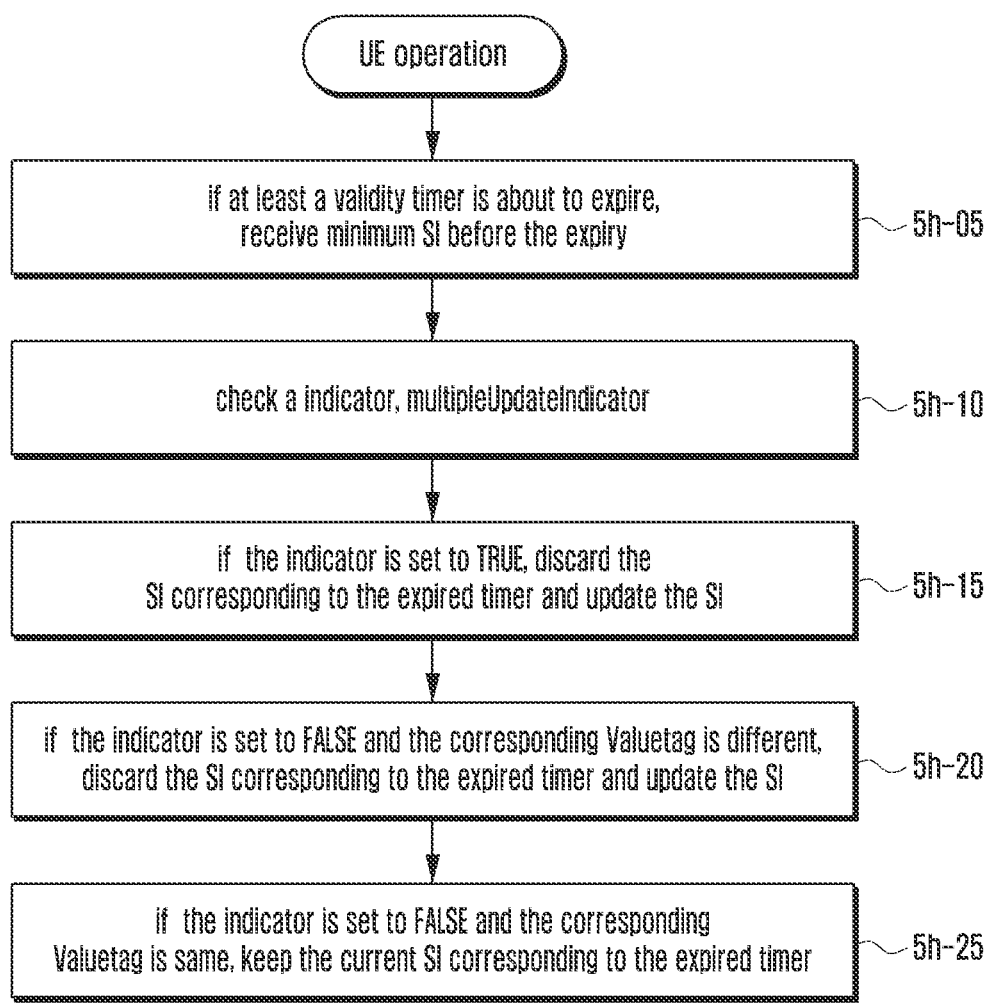
FIG. 5H is a view illustrating the operation of a terminal for performing system information update according to an embodiment of the disclosure.

FIG. 5H is a diagram for explaining the operation of a terminal for performing system information update according to an embodiment of the disclosure.

In step 5h-05, the terminal receives system information including "multipleUpdateIndicator" corresponding to specific system information immediately before or when the validity timer of specific system information expires. In step 5h-10, the terminal identifies the indicator. In step 5h-15, if the indicator is "TRUE", the terminal discards the system information and reacquires system information. In step 5h-20, if the indicator is "FALSE", and if the value tag is different, the terminal reacquires system information. In step 5h-25, if the indicator is "FALSE", and if the value tag is the same, the terminal applies the currently stored system information, and restarts the validity timer corresponding thereto.

Figure 5I:
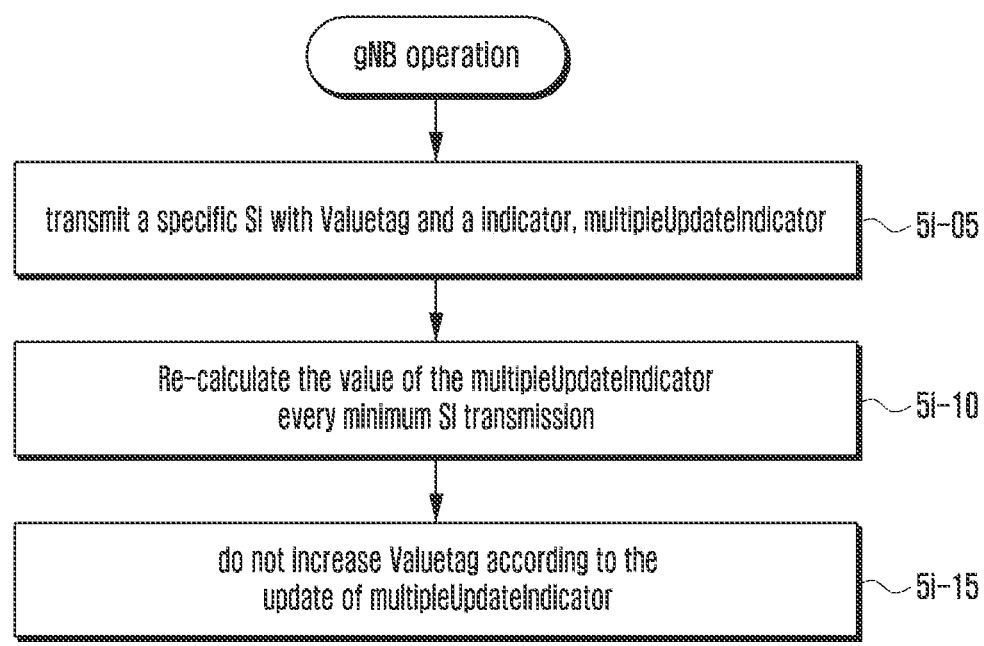
FIG. 5I is a view illustrating the operation of a base station for performing system information update according to an embodiment of the disclosure.

FIG. 5I is a diagram for explaining the operation of a base station for performing system information update according to an embodiment of the disclosure.

In step 5i-05, the base station transmits specific system information including a value tag and 1-bit information (multipleUpdateIndicator) indicating whether the system information has been updated a specific number of times or more within a specific period of time before the current time. In step 5i-10, the base station calculates and includes the 1-bit information every time specific system information including the information is transmitted. In step 5i-15, although the 1-bit information is changed, the base station does not count the value tag.

In LTE, carrier frequency information with respect to the surrounding frequency is provided as inter frequency information in SIB 5. As a result, SIB 5 has different contents for respective frequencies even in the same area.

In LTE, information related to intra-frequency mobility provides information related to SIB 4 and inter-frequency mobility through SIB 5. Therefore, whenever the serving frequency is changed, SIB 5 is changed. There is no big issue in LTE because the terminal must acquire system information from a new serving cell every time the cell changes. However, in the next-generation mobile communication system, it is desired to maintain system information to be the same between the neighboring cells. Applying this principle, it is not desirable to configure SIB 5 in the same manner as LTE. This is due to the fact that the change of the serving frequency also results in the change of SIB 5. The next-generation mobile communication system is required to change the definition of SIB 5 such that SIB 5 is not changed even if the serving frequency is changed. The embodiment of the disclosure provides the definition of SIB 5 using information about a serving frequency and an adjacent frequency. The following table shows an example of configuration of SIB 5 in the embodiment of the disclosure. For example, even if the serving frequency is changed in a system including f1, f2, f3, and f4, SIB 5 is not changed if the definition proposed in the disclosure is applied. This means that even if the terminal changes the frequency of the serving cell, SIB 5 does not need to be updated.

| LTE type (not suitable for NR) | NR (all carrier frequency info in a single SI to make them identical) |
| --- | --- |
| Serving f = f1 SIB4: carrier frequency info of f1<br>SIB5: carrier frequency info of f2, f3, f4 | SIB5: carrier frequency info of f1, f2, f3, f4 |
| Serving f = f2 SIB4: carrier frequency info of f2<br>SIB5: carrier frequency info of f1, f3, f4 | SIB5: carrier frequency info of f1, f2, f3, f4 |
| Serving f = f3 SIB4: carrier frequency info of f3<br>SIB5: carrier frequency info of f1, f2, f4 | SIB5: carrier frequency info of f1, f2, f3, f4 |
| Serving f = f4 SIB4: carrier frequency info of f4<br>SIB5: carrier frequency info of f1, f2, f3 | SIB5: carrier frequency info of f1, f2, f3, f4 |

Figure 5J:
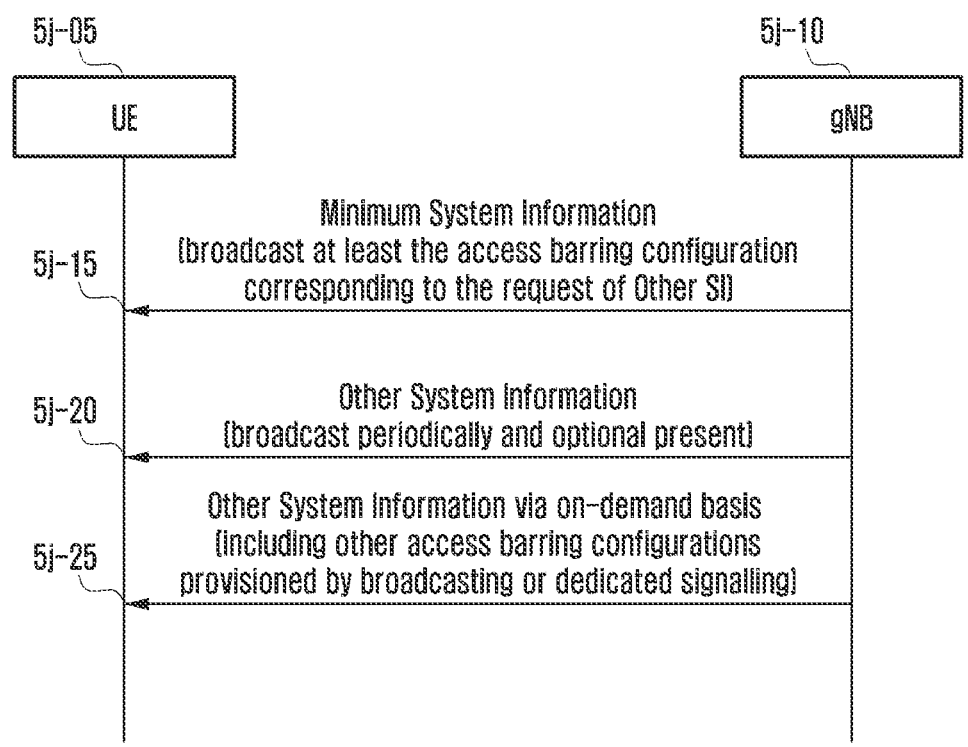
FIG. 5J is a diagram illustrating a method of providing access barring configuration information as system information according to an embodiment of the disclosure.

FIG. 5J is a diagram for explaining a method of providing access barring configuration information as system information according to an embodiment of the disclosure.

As described above, the system information broadcast by the base station 5j-10 in the next-generation mobile communication system is primarily divided into minimum system information (SI) and other system information. Since the minimum SI is broadcast periodically but has a limited size, there is a limit to include a large amount of configuration information. Although the access barring configuration information is the most essential information, the configuration information has a variable size, and sometimes, may have a very large size. Therefore, it may be ineffective or impossible to include all of the access barring configuration information in the minimum SI. Therefore, in the embodiment of the disclosure, if the access barring configuration information has a specific size or more, only some of the access barring configuration information is included in the minimum SI (5*j*-15), and the remaining access barring configuration information is included in the other SI. The access barring configuration information, which is always included in the minimum SI, regardless of the size thereof, includes at least information corresponding to the signaling requesting the other SI. It may be possible to consistently include only the access barring configuration information corresponding to the signaling requesting the other SI, regardless of the size of the access barring configuration information, and to transmit the remaining access barring configuration information through the other SI. In addition, the access barring configuration information, which is consistently included in the minimum SI, may include the access barring configuration information corresponding to emergency communication.

The access barring configuration information, excluding the access barring configuration information corresponding to the signaling requesting the other SIGNAL, is provided to the terminal 5*j*-05 through the other SI by means of broadcasting or dedicated RRC signaling (5*j*-20 and 5*j*-25).

Figure 5K:
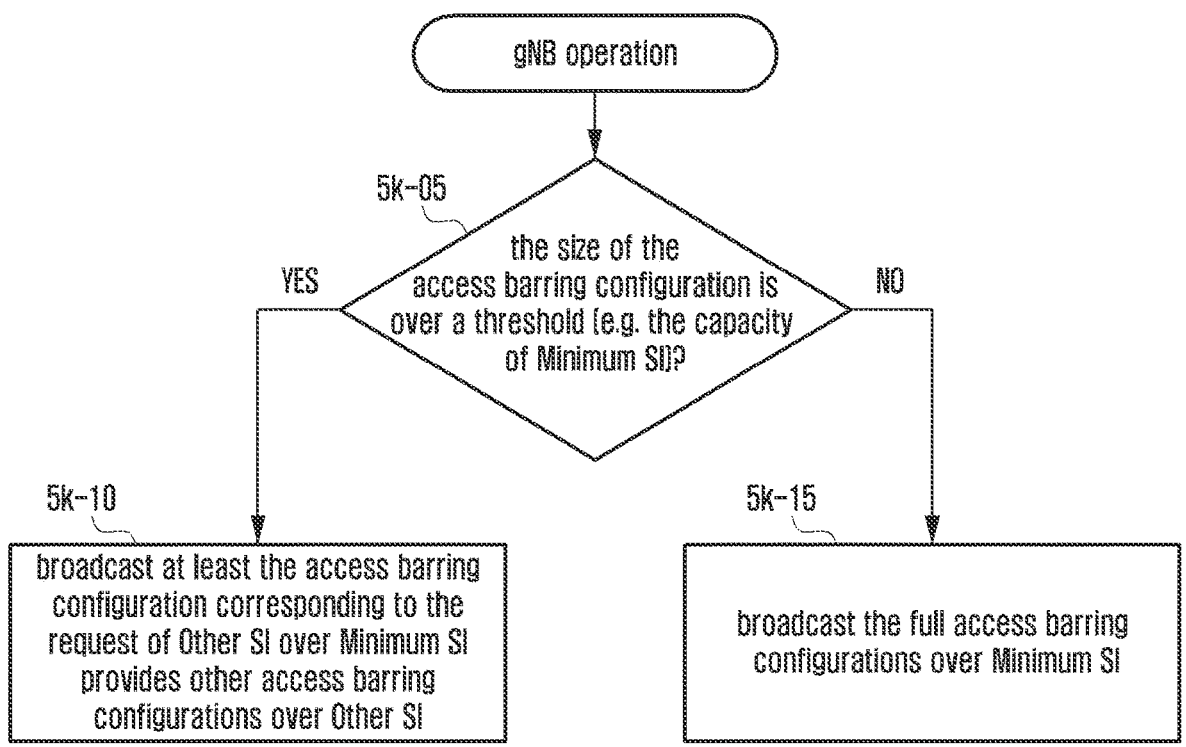
FIG. 5K is a diagram illustrating the operation of a base station for providing access barring configuration information as system information according to an embodiment of the disclosure.

FIG. 5K is a diagram for explaining the operation of a base station for providing access barring configuration information as system information according to an embodiment of the disclosure.

In step 5*k*-05, the base station determines whether the size of the entire access barring configuration information is equal to or greater than a predetermined value. For example, the predetermined value corresponds to an extra space excluding information that is essentially included in the minimum SI. If the size of the entire access barring configuration information is greater than or equal to a predetermined value, the base station includes only some of the access barring configuration information in the minimum SI and includes the remaining access barring configuration information in the other SI in step 5*k*-10. Otherwise, if the size of the entire access barring configuration information is less than a predetermined value, the base station includes the entire access barring configuration information in the minimum SI in step 5*k*-15.

Figure 5L:
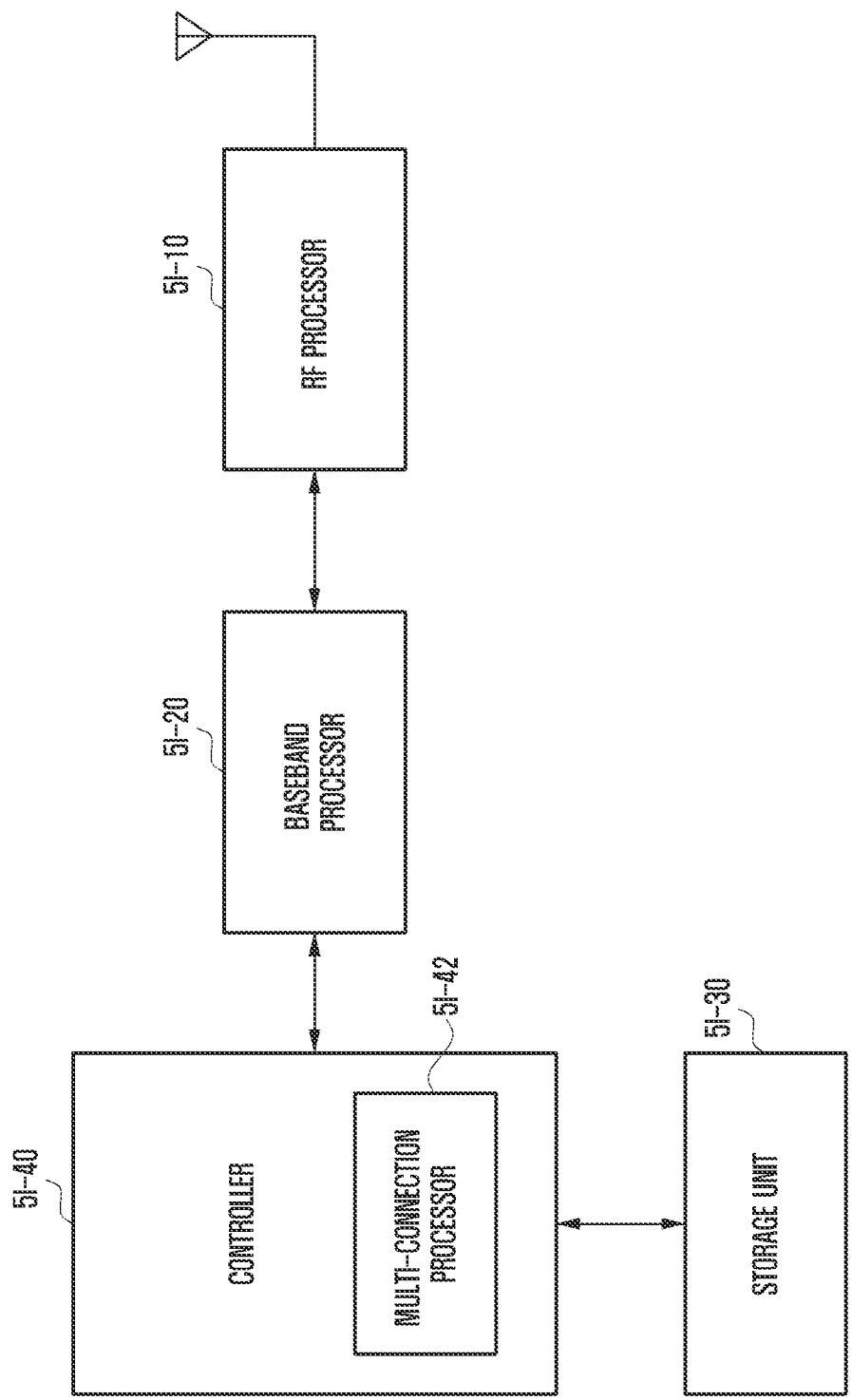
FIG. 5L is a block diagram illustrating the structure of a terminal according to an embodiment of the disclosure.

FIG. 5L is a diagram illustrating the structure of a terminal according to an embodiment of the disclosure.

Referring to the drawing above, the terminal includes a radio frequency (RF) processor 5*l*-10, a baseband processor 5*l*-20, a storage unit 5*l*-30, and a controller 5*l*-40.

The RF processor 5*l*-10 performs a function of transmitting and receiving a signal through a wireless channel, such as band conversion and amplification of a signal. That is, the RF processor 5*l*-10 up-converts a baseband signal provided from the baseband processor 5*l*-20 to an RF band signal to thus transmit the same through an antenna and down-converts an RF band signal received through the antenna to a baseband signal. For example, the RF processor 5*l*-10 may include a transmission filter, a reception filter, an amplifier, a mixer, an oscillator, a digital-to-analog converter (DAC), an analog-to-digital converter (ADC), and the like. Although only one antenna is illustrated in the above drawing, the terminal may have a plurality of antennas. In addition, the RF processor 5*l*-10 may include a plurality of RF chains. Further, the RF processor 5*l*-10 may perform beamforming. To perform beamforming, the RF processor 5*l*-10 may adjust the phases and magnitudes of signals transmitted and received through a plurality of antennas or antenna elements. In addition, the RF processor may perform MIMO, and may receive a plurality of layers when performing the MIMO operation.

The baseband processor 5*l*-20 performs a function of conversion between a baseband signal and a bit string according to the physical layer specification of the system. For example, in the case of data transmission, the baseband processor 5*l*-20 encodes and modulates transmission bit strings, thereby generating complex symbols. In addition, upon receiving data, the baseband processor 5*l*-20 demodulates and decodes a baseband signal provided from the RF processor 5*l*-10 to thus recover reception bit strings. For example, in the case where an orthogonal frequency division multiplexing (OFDM) scheme is applied, when transmitting data, the baseband processor 5*l*-20 generates complex symbols by encoding and modulating transmission bit strings, maps the complex symbols with subcarriers, and then configures OFDM symbols through an inverse fast Fourier transform (IFFT) operation and cyclic prefix (CP) insertion. In addition, when receiving data, the baseband processor 5*l*-20 divides the baseband signal provided from the RF processor 5*l*-10 into OFDM symbol units, restores the signals mapped with the subcarriers through a fast Fourier transform (FFT) operation, and then restores reception bit strings through demodulation and decoding.

The baseband processor 5*l*-20 and the RF processor 5*l*-10 transmit and receive signals as described above. Accordingly, the baseband processor 5*l*-20 and the RF processor 5*l*-10 may be referred to as a "transmitter", a "receiver", a "transceiver", or a "communication unit". Further, at least one of the baseband processor 5*l*-20 and the RF processor 5*l*-10 may include a plurality of communication modules to support a plurality of different radio access technologies. In addition, at least one of the baseband processor 5*l*-20 and the RF processor 5*l*-10 may include different communication modules to process signals of different frequency bands. For example, the different radio access technologies may include wireless LANs (e.g., IEEE 802.11), cellular networks (e.g., LTE), and the like. In addition, the different frequency bands may include super-high frequency (SHF) (e.g., 2.NRHz or NRhz) bands and millimeter wave (e.g., 60 GHz) bands.

The storage unit 5*l*-30 stores data such as basic programs, application programs, and configuration information for the operation of the terminal. In particular, the storage unit 5*l*-30 may store information related to a second access node for performing wireless communication using a second radio access technique. In addition, the storage unit 5*l*-30 provides the stored data according to a request by the controller 5*l*-40.

The controller 5*l*-40 controls the overall operation of the terminal. For example, the controller 5*l*-40 transmits and receives signals through the baseband processor 5*l*-20 and the RF processor 5*l*-10. In addition, the controller 5*l*-40 records and reads data in and from the storage unit 5*l*-30. To this end, the controller 5*l*-40 may include at least one processor. For example, the controller 5*l*-40 may include a communication processor (CP) for controlling communication and an application processor (AP) for controlling higher layers such as application programs.

In addition, the controller 5*l*-40 may perform control so as to: acquire first system information and second system information from a first cell; start a timer corresponding to the second system information; if the terminal moves from a first cell to a second cell, determine whether the second cell shares the second system information with the first cell; and update the second system information based on the determination result.

According to claim 10, the controller 5*l*-40 may perform control so as to, if the second cell shares the second system information with the first cell, update the first system information, instead of updating the second system information. The controller 5*l*-40 may perform control so as to, if a value tag of the second system information acquired in the first cell is different from a value tag of the second system information of the second cell, update the acquired second system information.

In addition, the controller 5*l*-40 may perform control so as to, if the second cell does not share the second system information with the first cell, update the first system information and the second system information, and reset and restart the timer. In addition, the controller 5*l*-40 may perform control so as to, if the terminal moves from the first cell to another cell, update the first system information, regardless of a value tag of the first system information.

The first system information may be cell-specific system information and the second system information may be common system information for a plurality of cells. In addition, the first system information may include a master information block (MIB).

Figure 5M:
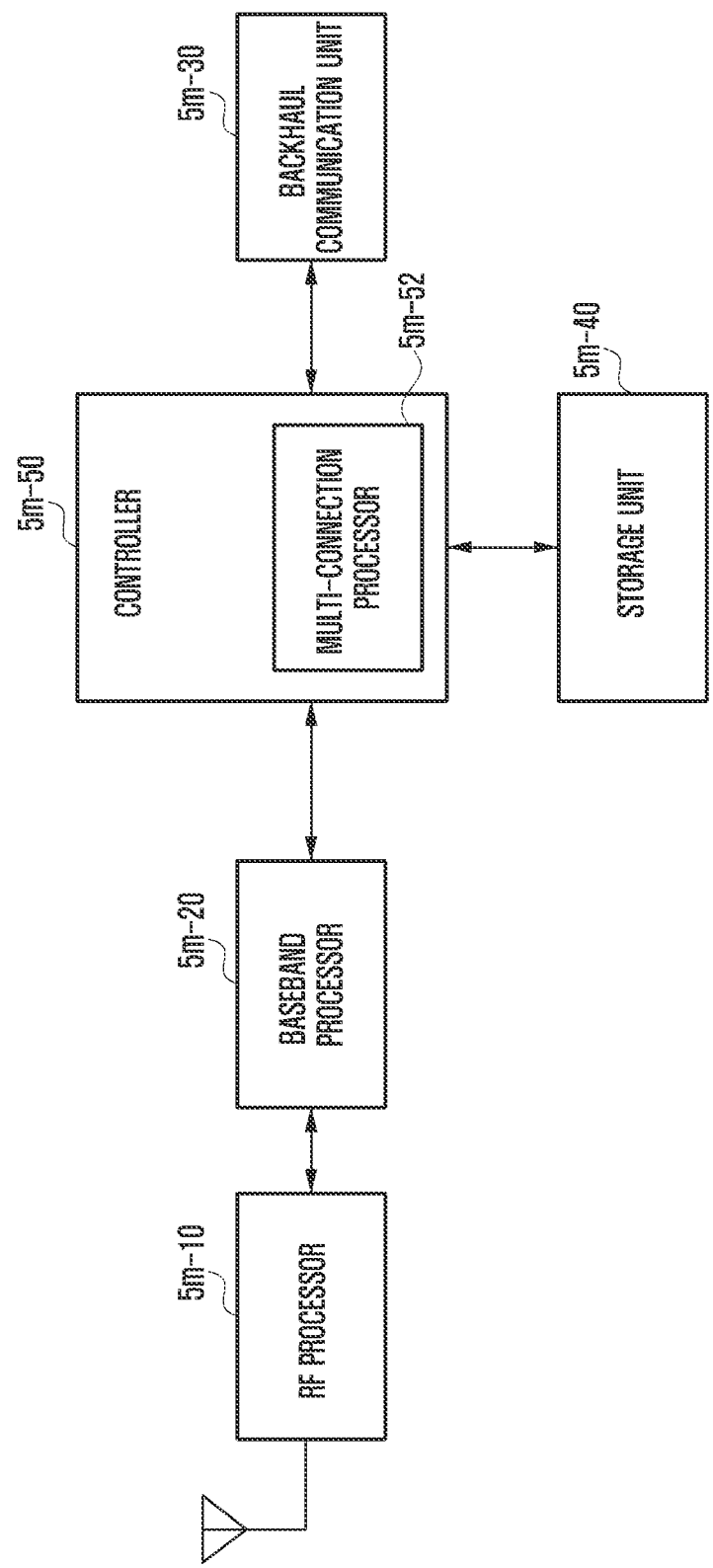
FIG. 5M is a block diagram illustrating the configuration of a base station according to an embodiment of the disclosure.

FIG. 5M is a diagram illustrating the configuration of a base station according to an embodiment of the disclosure.

As shown in the drawing, the base station includes an RF processor 5*m*-10, a baseband processor 5*m*-20, a backhaul communication unit 5*m*-30, a storage unit 5*m*-40, and a controller 5*m*-50.

The RF processor 5*m*-10 performs a function of transmitting and receiving signals through a wireless channel, such as band conversion and amplification of a signal. That is, the RF processor 5*m*-10 up-converts a baseband signal provided from the baseband processor 5*m*-20 to an RF band signal, to thus transmit the same through an antenna, and down-converts an RF band signal received through the antenna to a baseband signal. For example, the RF processor 5*m*-10 may include a transmission filter, a reception filter, an amplifier, a mixer, an oscillator, a DAC, an ADC, and the like. Although only one antenna is shown in the drawing, the first access node may have a plurality of antennas. In addition, the RF processor 5*m*-10 may include a plurality of RF chains. Further, the RF processor 5*m*-10 may perform beamforming. To perform beamforming, the RF processor 5*m*-10 may adjust the phases and magnitudes of signals transmitted and received through a plurality of antennas or antenna elements. The RF processor may perform a downlink MIMO operation by transmitting one or more layers.

The baseband processor 5*m*-20 performs a function of conversion between a baseband signal and a bit string according to a physical layer specification of a first radio access technique. For example, in the case of data transmission, the baseband processor 5*m*-20 encodes and modulates transmission bit strings, thereby generating complex symbols. In addition, upon receiving data, the baseband processor 5*m*-20 demodulates and decodes a baseband signal provided from the RF processor 5*m*-10 to thus recover reception bit strings. For example, in the case where an OFDM scheme is applied, when transmitting data, the baseband processor 5*m*-20 generates complex symbols by encoding and modulating transmission bit strings, maps the complex symbols with subcarriers, and then configures OFDM symbols through the IFFT operation and CP insertion. In addition, when receiving data, the baseband processor 5*m*-20 divides the baseband signal provided from the RF processor 5*m*-10 into OFDM symbol units, restores the signals mapped with the subcarriers through the FFT operation, and then restores reception bit strings through demodulation and decoding. The baseband processor 5*m*-20 and the RF processor 5*m*-10 transmit and receive signals as described above. Accordingly, the baseband processor 5*m*-20 and the RF processor 5*m*-10 may be referred to as a "transmitter", a "receiver", a "transceiver", a "communication unit", or a "wireless communication unit".

The backhaul communication unit 5*m*-30 provides an interface for performing communication with other nodes in the network. That is, the backhaul communication unit 5*m*-30 converts a bit string, transmitted from the primary base station to another node, such as a secondary base station, a core network, etc., into a physical signal, and converts physical signals received from other nodes into bit strings.

The storage unit 5*m*-40 stores data such as basic programs, application programs, and configuration information for the operation of the primary base station. In particular, the storage unit 5*m*-40 may store information about bearers allocated to a connected terminal, a measurement result reported from a connected terminal, and the like. In addition, the storage unit 5*m*-40 may store information that is a criterion for determining whether multiple connections are provided to the terminal or are released. In addition, the storage unit 5*m*-40 provides the stored data in response to a request from the controller 5*m*-50.

The controller 5*m*-50 controls the overall operation of the primary base station. For example, the controller 5*m*-50 transmits and receives signals through the baseband processor 5*m*-20 and the RF processor 5*m*-10 or the backhaul communication unit 5*m*-30. In addition, the controller 5*m*-50 records and reads data in and from the storage unit 5*m*-40. To this end, the controller 5*m*-50 may include at least one processor.

In the above-described detailed embodiments of the disclosure, a component included in the disclosure is expressed in the singular or the plural according to a presented detailed embodiment. However, the singular or plural expressions are selected to be suitable for proposed situations for convenience of description, and the disclosure is not limited to the singular or plural elements. An element expressed in a plural form may be configured in singular, or an element expressed in a singular form may be configured in plural.

Although the embodiment has been described in the detailed description of the disclosure, the disclosure may be modified in various forms without departing from the scope of the disclosure. Therefore, the scope of the disclosure should not be defined as being limited to the embodiments, but should be defined by the appended claims and equivalents thereof.

What is claimed is:

1. A method performed by a terminal in a communication system, the method comprising:
   receiving, from a first cell, a system information block 1 (SIB 1) including
   a first value tag for first system information and
   a second value tag for second system information;
   obtaining, from the first cell, the first system information corresponding to the first value tag and the second system information corresponding to the second value tag,
   wherein the first system information is cell specific and the second system information is area specific for an area consisting of a plurality of cells; and
   in response to determining that the terminal moves to a second cell:
   updating the first system information regardless of the first value tag;

in case that the second cell belongs to the area consisting of the plurality of cells, determining whether the second value tag has changed based on information obtained from the second cell; and updating the second system information, in case that the second value tag has changed based on the information obtained from the second cell, wherein the second system information is applicable within the area consisting of the plurality of cells.

2. The method of claim 1, further comprising:

not updating the second system information, in case that
the second cell belongs to the area consisting of the plurality of cells and
the second value tag has not changed based on the information obtained from the second cell.

3. The method of claim 1, further comprising:

in case that the terminal moves to a third cell not belonging to the area consisting of the plurality of cells:
updating the first system information and the second system information regardless of the first value tag and the second value tag.

4. The method of claim 1, wherein a first validity timer for the first system information is started as a response to obtaining the first system information or updating the first system information.

5. The method of claim 1, wherein a second validity timer for the second system information is started as a response to
obtaining the second system information or
updating the second system information.

6. The method of claim 1, wherein the first system information is deleted when a first validity timer for the first system information expires.

7. The method of claim 1, wherein the second system information is deleted when a second validity timer for the second system information expires.

8. The method of claim 1, wherein the first value tag is used for determining a validity of the first system information, and
wherein the second value tag is used for determining a validity of the second system information.

9. A terminal in a communication system, the terminal comprising:

a transceiver; and
a controller configured to:
receive, from a first cell via the transceiver, a system information block 1 (SIB 1) including a first value tag for first system information and a second value tag for second system information,
obtain, from the first cell via the transceiver, the first system information corresponding to the first value tag and the second system information corresponding to the second value tag,
wherein the first system information is cell specific and
the second system information is area specific for an area consisting of a plurality of cells, and
in response to determining that the terminal moves to a second cell:
update the first system information regardless of the first value tag,
in case that the second cell belongs to the area consisting of the plurality of cells, determine whether the second value tag has changed based on information obtained from the second cell, and
update the second system information, in case that the second value tag has changed based on the information obtained from the second cell,
wherein the second system information is applicable within the area consisting of the plurality of cells.

10. The terminal of claim 9, wherein the controller is further configured not to update the second system information, in case that
the second cell belongs to the area consisting of the plurality of cells and
the second value tag has not changed based on the information obtained from the second cell.

11. The terminal of claim 9, wherein the controller is further configured to, in case that the terminal moves to a third cell not belonging to the area consisting of the plurality of cells, update the first system information and the second system information regardless of the first value tag and the second value tag.

12. The terminal of claim 9, wherein a first validity timer for the first system information is started as a response to obtaining the first system information or updating the first system information.

13. The terminal of claim 9, wherein a second validity timer for the second system information is started as a response to
obtaining the second system information or
updating the second system information.

14. The terminal of claim 9, wherein the first system information is deleted when a first validity timer for the first system information expires.

15. The terminal of claim 9, wherein the second system information is deleted when a second validity timer for the second system information expires.

16. The terminal of claim 9, wherein the first value tag is used for determining a validity of the first system information, and
wherein the second value tag is used for determining a validity of the second system information.

* * * * *